US011350059B1

(12) United States Patent
Swierk et al.

(10) Patent No.: US 11,350,059 B1
(45) Date of Patent: May 31, 2022

(54) SYSTEM AND METHOD FOR INTELLIGENT APPEARANCE MONITORING MANAGEMENT SYSTEM FOR VIDEOCONFERENCING APPLICATIONS

(71) Applicant: Dell Products, LP, Round Rock, TX (US)

(72) Inventors: Todd E. Swierk, Austin, TX (US); Vivek Viswanathan Iyer, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/158,548

(22) Filed: Jan. 26, 2021

(51) Int. Cl.
*H04N 7/15* (2006.01)
*H04N 5/232* (2006.01)
*G06N 3/08* (2006.01)
*G06N 3/04* (2006.01)
*G06T 5/00* (2006.01)
*G06V 40/16* (2022.01)

(52) U.S. Cl.
CPC ............... *H04N 7/15* (2013.01); *G06N 3/04* (2013.01); *G06N 3/08* (2013.01); *G06T 5/002* (2013.01); *G06V 40/168* (2022.01); *H04N 5/23216* (2013.01); *G06T 2207/10016* (2013.01); *G06T 2207/30201* (2013.01)

(58) Field of Classification Search
CPC .......... H04N 7/15; H04N 7/147; H04N 5/232; G06K 9/00; G06N 3/08; G06N 3/04; G06T 5/00

USPC ........................................... 348/14.01–14.16
See application file for complete search history.

(56) References Cited

U.S. PATENT DOCUMENTS

| 7,269,292 | B2 | 9/2007 | Steinberg | |
|---|---|---|---|---|
| 9,912,860 | B2 | 3/2018 | Manzari | |
| 10,157,325 | B2 | 12/2018 | Zamfir | |
| 2002/0081003 | A1* | 6/2002 | Sobol | G06T 5/00 382/118 |
| 2006/0268101 | A1* | 11/2006 | He | H04N 7/147 348/14.12 |
| 2007/0115350 | A1* | 5/2007 | Currivan | H04N 7/14 348/14.08 |
| 2008/0267442 | A1 | 10/2008 | Ferguson | |
| 2012/0288168 | A1 | 11/2012 | Srinivasa | |
| 2014/0226900 | A1 | 8/2014 | Saban | |
| 2015/0341401 | A1 | 11/2015 | Lee | |
| 2016/0070955 | A1 | 3/2016 | Kato | |

(Continued)

Primary Examiner — Melur Ramakrishnaiah
(74) Attorney, Agent, or Firm — Prol Intellectual Property Law, PLLC; H. Kenneth Prol

(57) ABSTRACT

A system or method executing an intelligent appearance monitoring management system comprising a processor to execute code instructions of a multimedia multi-user collaboration application to join a videoconference session, a display screen, a speaker, a video camera, and a microphone where the video camera captures a videoframe of a user and the processor to input videoframe data, including the detected user's image, into a trained neural network of the intelligent appearance monitoring management system to generate optimized appearance filtering adjustments indicating detection of a user appearance anomaly in the user's image or altering a user's image in the captured videoframes in response to the user appearance anomaly and prepare those videoframes for transmission.

20 Claims, 10 Drawing Sheets

(56) References Cited

U.S. PATENT DOCUMENTS

| | | |
|---|---|---|
| 2016/0134840 A1 | 5/2016 | McCulloch |
| 2016/0216871 A1 | 7/2016 | Stamatiou |
| 2017/0270969 A1 | 9/2017 | Sanchez |
| 2018/0096506 A1 | 4/2018 | Valdivia |
| 2019/0007649 A1* | 1/2019 | Van Rensburg ......... H04N 7/15 |
| 2019/0251362 A1* | 8/2019 | Meisser ........... H04N 5/232935 |
| 2020/0014846 A1* | 1/2020 | Venetianer ............. H04N 5/243 |
| 2020/0151964 A1* | 5/2020 | Chen ..................... G06T 15/005 |
| 2020/0380639 A1* | 12/2020 | Rossi .................... G06T 11/001 |
| 2021/0218589 A1* | 7/2021 | Shimizu .................... G06T 7/70 |
| 2021/0295045 A1* | 9/2021 | Li ...................... G06K 9/00671 |

\* cited by examiner

US 11,350,059 B1

SYSTEM AND METHOD FOR INTELLIGENT APPEARANCE MONITORING MANAGEMENT SYSTEM FOR VIDEOCONFERENCING APPLICATIONS

FIELD OF THE DISCLOSURE

The present disclosure generally relates to multimedia, multi-user collaboration applications, such as videoconferencing applications. More specifically, the present disclosure relates to intelligently managing media processing pursuant to execution of such applications, based on performance metrics for an information handling system, and context factors for the appearance of a user related to a current user videoconference session within such an application.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
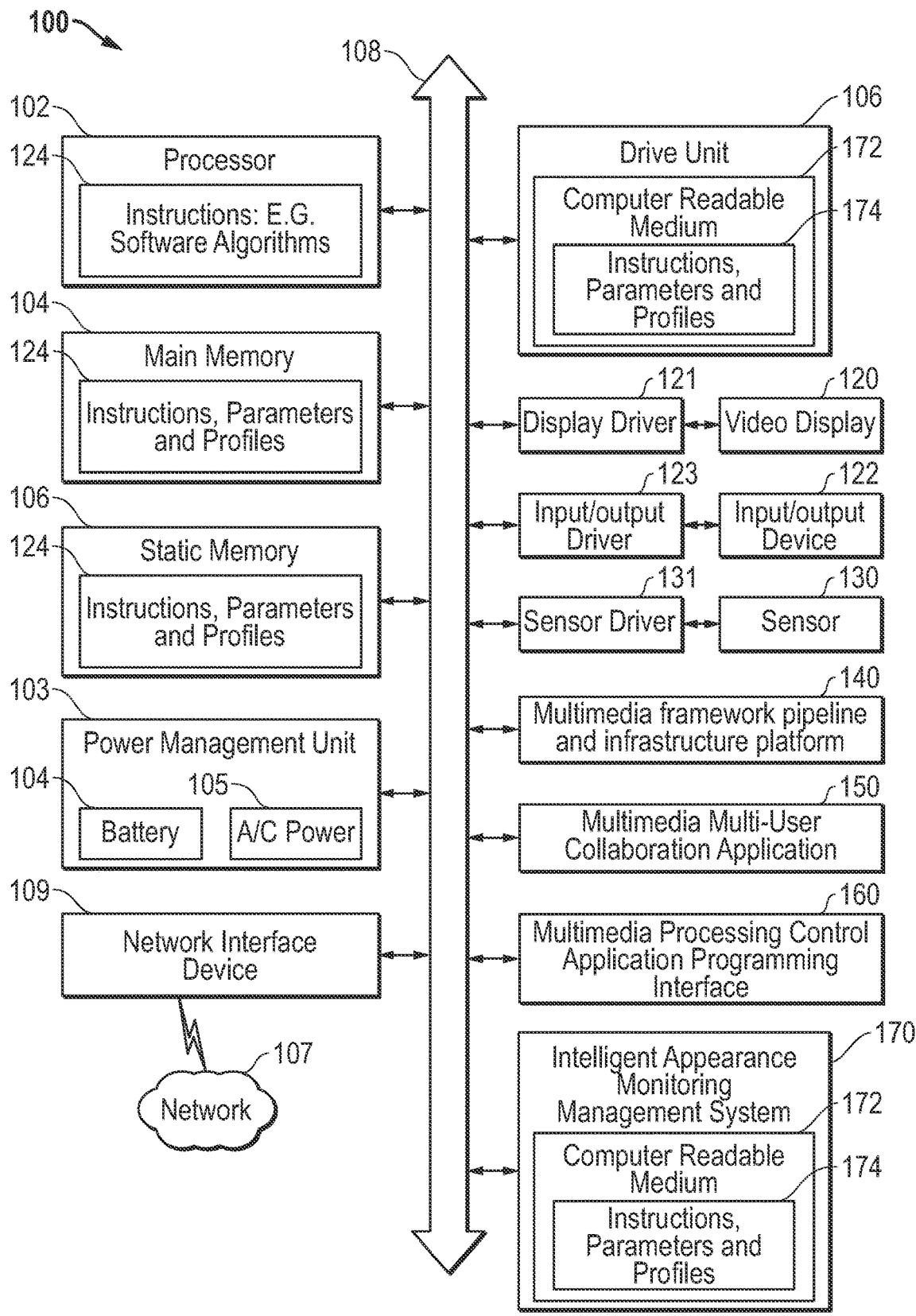
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As working remotely has gained in popularity, so too has the prevalence of multi-employee or multi-business video conferences. Many of these video conferences (also referred to as web-conferences, online meetings, tele-video conferences, or remote conferences) may include any number of people, but sometimes exceeds 50 or 100 participants. In many cases, as workers increasingly work from home, tools such as multimedia multi-user collaboration applications (MMCAs) are used to conduct videoconference meetings and collaborations on documents or projects among workers, with customers or clients, or even in casual settings among friends and family. With busy schedules that may include many online meetings or interspersed formal/business and casual or videoconference meetings while working from home, it is easy to forget about one's appearance for various online videoconferences or collaboration sessions.

For example, a hectic morning may yield one or more undesirable appearance anomalies such as forgetting to shave, to comb or fix hair, to address blemishes with make-up or the like, to clean food from a meal or other marks from one's face, to remedy bloodshot eyes, or to be susceptible to coughing or sneezing fits when not feeling well. Existing multimedia multi-user collaboration applications hosting such video conferences perform the same video processing methods on videos of each participant without accounting for the appearance concerns that may be important to a user of an MMCA. Such processing of videoframes may occur both at each individual participant's computing device, and be transmitted to all other participant's computing devices of all other participants which may cause embarrassment.

The intelligent appearance monitoring management system in embodiments of the present disclosure addresses these appearance issues by training a machine-learning neural network to identify one or more user appearance anomalies and determine one or more optimized appearance filtering adjustments for a variety of performance environments encountered by a single information handling system participating in multimedia multi-user collaboration application user sessions over time. In embodiments described herein, the term "media" may refer to images, videoframes, or video samples (e.g., compilation of several images over time) captured by a camera, audio samples captured by a microphone, or a combination of audio and video samples to form a media sample providing both audio and video as audio-visual (AV) data. A separate neural network may be trained for each of a plurality of information handling systems in embodiments, based on the image of the user, desired intelligent appearance monitoring selected by the user, performance metrics or functional capabilities unique to that information handling system. Such neural networks may operate at a transmitting information handling system that captures and transmits audio and video of a participant of the user session, or at a remote information handling system that receives and processes the audio and video of the participant for facilitating transmission of image videoframe streams for a videoconferencing session. Optimized settings determined by such neural networks in embodiments may also operate to decrease the processing burden placed on the CPU, GPU, or other processors and controllers (and undesirable side effects associated therewith) at either or both the transmitting information handling system and the receiving information handling system in some embodiments.

The one or more optimized appearance filtering adjustments generated as outputs by a trained intelligent appearance monitoring management system neural network may include displaying a notice to a user identifying one or more user appearance anomalies relative to the training of reference images to the trained intelligent appearance monitoring management system neural network of the user. Additionally, the trained intelligent appearance monitoring management system neural network may output optimized appearance filtering adjustments that include self-correction adjustments to a user's image by applying a correction to erase or blend anomalies such as marks on a face, to blur a portion or all of the user's image in videoframes, to apply a cartoonification algorithm to alter the user's image within videoframes, or to replace the user's image with a stock image, such as a stock photo of the user or an enterprise logo during some or all of the videoconferencing session. Other self-correcting alterations may be applied to a user's image in videoframes of a videoconferencing session when one or more user appearance anomalies are detected. In one or more aspects, the intelligent appearance monitoring management system may be invoked with any MMCA and options for intelligent appearance monitoring may be presented to a user via a user interface. For example, the user interface may allow for enabling or disabling the intelligent appearance monitoring management system. Further, the user interface may present options for customizing types of user appearance anomalies to be detected by the intelligent appearance monitoring management system in some embodiments. For example, a person may have little concern over bad hair, but may not want to appear on a videoconference with food on their face. In yet another example, the user interface for the intelligent appearance monitoring management system may allow for options to select optimized appearance filtering adjustments, such as selection of only a notification of a user appearance anomaly, or what types of adjustments to a user's image may be invoked and associated with one or more types of user appearance anomalies detected.

The intelligent appearance monitoring management system, or portions thereof, may operate remotely from the information handling system for which the neural network is trained in some embodiments. For example, the intelligent appearance monitoring management system may operate as part of an information handling system performance optimizer application as a service to users hosted, for example, by the manufacturer of the information handling system, or managed by the information handling system user's employer or Information Technology (IT) manager. Such an information handling system performance optimizer application may also operate in example embodiments in various contexts to monitor certain performance metrics at the information handling system, perform firmware and software updates, confirm security credentials and compliance, and manage user access across a plurality of information handling systems (e.g., as owned by an employer or enterprise corporation). In such embodiments, the intelligent appearance monitoring management system may receive such performance metrics and metrics describing previous multimedia multi-user collaboration application user sessions for an information handling system via any type of network, including out-of-band communications such as identification of user appearance anomalies, and communications with one or more software applications, application programming interfaces (APIs), or directly with one or more controllers or firmware in kernel mode.

The intelligent appearance monitoring management system in embodiments may train a neural network for a transmitting information handling system to determine optimized media capture settings (e.g., audio sample bit rate, video frames per second, image resolution, etc.) and optimized media processing settings including identification of types of audio/visual (AV) processing instructions (e.g., video processing methods such as super resolution, user framing, background application, and audio processing methods such as background noise reduction, etc.) to apply to a captured video or audio sample for example in making adjustments to a user's image in response to detected user appearance anomalies relative to previous images of a user. Such AV processing instruction modules may comprise code instructions or algorithms executed by a processor of the information handling system to transform a media sample data such as a video sample or audio sample through some form of AV data processing technique. The neural network for the transmitting information handling system may also be trained in embodiments to identify an optimized type of processor capabilities available on an information handling system (e.g., central processing unit (CPU), graphics processing unit (GPU), vision processing unit (VPU), gaussian neural accelerator (GNA)) for execution of such AV processing instruction modules, for example. Selection of a non-CPU processor may be referred to herein as "offloading," and may result in the multimedia multi-user collaboration application draining less CPU processing power in embodiments. These determinations may be made based on input values, including the performance metrics such as processing or system capabilities and applications executing at the information handling system and meeting metrics describing previous multimedia multi-user collaboration application user sessions gathered by the transmitting information handling system performance optimizer application in example embodiments.

These and other input values may be input into the neural network trained for the transmitting information handling system in such embodiments. For example, other input values may further include non-optimized or default settings for audio and video capture and for processor type, and default settings (e.g., as set by the multimedia multi-user collaboration application) for AV processing instruction modules executed on such captured audio and video samples. The neural network may be trained for the transmitting information handling system to accurately model the relationship between a captured videoframe image of a user and identifying one or more user appearance anomalies as well as potential optimized appearance filtering adjustments yielding notice to a user or adjustments media capture settings, AV processing instruction modules applied, or offloading settings and various preset performance benchmarks for the multimedia multi-user collaboration application (e.g., as measured by various meeting metrics). Upon completion of such training, the neural network may generate one or more optimized appearance filtering adjustments during future user sessions. In some embodiments described herein, the neural network trained for the transmitting information handling system may do so remotely from the transmitting information handling system engaging in such user sessions. In other embodiments described herein, the trained neural network may be transmitted to an agent of the intelligent appearance monitoring management system operating at the transmitting information handling system for which the neural network has been specifically trained, and through which a user for the multimedia multi-user collaboration application may join a videoconferencing session.

Upon joining or starting a user session for the multimedia multi-user collaboration application in embodiments described herein, the multimedia processing control API at the transmitting information handling system may gather and transmit to the trained neural network all necessary or available inputs upon which the neural network was previously trained. For example, the multimedia processing control API in embodiments may gather current videoframe images of a user, performance metrics such as processing or system capabilities and applications executing at the transmitting information handling system, meeting metrics describing the current multimedia multi-user collaboration application user session, default settings for audio and video capture at the transmitting information handling system, default settings for processor type, or default AV processing instruction module settings set to be executed on such captured audio and video samples at the transmitting information handling system during the current user session. The trained neural network in embodiments may output optimized appearance filtering adjustments for the transmitting information handling system in some embodiments, based on these gathered inputs. For example, in some embodiments, the output optimized appearance filtering adjustments may include optimized media capture instruction adjustments for the transmitting information handling system may include instructions to decrease the bit rate at which the microphone captures audio samples, or to decrease the frames per second at which the camera captures video samples, if the transmitting information handling system user is not highly engaged (e.g., speaking often, hosting the session, or screen sharing) in the current user session. The intelligent appearance monitoring management system at the transmitting information handling system in embodiments may then transmit the optimized media capture settings to the streaming media driver, which may direct the camera and microphone to capture video and audio samples using the optimized media capture settings determined by the neural network. The streaming data sizes for the media samples (e.g., audio samples or video samples) captured at the transmitting information handling system using these optimized settings in embodiments may be significantly smaller than streaming data sizes for media samples captured using default settings provided by the multimedia multi-user collaboration application.

The neural network trained for the transmitting information handling system in embodiments may also output optimized AV processing instruction adjustments as optimized appearance filtering adjustments identifying one or more AV processing instruction modules to execute during post-capture processing of the audio or video samples captured using the adjustments to the videoframes relating to corrections, alterations, or replacement of the user image according to embodiments herein. For example, optimized AV processing instruction adjustments for the transmitting information handling system may include instructions to blur, blend, or utilize a neural network or image recognition system to reduce, cover, hide, or erase some or all identified user appearance anomalies in videoframes. In another example, an optimized AV processing instruction adjustments for the transmitting information handling system may include instructions to apply an AV processing instruction to applying a virtual cartoonified image to the user image or background in the videoframes based off of the user image. In such a way, the intelligent appearance monitoring management system transmitting such optimized AV processing instruction adjustments in embodiments may provide intelligent appearance monitoring and adjustment as a service to a user of any MMCA for a videoconferencing session.

The neural network trained for the transmitting information handling system in embodiments may output optimized appearance filtering adjustments as an optimized processor setting (e.g., offload instruction) in some embodiments based on the gathered neural network inputs. For example, such offload instructions may include an instruction to execute one or more AV processing instruction modules at the transmitting information handling system using a non-CPU processor (e.g., GPU, VPU, GNA) in embodiments described herein. The intelligent appearance monitoring management system of the transmitting information handling system in embodiments may transmit this instruction to the multimedia framework pipeline and infrastructure platform controlling or directing execution of such AV processing instruction modules when application of optimized appearance filtering adjustments require additional processing that may otherwise load the CPU to a point where additional errors or issues may occur. By decreasing the computational requirements of the CPU on of the captured audio or video samples upon which such AV processing instruction modules may be executed such as for applying corrective user image alterations in some embodiments, the processing power required to perform such an execution at the transmitting information handling system may also markedly decrease. Further, by offloading these executions to a non-CPU processor, the undesirable side effects (e.g., video lag, glitches, slowing of peripheral applications, engaging the fan to cool the CPU) associated with overtaxing the transmitting information handling system CPU during such executions (e.g., pursuant to default or non-optimized media capture and processing settings) may be avoided.

The multimedia framework pipeline and infrastructure platform of the transmitting information handling system in embodiments may execute each of the AV processing instruction modules set or requested by the multimedia multi-user collaboration application on the audio samples or video samples captured at the transmitting information handling system using the optimized capture settings in order to create processed, encoded media samples that combine both video and audio samples into a single file. Media samples may be referred to herein as "processed" when the video sample or audio sample upon which the media sample is created has undergone at least one AV processing instruction, which may include an encoding process, or other audio/video processing methods (e.g., zooming, virtual background application, cartoonification application, blurring, image appearance filter alterations, cropping, user framing, resolution adjustment, normalization, eye contact correction, background noise reduction, etc.).

Upon processing of media samples, the multimedia framework pipeline and infrastructure platform may transmit the processed, encoded media sample that includes video of the transmitting information handling system user to the multimedia multi-user collaboration application for the transmitting information handling system. The processed, encoded media sample may then be transmitted to other information handling systems (e.g., receiving information handling systems) in use by other participants within the current user session for the multimedia multi-user collaboration application. These receiving information handling systems may then reprocess and decode the received media sample, for playback at the displays for these receiving information handling systems. In such a way, the intelligent appearance monitoring management system may notify or apply image adjustments to a user's image in a videoconference stream of videoframes to decrease or eliminate potential undesirable user appearance anomalies from being viewed or noticed during participation in a current user session for a multimedia multi-user collaboration application.

Turning now to the figures, FIG. 1 illustrates an information handling system 100 similar to information handling systems according to several aspects of the present disclosure. As described herein, the intelligent appearance monitoring management system 170 in an embodiment may operate to identify user appearance anomalies and to generate optimized appearance filtering adjustments that may adjust the user's image during the capture, processing, encoding, and transmission of a media sample (e.g., including audio or video) from a transmitting information handling system to a receiving information handling system. The information handling system 100 described with reference to FIG. 1 may represent a transmitting information handling system or a receiving information handling system in various embodiments. In still other embodiments, information handling system 100 may operate as both a transmitting and a receiving information handling system, as may be the case for an information handling system transmitting video of one participant user while simultaneously executing code instructions for the multimedia multi-user collaboration application (MMCA) 150 to display videos of other participants within a shared user session.

In yet another embodiment, the information handling system 100 may operate remotely from all transmitting or receiving information handling systems executing code instructions of the MICA 150 to participate within a user session. For example, the intelligent appearance monitoring management system 170 may operate on a server, blade, rack, or cloud-based network maintained and controlled by the manufacturer of several information handling systems, or managed by an employer or enterprise owner of several information handling systems. In such an embodiment, the information handling system 100 may operate within one of these servers, blades, racks, or across various nodes of a cloud-based network to monitor certain performance metrics at each of the plurality of such information handling systems, perform firmware and software updates, confirm security credentials and compliance, and manage user access across the plurality of information handling systems (e.g., as owned by an employer or enterprise corporation). In such an embodiment, each of the plurality of transmitting and receiving information handling systems participating within a user session of the MMCA 150 may incorporate an agent or API for the intelligent appearance monitoring management system 170.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), a vision processing unit (VPU), a Gaussian neural accelerator (GNA), hardware or software control logic, or any combination thereof. Additional components of the information handling system 100 may include one or more storage devices, one or more communications ports for communicating with external devices, as well as various input and output (I/O) devices 122, such as a keyboard, a mouse, a headset device, one or more microphones, one or more speakers, a touchpad, or any combination thereof. The information handling system 100 may also include various sensors 130 (e.g., Hall effect positional sensors, hinge rotation sensors, geographic locations sensors such as GPS systems, light sensors, time of flight sensors, infrared sensors, etc.). A power management unit 103 supplying power to the information handling system 100, via a battery 104 or an alternating current (A/C) power adapter 105 may also be included within information handling system 100, as well as one or more buses operable to transmit communications between the various hardware components. The information handling system 100 may further include a video display 120. The video display 120 in an embodiment may function as a liquid crystal display (LCD), an organic light emitting diode (OLED), a flat panel display, or a solid-state display. Portions of an information handling system 100 may themselves be considered information handling systems 100.

In an example embodiment, the information handling system 100 may include a laptop or desktop system that executes the MMCA 150 that may operate as a videoconferencing application. The MMCA 150 may include any computer code that is executed by a processor 102, or other processors of the information handling system 100 in order to decrease the processing load generated during capture, processing, and encoding of media samples for transmission, or during reprocessing, decoding, or display of received media samples, pursuant to execution of the MMCA 150. The multimedia framework pipeline and infrastructure platform 140 in an embodiment may execute code instructions to direct execution of specific processing and encoding of media samples for transmission, or direct execution of reprocessing, and decoding of received media samples.

The MMCA 150 in an embodiment may transmit to the multimedia framework pipeline and infrastructure platform 140 default settings for such processing, reprocessing, encoding, decoding, capture, and display (e.g., via bus 108). Such default settings may not be optimized, and may result in unnecessarily high processing burden at the information handling system 100. The intelligent appearance monitoring management system 170 in an embodiment may be executable code that may operate to determine optimized settings (e.g., optimized media capture instructions) at a transmitting information handling system (e.g., 100) for audio or video capture, optimized settings for execution of various AV processing instruction modules (e.g., optimized AV processing instruction adjustments) on audio or video samples captured using those optimized settings, or optimized settings (e.g., offload instruction adjustments) for the type of processor used to perform such executions, for example. The intelligent appearance monitoring management system 170 in an embodiment may generate optimized appearance filtering adjustments to generate notices to a user or to select changes to or modify various settings of various AV processing instruction modules among plural sets of media samples received from a transmitting information handling system during a video conference call in another embodiment.

The intelligent appearance monitoring management system 170 in an embodiment may include code instructions 174 for training a neural network, or for executing a neural network. In an embodiment in which the intelligent appearance monitoring management system 170 operates to train a neural network, the information handling system 100 may represent the transmitting information handling system, the receiving information handling system, both of these, or an information handling system located remotely from both the transmitting and receiving information handling systems.

The intelligent appearance monitoring management system 170 in each of these embodiments may gather various input values such as videoframes with images of the user, hardware and software settings, and other inputs as described herein from one or more information handling systems executing the MMCA (e.g., 150) over time in order to determine optimized appearance filtering adjustments for each of users of the one or more information handling systems where intelligent appearance monitoring service is selected by that user to intelligently monitor and adjust a user's appearance in the user's image in videoframes captured at each information handling system.

The multimedia processing control API 160 in an embodiment may operate to facilitate communication between various applications, controllers, and drivers of the information handling system 100 in an embodiment. For example, in an embodiment in which the neural network is trained remotely from the information handling system 100 (e.g., the information handling system represents a receiving information handling system or transmitting information handling system), the multimedia processing control API 160 may operate to gather input values for the neural network from the input/output driver 123, sensor driver 131, multimedia framework pipeline and infrastructure platform 140, processor 110, main memory 101, power management unit 103, network interface device 109, or MICA 150 (e.g., via bus 108). The multimedia processing control API 160 in such an embodiment may transmit such gathered inputs to the remotely located system for training the neural network via network interface device 109 and network 107 in embodiments in which the neural network is trained remotely from the information handling system 100. The trained neural network may then be executed in the same remote location, or may be transmitted to the information handling system 100 via network 107 for storage in main memory 101, static memory 102, or drive unit 106 (e.g., as instructions 174). In an embodiment in which the neural network is trained at the information handling system 100, the multimedia processing control API 160 may transmit the gathered inputs to the intelligent appearance monitoring management system 170 operating at the information handling system 100 (e.g., as instructions 174).

Upon execution of the trained neural network (e.g., as instructions 174) in an embodiment, and during execution of a user session via the MMCA 150, the multimedia processing control API 160 may gather current input values for the trained neural network in a similar manner as the training session. The multimedia processing control API 160 in such an embodiment may transmit such gathered inputs to the intelligent appearance monitoring management system (or agent) 170 executing the trained neural network (e.g., instructions 174).

The trained neural network may then output optimized appearance filtering adjustments that may include generating user notice of detected user appearance anomalies, or remediation adjustments such as optimized media capture instructions, optimized AV processing instruction adjustments, or optimized offload instructions to various drivers or applications via the multimedia processing control API 160 in response to detected user appearance anomalies. For example, an optimized media capture instruction may be transmitted (e.g., via bus 108) to the input/output driver 123 in an embodiment in which the input/output device 122 is a camera or microphone. In such an example embodiment, the input/output driver 123 may be a streaming media driver, a camera driver, one of a plurality of camera drivers, or an audio driver for a microphone. As another example, an optimized AV processing instruction adjustment or an optimized offload instruction may be transmitted (e.g., via bus 108) to the input/output driver 123 or to the multimedia framework pipeline and infrastructure platform 140. The trained neural network may perform such operations in an embodiment in which information handling system 100 is a transmitting information handling system, or in which information handling system 100 is a receiving information handling system.

In an embodiment in which the information handling system 100 represents a media capturing and transmitting information handling system, a camera operating as the input/output device 122 may capture video pursuant to the optimized media capture settings received at the streaming media driver or video driver operating as input/output driver 123. In another example of such an embodiment, a microphone operating as the input/output device 122 may capture audio pursuant to the optimized media capture settings received at the streaming media driver or audio driver operating as input/output driver 123. The video samples or audio samples so captured in an embodiment may be transmitted to the multimedia framework pipeline and infrastructure platform 140, which may apply one or more AV processing instruction modules defined by the received optimized AV processing instruction adjustments to the captured video or audio samples. The multimedia framework pipeline and infrastructure platform 140 in such an embodiment may engage the processor 110 (e.g., CPU, GPU, VPU, GNA) identified within the offload instructions to execute such AV processing instruction modules on the captured video or audio samples to generate a processed, encoded media sample combining the video and audio samples. By capturing and processing the audio and video samples using these optimized instructions, the intelligent appearance monitoring management system 170 may direct various components of the transmitting information handling system (e.g., 100) to use less CPU (e.g., 110) resources during such processing, and to decrease the streaming data size for the resulting media sample. The MMCA 150 may then direct transmission of the processed, encoded media sample to other information handling systems operated by other participants of the user session for the MMCA 150, via network interface device 109 and network 107.

In an embodiment in which the information handling system 100 represents a media playing and receiving information handling system, the network interface device 109 may receive a processed, encoded media sample from another information handling system operated by another participant of the user session for the MMCA 150, via network 107. For example, the MMCA 150 may access streaming media samples generated at an information handling system other than information handling system 100 at a Unique Resource Identifier (URI) within network 107, through the network interface device 109 and bus 108. The media samples so received in an embodiment may be transmitted to the multimedia framework pipeline and infrastructure platform 140, which may apply one or more AV processing instruction modules defined by the received optimized AV processing instruction adjustments to the received media sample. The multimedia framework pipeline and infrastructure platform 140 in such an embodiment may engage the processor 110 (e.g., CPU, GPU, VPU, GNA) identified within the offload instructions to execute such AV processing instruction modules on the received media sample to generate a reprocessed, decoded media sample. By reprocessing and decoding the received media sample using these optimized instructions, the intelligent appearance monitoring management system 170 may direct various components of the receiving information handling system (e.g., 100) to use less CPU (e.g., 110) resources during such reprocessing and decoding. The MMCA 150 may then direct playback of the reprocessed, decoded media sample via the display driver 121 and the video display 120.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

Information handling system 100 may include devices or modules that embody one or more of the devices or execute instructions for the one or more systems and modules described herein, and operates to perform one or more of the methods described herein. The information handling system 100 may execute code instructions 174 that may operate on servers or systems, remote data centers, or on-box in individual client information handling systems according to various embodiments herein. In some embodiments, it is understood any or all portions of code instructions 174 may operate on a plurality of information handling systems 100.

The information handling system 100 may include a processor 110 such as a CPU, GPU, VPU, GNA, control logic or some combination of the same. Any of the processing resources may operate to execute code that is either firmware or software code. Specifically, the processor 110 may operate to execute code instructions of firmware for the input/output driver 123, such as part of a streaming media driver, in an embodiment. Moreover, the information handling system 100 may include memory such as main memory 101, static memory 102, or other memory of computer readable medium 172 storing instructions 174 of the intelligent appearance monitoring management system 170 for optimizing execution of a user session of the MMCA 150, and drive unit 106 (volatile (e.g., random-access memory, etc.), nonvolatile memory (read-only memory, flash memory etc.) or any combination thereof. A processor 110 may further provide the information handling system with a system clock for which a time of day clock may be tracked along with any location detector such as global positioning system or in coordination with a network interface device 109 connecting to one or more networks 107. The information handling system 100 may also include one or more buses 108 operable to transmit communications between the various hardware components such as any combination of various input and output (I/O) devices 122, sensors 130, video display 120.

The network interface device 109 may provide wired or wireless connectivity to a network 107, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 109 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 109 may operate two or more wireless links. Network interface device 109 may also connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

The network interface device or NID 109 may operate to establish communication links under wired or wireless protocols enabling MMCA 150 communications for purposes of conducting a videoconference according to embodiments herein. Further, the NID may utilize other communication links under wired or wireless protocols to enable data communications for other operating applications of the information handling system 100. Additionally, the NID may utilize other communication links under wired or wireless protocols to enable data communications out of band and separate from the communication links for the videoconferencing session by the MMCA 150, such as communications to support the MMCA 150 or enable some or all parts of remote operation of the MMCA 150 or the intelligent appearance monitoring management system 170.

In some embodiments, software, firmware, dedicated hardware implementations such as application specific integrated circuits, programmable logic arrays and other hardware devices may be constructed to implement one or more of some systems and methods described herein. For example, some embodiments may include operation of embedded controllers for various applications or input/output devices 122.

Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 174 or receives and executes instructions, parameters, and profiles 174 responsive to a propagated signal, so that a device connected to a network 107 may communicate voice, video or data over the network 107. Further, the instructions 174 may be transmitted or received over the network 107 via the network interface device 109.

The information handling system 100 may include a set of instructions 174 that may be executed to cause the computer system to perform any one or more of the methods or computer-based functions disclosed herein. As an example, instructions 174 may execute an intelligent appearance monitoring management system 170, software agents, the MMCA 140, various APIs such as 160 or the multimedia framework pipeline and infrastructure platform that may provide a framework for the systems, or other aspects or components of the embodiments herein. Various software modules comprising application instructions 174 may be coordinated by an operating system (OS), and/or via an application programming interface (API). An example operating system may include Windows®, Android®, and other OS types. Example APIs may include Win 32, Core Java API, or Android APIs.

The disk drive unit 106 and the intelligent appearance monitoring management system 170 may include a computer-readable medium 172 in which one or more sets of instructions 174 such as software may be embedded. Similarly, main memory 101 and static memory 102 may also contain a computer-readable medium for storage of one or more sets of instructions, parameters, or profiles 174. The disk drive unit 106 and static memory 102 may also contain space for data storage. Further, the instructions 174 may embody one or more of the methods or logic as described herein. For example, instructions relating to the intelligent appearance monitoring management system 170, code instructions of a trained neural network, software algorithms, processes, and/or methods may be stored here. In a particular embodiment, the instructions, parameters, and profiles 174 may reside completely, or at least partially, within the main memory 101, the static memory 102, and/or within the disk drive 106 during execution by the processor 110 of information handling system 100. As explained, some of or all the intelligent appearance monitoring management system 170 may be executed locally or remotely. The main memory 101 and the processor 110 also may include computer-readable media.

Main memory 101 may contain computer-readable medium, such as RAM in an example embodiment. An example of main memory 101 includes random access memory (RAM) such as static RAM (SRAM), dynamic RAM (DRAM), non-volatile RAM (NV-RAM), or the like, read only memory (ROM), another type of memory, or a combination thereof. Static memory 102 may contain computer-readable medium (not shown), such as NOR or NAND flash memory in some example embodiments. The intelligent appearance monitoring management system 170 may be stored in static memory 102, or the drive unit 106 on a computer-readable medium 172 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may further include a power management unit (PMU) 103 (a.k.a. a power supply unit (PSU)). The PMU 103 may manage the power provided to the components of the information handling system 100 such as the processor 110 (e.g., CPU, GPU, VPU, GNA, etc.), a cooling system such as a bank of fans, one or more drive units 106, the video/graphic display device 120, and other components that may require power when a power button has been actuated by a user. In an embodiment, the PMU 103 may be electrically coupled to the bus 108 to provide this power. The PMU 103 may regulate power from a power source such as a battery 104 or A/C power adapter 105. In an embodiment, the battery 104 may be charged via the A/C power adapter 105 and provide power the to the components of the information handling system 100 when A/C power from the A/C power adapter 105 is removed.

The information handling system 100 may also include the intelligent appearance monitoring management system 170 that may be operably connected to the bus 108. The intelligent appearance monitoring management system 170 computer readable medium 172 may also contain space for data storage. The intelligent appearance monitoring management system 170 may, according to the present description, be executable code to perform tasks related to generating optimized appearance filtering adjustments to intelligently monitor or adjust a user's appearance during capture, processing, encoding, reprocessing, decoding, and playback of media samples captured or played back during execution of a user session of the MMCA 150. The intelligent appearance monitoring management system 170 in an embodiment may execute code instructions of a trained neural network to determine an output for optimized appearance filtering adjustments that may involve generating notifications to a user, optimized media capture setting adjustments, optimized AV processing instruction adjustments, or offload instructions adjustments for achieving this goal. In such an embodiment, the intelligent appearance monitoring management system 170 may have a convolutional neural network that is trained by receiving, as training input, training images of a user as appearance reference, and performance hardware or software metrics for one or more information handling systems, including information handling system 100, and session meeting metrics describing user sessions of the MMCA 150 previously executed across one or more information handling systems.

In an embodiment, the intelligent appearance monitoring management system 170 may be code instructions and operate with the main memory 101, the processor 110, the multimedia processing control API 160, various embedded controllers and the NID 109 via bus 108, and several forms of communication may be used, including ACPI, SMBus, a 24 MHZ BFSK-coded transmission channel, or shared memory. Driver software, firmware, controllers, and the like may communicate with applications on the information handling system 100.

Keyboard or touchpad driver software, firmware, controllers and the like may communicate with applications on the information handling system 100, for example via the input/output driver 123, which may be a streaming media driver or other drivers for I/O devices, or the sensor driver 131. Similarly, video display driver software, firmware, controllers and the like may communicate with applications on the information handling system 100, for example, via the display driver 121. In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
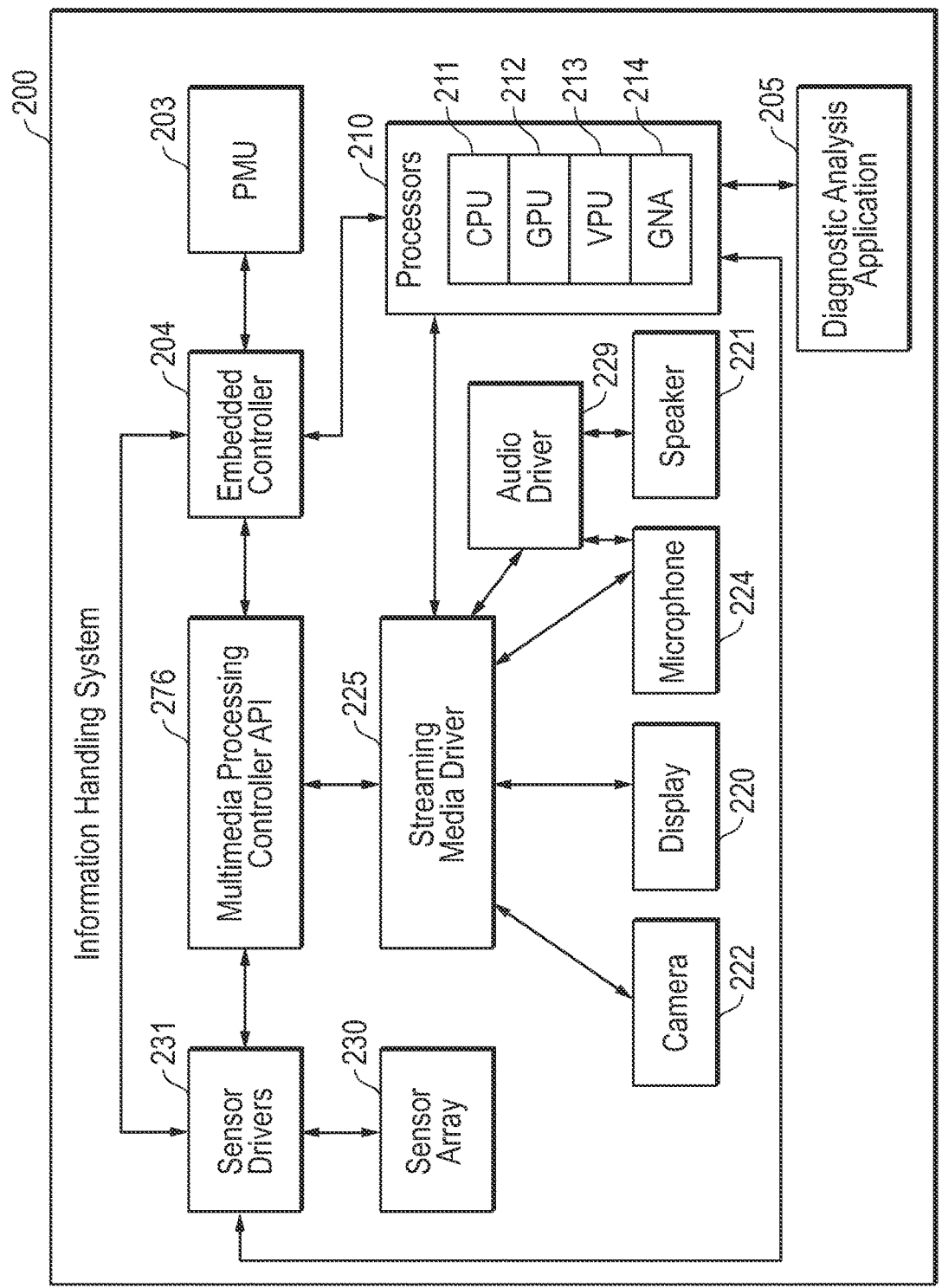
FIG. 2 is a block diagram illustrating various drivers and processors in communication with a plurality of peripheral devices of an information handling system according to an embodiment of the present disclosure.

FIG. 2 is a block diagram illustrating various drivers and processors in communication with a plurality of peripheral devices, software applications, and one or more processors according to an embodiment of the present disclosure. As described herein, the intelligent appearance monitoring management system may intelligently monitor or adjust a user's appearance in captured videoframes for a videoconference application and may optimize various settings for peripheral devices used in the capture of media samples played during user sessions for a MMCA. The intelligent appearance monitoring management system may also modify media capture settings, AV processing instruction modules applied to post process such captured media samples, or the type of processor used to perform such AV processing instruction modules in order to make adjustments to a user image in a videoframe and optimize performance of the MMCA on one or more information handling systems in an embodiment.

A neural network of the intelligent appearance monitoring management system in an embodiment may make such appearance monitoring and optimization determinations for each user of an individual information handling system (e.g., 200) separately. Such a determination may be made based upon a plurality of inputs including captured images of a user, data describing hardware and software capabilities and performance metrics of the information handling system at issue, default media capture instructions and default AV processing instruction module settings generated by the MMCA, various sensor readings taken at the information handling system, and meeting metrics describing user participation and performance of the MMCA.

These neural network input values may be gathered from a plurality of sensors, peripheral devices, and diagnostic applications. For example, hardware performance metrics describing total processing load at one or more processors 210 may be gathered via an embedded controller 204 in an embodiment. The embedded controller 204 may also gather information describing state of charge for a power management unit 203, which may include a battery and an AC adapter, as described with reference to FIG. 1. Such state of charge information may be gathered by the embedded controller 204 in an embodiment while the information handling system 200 is operating solely on battery power, and when the PMU 203 is receiving power via the AC adapter. The embedded controller 204 in an embodiment may gather such metrics through direct communication with the processor 210 (e.g., CPU, GPU, VPU, GNA, etc.) and with the power management unit (PMU) 203. In some embodiments, such communication may occur in kernel mode.

As described in greater detail with reference to FIG. 5, the intelligent appearance monitoring management system may be integrated, in whole or in part, in some embodiments within an information handling system performance optimizer application located remotely from the information handling system 200. In such an embodiment, the information handling system performance optimizer application may operate to manage security credentials, connectivity credentials, performance optimization, software updates, and other various routine computing maintenance tasks for a plurality of information handling systems (e.g., including 200) owned by an enterprise business or produced by a single manufacturer. The Dell® Optimizer® software application is one example of such an information handling system performance optimizer application. The information handling system performance optimizer application in such an embodiment may communicate with the embedded controller 204 to receive high-level hardware performance metrics from each of the plurality of information handling systems (e.g., including 200) it manages during routine out-of-band communications between the information handling system performance optimizer application and all managed information handling systems. Such out-of-band communications with the embedded controller 204 in an embodiment may be used to check security credentials or performance statistics for the information handling systems (e.g., 200), or to push software or firmware updates to the information handling systems, for example. During such routine maintenance, the information handling system performance optimizer application may accumulate, sort, and analyze all performance metrics received from all managed information handling systems (e.g., 200), including processing load across all available processors 210 (e.g., CPU, GPU, VPU, GNA), default settings associating specific processors (e.g., 210) with specific tasks, or state of remaining charge of the battery incorporated within the PMU 203, for example. Out-of-band communications initiated in such a way between the embedded controller 204 and the information handling system performance optimizer application may be via a wireless network such as Wi-Fi or cellular, or via wired connection. Such out-of-band communications operate without need for Operating System intervention or function and may operate behind the scenes to ensure optimized appearance measures such as generating or transmitting user appearance anomaly notification messages or videoframe user image adjustment functions for managed information handling systems in some embodiments such as when the intelligent appearance monitoring management system operates in whole or in part as a remote service from the user's information handling system.

As another example of gathering inputs for a neural network of the intelligent appearance monitoring management system, software performance metrics may be generated at a diagnostic analysis application 205, based at least in part on communication between the diagnostic analysis application 205 and the processor 210. Such a diagnostic analysis application 205 may operate to gather metrics describing CPU usage or load, as well as a breakdown of the CPU usage attributable to each of a plurality of applications (e.g., including a MMCA) running via the operating system of the information handling system 200. In some embodiments, the diagnostic analysis application 205 may provide similar metrics for other types of processors for the information handling system, including, for example, a graphics processing unit (GPU), vision processing unit (VPU), or gaussian neural accelerator (GNA). One example of such a diagnostic analysis application 205 in an embodiment may include the Microsoft® Diagnostic Data Viewer® software application. As described in greater detail with respect to FIG. 5, these software performance metrics may be generated at the diagnostic analysis application 205 and transmitted to the neural network of the intelligent appearance monitoring management system via multimedia processing controller API 276 for determination if any optimized appearance filtering adjustments may cause involved AV processing instruction modules or other AV processing instruction modules to be better executed at an alternative processor.

In yet another example of gathering inputs for a neural network of the intelligent appearance monitoring management system, various sensor readings may be taken by the information handling system 200 and communicated to the intelligent appearance monitoring management system. More specifically, the information handling system 200 may include one or more sensors within a sensor array 230. Such sensors may include, for example, an ambient light sensor or a color sensor as well as other sensors of the information handling system that may be relevant to operation of the MMCA (e.g., a hall effect sensor or hinge rotation sensor, accelerometer, gyroscope, orientation sensor, light sensors, IR cameras, etc.).

Other examples of sensors within the sensor array 230 may include light sensors, infrared (IR) cameras, or geographic position sensors (e.g., GPS units). In some embodiments, one or more modules of the network interface device described with reference to FIG. 1 may constitute one of the sensors within the sensor array 230. For example, a GPS module may determine GPS coordinates for location of an information handling system. In another example, an antenna front end system of the network interface device may operate to determine location based on connection to one or more Wi-Fi networks or cellular networks. The GPS coordinates or other location identification of the information handling system 200 and identification of one or more Wi-Fi networks or cellular networks to which the information handling system 200 connects may constitute sensor readings gathered at the sensor drivers 231 in an embodiment. All sensor readings from sensors within the sensor array 230 in an embodiment may be transmitted to the sensor drivers 231. As described in greater detail with respect to FIG. 5, these sensor readings may be transmitted from the sensor drivers 231 to the neural network of the intelligent appearance monitoring management system via the processor 210 and a multimedia processing controller API 276. Location sensors may indicate home or office use of an information handling system to assist in determining whether a videoconference call is a business meeting or a casual event, along with assessment of invited participants, to determine in some embodiments a type of optimized appearance filter adjustment that may be output by the intelligent appearance monitoring management system executing a trained neural network.

In still another example of gathering inputs for a neural network of the intelligent appearance monitoring management system, default media capture instructions and default AV processing instruction module settings may be gathered via a streaming media driver 225 and transmitted to the intelligent appearance monitoring management system. Default media capture instructions in an embodiment may be generated by the MMCA, or may be preset by the manufacturer of the camera, microphone, or information handling system 200. It is contemplated that any media capture instructions directing the capture by the camera of images or video or directing the capture by the microphone of audio that do not constitute optimized media capture instructions generated based on the output of the neural network described herein may constitute default media capture instructions. Such default media capture instructions and optimized media capture instructions may dictate the method by which such audio, image, and video samples are captured. For example, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples.

It is contemplated that the information handling system 200 may include one or more cameras 222 (e.g., one camera for each of a plurality of videoconferencing displays oriented at different angles to a user), one or more displays (e.g., 220), one or more speakers 221, or one or more microphones 224. The streaming media driver 225 in an embodiment may be capable of gathering the default or current media capture settings pursuant to which the camera 222 or microphone 224 are capturing images and audio, respectively. The streaming media driver 225 may also gather audio samples recorded at the microphone 224 as another input into the neural network. For example, such audio samples may be used in some embodiments in order to determine the frequency with which the user of the information handling system 200 is talking during a user session of the MMCA in that when a user is talking the video feed of the MMCA may focus on the speaker. Such a frequency may be input into the neural network in embodiments to gauge intelligent appearance monitoring and adjustment levels in a current user videoconference session based on user participation in some example embodiments.

In some embodiments, default media capture instructions may be stored at the streaming media driver 225, which may operate to direct operation of the camera 222 or microphone 224. As described in greater detail with respect to FIG. 5, these default media capture instructions may be transmitted from the streaming media driver 225 to the neural network of the intelligent appearance monitoring management system via multimedia processing controller API 276.

Upon determination of optimized appearance filtering adjustments such as optimized media capture instructions, offload instructions, or AV processing instruction adjustments via the neural network of the intelligent appearance monitoring management system, these optimized media capture instructions may be transmitted to various components of the information handling system 200. For example, as described in greater detail with respect to FIG. 5, the intelligent appearance monitoring management system may transmit optimized appearance filtering adjustments such as an instruction to generate a user appearance anomaly indication message or the optimized media capture instruction adjustments, offload instruction adjustments or optimized AV processing instruction adjustments generated as an output of the neural network to a multimedia processing control API 276. Such a multimedia processing control API 276 in an embodiment may transmit the optimized media capture instructions to the streaming media driver 225 in one embodiment.

The streaming media driver 225 in an example embodiment may direct the operation of the camera 222 and the microphone 224 such that media (e.g., images, video samples, audio samples) is captured according to the optimized media capture instructions that may be altered for an optimized appearance filtering adjustment to the image of a user. For example, the streaming media driver 225 in an embodiment may direct the camera 222 to capture images and generate video samples having the frames per second, zoom settings, pan settings, or number of key frames defined by the optimized media capture instructions. As another example, the streaming media driver 225 in an embodiment may direct the microphone 224 to capture and generate audio samples having the bitrate defined by the optimized media capture instructions. In such a way, the intelligent appearance monitoring management system in an embodiment may optimize capture of media samples to optimize intelligent appearance monitoring or adjustment of videoconference sessions by the MMCA.

Figure 3:
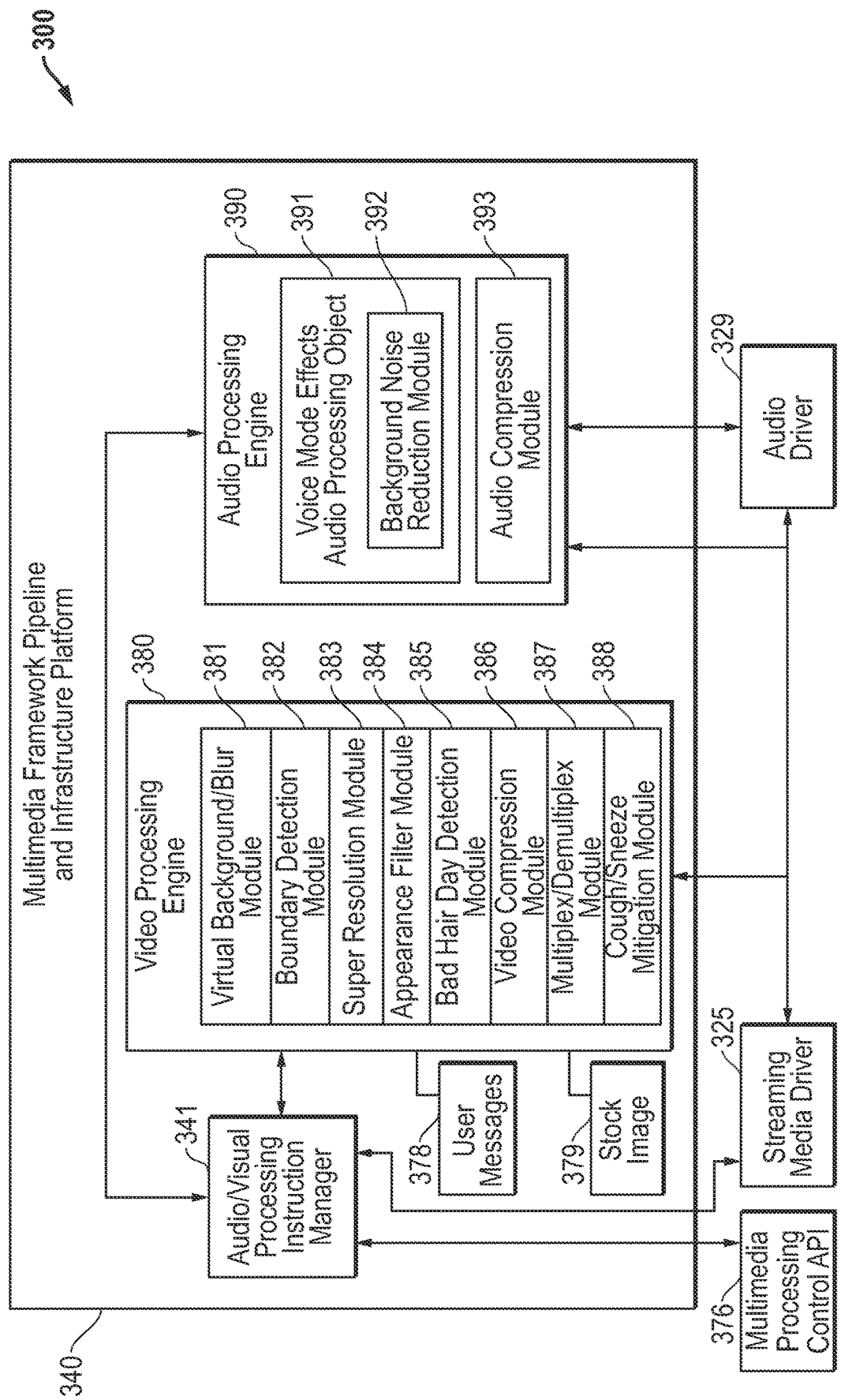
FIG. 3 is a block diagram illustrating a multimedia framework pipeline and infrastructure platform of an information handling system according to an embodiment of the present disclosure.

FIG. 3 is a block diagram illustrating a multimedia framework pipeline and infrastructure platform in communication with a plurality of drivers in order to process received media samples according to an embodiment of the present disclosure. As described herein, the intelligent appearance monitoring management system may optimize various settings for processing of media samples captured at or received by an information handling system, during execution of user sessions for a MMCA. The intelligent appearance monitoring management system may optimize such settings in order intelligently monitor or adjust user appearance in videoframes captured by the MMCA in an embodiment.

The multimedia framework pipeline and infrastructure platform 340 may process media samples captured at the information handling system executing the multimedia framework pipeline and infrastructure platform 340 in one aspect of an embodiment. An example of such a multimedia framework pipeline and infrastructure platform 340 may include the Microsoft® Media Foundation Platform® for Windows®. The multimedia framework pipeline and infrastructure platform 340 in an embodiment may manage audio and video playback quality, interoperability, content protection, and digital rights management. The multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

The multimedia framework pipeline and infrastructure platform 340 in an embodiment may include an audio/visual (AV) processing instruction manager 341, a video processing engine 380, and an audio processing engine 390. The video processing engine 380 and audio processing engine 390 may each perform AV processing methods or algorithms to transform media samples. Several of such methods may be performed serially to transform a single media sample in an embodiment, such as via a chaining algorithm. The AV processing instruction manager 341 in an embodiment may schedule or otherwise management performance of each of these methods, in turn.

In one aspect of an embodiment, a camera or microphone operably connected to the information handling system 300 may operate as the media source. In such an embodiment, the AV processing instruction manager 341 in an embodiment may operate to retrieve a media sample from a media source, based on a media capture instruction. The AV processing instruction manager 341 may transmit a media capture instruction to the streaming media driver 325 in an embodiment. As described in greater detail with respect to FIG. 5, the multimedia framework pipeline and infrastructure platform 340 may also be in communication with the MICA and a multimedia processing control API 376. Via such communications, the multimedia framework pipeline and infrastructure platform 340 may receive default media capture instructions from the MMCA. The multimedia framework pipeline and infrastructure platform 340 may also receive optimized media capture instructions from the trained intelligent appearance monitoring management system via the multimedia processing control API 376. As such, the media capture instructions communicated from the AV processing instruction manager 341 to the streaming media driver 325 in an embodiment may include default media capture instructions or optimized media capture instructions when the trained intelligent appearance monitoring management system is operating to improve information handling system performance.

The streaming media driver 324 in such an embodiment may receive video or audio samples captured by peripheral cameras or microphones in communication therewith, according to default or optimized media capture instructions, as described with reference to FIG. 2. In another embodiment, the audio driver 329 may receive audio samples captured by a microphone in communication therewith, according to such received media capture instructions. In such an embodiment, the audio driver 329 may operate as a mini-driver or child device to the parent device streaming media driver 324. The streaming media driver 325 may be in communication with the AV processing instruction manager 341 via one or more ports (e.g., as described in greater detail with respect to the device proxy 442 of FIG. 4) such that video or audio samples received by the streaming media driver 325 may be transmitted to the AV processing instruction manager 341 in an embodiment. The audio driver 329 may be in communication with the AV processing instruction manager 341 such that audio samples received by the audio driver 329 may be transmitted to the AV processing instruction manager 341 (e.g., via the audio processing engine 390, or via the streaming media driver 325) in an embodiment. In such a way, the AV processing instruction manager 341 may direct retrieval of a video sample captured at a camera operably connected to information handling system 300 and retrieval of an audio sample captured at a microphone operably connected to information handling system 300.

In another aspect of an embodiment, an information handling system in communication with the information handling system 300 over a network (e.g., world wide web) may operate as the media source. This remote information handling system may be participating in the same user session of the MMCA as the information handling system 300 in an embodiment. In such an embodiment, the MMCA at the information handling system 300 may access streaming media samples via a Unique Resource Identifier (URI) defined by the MMCA, through the network interface device (e.g., as described with reference to FIG. 1). The MMCA in such an embodiment may then transmit the retrieved media sample (e.g., as generated at a remote information handling system) to the multimedia framework pipeline and infrastructure platform for reprocessing, and decoding. In such a way, the AV processing instruction manager 341 of the multimedia framework pipeline and infrastructure platform 341 in an embodiment may retrieve or receive a media sample that has been captured, processed, and encoded at a remote information handling system, such as video or audio of other participants in a video conference.

As described herein, the multimedia framework pipeline and infrastructure platform 340 may also operate to perform one or more processing methods on the retrieved audio and video samples coming from another video conference participant. The AV processing instruction manager 341 in an embodiment may operate to apply one or more AV processing instruction modules to the retrieved sample. The AV processing instruction manager 341 may direct whether or the order in which various AV processing instruction modules, are employed on media samples. The video processing engine 380 may operate to apply one or more video processing AV processing instruction modules to a video sample, each implemented by a separate module, according to execution instructions received from the AV processing instruction manager 341. The audio processing engine 390 may operate to apply one or more audio processing AV processing instruction modules to an audio sample, each implemented by a separate audio processing object, according to execution instructions received from the AV processing instruction manager 341.

In an embodiment in which the camera or microphone operably connected to the information handling system 300 operates as the media source, the one or more AV processing instruction modules may include application of a codec to compress each of the audio sample and the video sample as required for transmission of media samples across the internet, and playback of those media samples by a MMCA, and a multiplexer to coalesce the compressed audio sample and compressed video sample into a processed, encoded (e.g., by a codec) media sample. Other processing methods in an embodiment may be dictated by one or more features of the MMCA, or optimized instructions received from the intelligent appearance monitoring management system, as described herein.

The video processing engine 380 may operate at the direction of the AV processing instruction manager 341 to perform one or more of the algorithms associated with the plurality of modules within the video processing engine 380. Several AV processing instruction modules are contemplated for execution during operation of the MMCA including several not depicted in FIG. 3 such as an eye contact correction module to operate in an embodiment in which multiple video media samples are captured from a plurality of cameras, user framing module operating to identify a user's face and center the face within the captured videoframes, user zoom modules to select an appropriate zoom level on the user image in the videoframe based on distance from a camera, a zoom and face normalizer module that operate to crop, enlarge, or scale down various captured images constituted the captured video sample to normalize the size of the user's face across each of the captured images, shading adjustment modules, color blending modules, and others.

In embodiments herein, the video processing engine 380 may receive one or more output optimized appearance filtering adjustments from a trained intelligent appearance monitoring management system neural network for generating a user notification message 378 to indicate detection of a user appearance anomaly. These may include generating one or more user-directed messages 378 displayed to a user indicating that one or more types of user appearance anomalies have been detected by the intelligent appearance monitoring system. Such messages 378 may be generated by the intelligent appearance monitoring system in some embodiments or may be stored in whole or in part in a database memory by the intelligent appearance monitoring system. The user messages 378 may be accessible to the video processing engine 380 for display on the display screen of a user's information handling system for example. The user messages 378 may include a still image of a videoframe and generate an indicator on the still image of the identified user appearance anomaly for display with the user message in one example embodiment. In another example embodiment, the user messages 378 may also be generated with a user interface or selection soft button to request feedback about whether to apply additional user image remediation measures to alter, correct, or replace a user's image in captured videoframes or which remediation measures to apply selected from a set of options. In another embodiment, user image remediation measure to alter, correct, replace a user's image may be implemented immediately, and the user notification message 378 may solicit feedback from a user about whether to terminate user image remediation, to turn off the video camera, or other user feedback. This user feedback may be provided in some embodiments to the trained intelligent appearance monitoring management system neural network.

In other embodiments herein, the video processing engine 380 may receive one or more output optimized appearance filtering adjustments from a trained intelligent appearance monitoring management system neural network for causing an alteration to the user's image in captured video frames in response to detection of a user appearance anomaly. In an example embodiment, the intelligent appearance monitoring system may capture or seek approval for a stock image 379 via a user interface to be used in replacing the videoframes in response to the trained intelligent appearance monitoring management system neural network detecting a user appearance anomaly. The intelligent appearance monitoring system may store such stock image or stock images 379 in a memory accessible by the video processing engine 380.

In yet other embodiments, the video processing engine 380 may receive one or more output optimized appearance filtering adjustments from a trained intelligent appearance monitoring management system neural network to alter a user's image by invoking one or more AV processing instruction modules, such as 381-385, 388 or other AV processing instruction modules to process the captured videoframes as discussed below. Additionally, the video processing engine 380 may also invoke or execute instructions of one or more AV processing instruction modules 381-388 or others not shown when conducting a videoconference session via the MMCA, whether or not an intelligent appearance monitoring management system is executing as well in various embodiments herein.

As shown in FIG. 3 for example, a virtual background generation or blur module 381 in an embodiment may operate in an embodiment in which a user selects a virtual background or selects to blur a portion of the video frame. In some embodiments, a virtual background or blur of background portions of an image may be applied for privacy reasons or other reasons to allow a user to determine what is seen behind the user while speaking. In an example embodiment, a user boundary detection module 382 may be used to identify which portion of the videoframe is the user and which portion is background. The virtual background generation module or background blur module 381 may be used in some embodiments to blur or overlay a virtual background image on the background portion of the videoframe around the image of the user.

In other embodiments, the virtual background generation or blur module may be utilized to overlay an image or to blur the portion of the videoframe that is identified as the user. For example, one type of optimized appearance filtering adjustment output from a trained intelligent appearance monitoring management system neural network may be an image adjustment instruction to blur some or all of the image of the user in the videoframe in response to detecting a user appearance anomaly in the videoframes. In response to a detected cough or sneeze event in an example embodiment, the trained intelligent appearance monitoring management system neural network may output an optimized appearance filtering adjustment to alter an image of the user in videoframes by blurring the portion of the videoframe that is the user image portion. The user image blurring in the videoframes may be ongoing, may last for a preset duration of time, or may last while the user appearance anomaly (i.e., the cough or sneeze) lasts. In another aspect, the virtual background generation module or background blur module 381 may overlay an image or blank color on some or all of the user's image in the videoframe in an embodiment to mask the user when a user appearance anomaly is detected by the trained intelligent appearance monitoring management system neural network. Such adjustments to the image of the user in the videoframes may be a user image adjustment as an optimized appearance filtering adjustment from the trained neural network output. An output AV processing instruction adjustment may be output from the trained neural network to adjust or invoke processing of the videoframes captured during a videoconference session as described.

The boundary detection module 382 in an embodiment may operate to identify a user's image boundary, including for identification of a user's head, face, hair, and body, as described above for several purposes. Such boundary detection may be used for overlaying a virtual background image/blur on the background portion of the videoframes around the user boundary in some embodiments. As described, the boundary detection module may also be used to determine the location of the user for application of blur or another image or color on some or all of the user's image portion of the videoframes. In yet another embodiment, the boundary detection module 382 may detect the user's face, head or body boundaries to identify the user's face, hair or the like within each captured image making up the video sample. In this way, that portion of the image may input to the trained neural network for identification of user appearance anomalies.

In an embodiment, the super resolution module 383 may recover a high-resolution image from a low-resolution image, using a known degradation function. Such a super resolution module 383 may be used to blend or smooth the user image within a videoframe which may help to correct or reduce noticeability of a detected user appearance anomaly in some embodiments. In another embodiment, an appearance filter module 383 may be used to apply post-processing such as application of a convolutional neural network to correct the existence of a mark from a blemish or smudge on a user's face detected as a user appearance anomaly in an example embodiment. The appearance filter module may blend surrounding pixel colors or texture over the blemish, smudge or other mark and track such a correction on the image of the user during processing videoframes. A bad hair day detection module 385 may be implemented to determine location of the hair of a user's image, possibly in conjunction with a boundary detection module 382, to identify the hair of a user in a videoframe and, if a user appearance anomaly is detected by the trained intelligent appearance monitoring management system neural network, an output may be issued as an optimized appearance filtering adjustment. For example, an optimized appearance filtering adjustment may include an instruction to a user that his hair seems out of place and may need to be addressed in one embodiment. In another example embodiment, the optimized appearance filtering adjustment may include an AV processing instruction adjustment to one or more AV processing instruction modules to replace captured video frames with a stock image 378 of the user or another object. In another example embodiment, the optimized appearance filtering adjustment may include an AV processing instruction adjustment to one or more AV processing instruction modules such as one that may overlay a cartoon representation of the user and/or background for display over the captured video frames. In yet another embodiment, the optimized appearance filtering adjustment may include an AV processing instruction adjustment to one or more AV processing instruction modules such as a virtual background or blur module 381 to cover or blur some or all of the identified hair issue in the processed videoframes for transmission. Other optimized appearance filtering adjustments that are AV processing instruction adjustment to one or more AV processing instruction modules are contemplated for various other types of adjusting a user image appearance in the videoframes of a videoconference session.

Another module may be a cough/sneeze mitigation module 388 that may operate via image recognition cues via a convolutional neural network assessment for movement or facial expressions that indicate a user appearance anomaly that is a sneeze or a cough event when input to the trained intelligent appearance monitoring management system neural network. An optimized appearance filtering adjustment output from the trained neural network may invoke one or more AV processing instruction modules to blur the user's image, replace the user's image, cover the user's image or somehow otherwise alter the user's image in the videoframes during the sneeze or cough or for a period of time thereafter.

Other modules not shown in FIG. 3 may apply further AV processing instruction modules to video samples in some embodiments. For example, a boundary detection module may operate to detect the boundaries of the user within each captured image of a captured video sample, and a virtual background module may apply a virtual background around the detected user boundary. It is contemplated other AV processing instruction modules known in the art may also be employed, such as a hand detection algorithm, for example.

The compression module 386 in an embodiment may perform one or more algorithms or digital transforms to compress or decompress the received and processed video sample. Various compression algorithms may be employed in various embodiments. In some embodiments, the compression algorithm used may conform to one or more standards, selected or identified for use by the MMCA. For example, the MMCA may require all media samples transmitted to sinks (e.g., Universal Resource Identifiers or URIs) accessible by various agents or APIs of the MMCA executing across a plurality of information handling systems, adhere to the Motion Picture Experts Group 4 (MPEG-4) standard established by a Joint Technical Committee (JTC) of the International Organization for Standardization and International Electrotechnical Commission (IOS/IEC). This is only one example of a standard required by the MMCAs in an embodiment, and is meant to be illustrative rather than limiting. It is contemplated the video processing engine 380 in an embodiment may include various modules for encoding or decoding video samples or media samples using any known, or later developed standards.

The MPEG-4 standard may define one or more algorithms or AV processing instruction modules (e.g., reduced-complexity integer discrete cosine transform) that may be used to compress and decompress video samples or audio samples. For example, the H.264 Advanced Video Coding (AVC), defined by part 10 of the MPEG-4 standard is the most widely used codec by video developers. Other video compression algorithms available under the MPEG-4 standard may also define 3D graphics compression (e.g., part 25), web video coding (e.g., part 29), internet video coding (e.g., part 33), and video coding for browsers (e.g., part 31). Each of these compression algorithms may be associated with different processing requirements for coding or decoding streaming media data in an embodiment. For example, the H.264 compression algorithm may require more processing resources than the video coding for browsers compression algorithm. Thus, the load placed on the processor executing such algorithms in an embodiment may be increased or decreased by choosing one of these compression algorithms over another.

Upon application of all other AV processing instruction modules to be applied in an embodiment, the multiplex module 387 may combine or coalesce the processed video sample and the processed audio sample into a single, processed and encoded (e.g., via the video compression module 386) media sample for transmission. The same, similar, or complimentary AV processing instruction modules may be performed on remotely captured media samples received at the information handling system 300 for demultiplexing, decoding, and display or presentation on the information handling system 300, as described in greater detail below. The AV processing instruction modules 381-388 and others not shown in FIG. 3 may comprise machine executable code instructions executing at various controllers or processors of the information handling system 300. Any one or more of these AV processing instruction modules may be routinely applied pursuant to instructions received from the MICA (e.g., boundary detection, virtual background) and may be applied to a captured video sample in an embodiment. Further, each of the algorithms executed by these AV processing instruction modules may be implemented in any order. In some embodiments, one or more of the algorithms executed by these modules require a particular order.

The audio processing engine 390 may operate to process audio samples, and may include, for example, a voice mode effects audio processing object 391 and an audio compression module 393. The audio compression module 393 in an embodiment may apply a compression algorithm or codec to the captured audio sample to compress it. Several audio codecs may be used under part 3 of the MPEG-4 standard, including Advanced Audio Coding (AAC), Audio Lossless Coding (ALS), and Scalable Lossless Coding (SLS), among others. As with the video compression algorithms described directly above, each of these audio compression algorithms may be associated with different processing requirements for coding or decoding streaming audio samples in an embodiment. Thus, the choice of audio compression algorithm may affect load placed on the processor executing such algorithms in an embodiment.

The voice mode effects audio processing object 391 in an embodiment may include modules for application of other digital signal processing effects, including, for example, a background noise reduction module 392. In an embodiment, the background noise reduction module 392 may operate to isolate the user's voice from surrounding background noise and either amplify the user's voice, or reduce or remove the background noise. In other embodiments, the voice mode effects audio processing object 391 may include other modules for further digital signal processing effects, including voice modulation, graphic equalization, reverb adjustment, tremolo adjustment, acoustic echo cancellation, or automatic gain control. It is contemplated any known or later developed digital signal processing effects commonly used in MMCAs may also be executed as one or more modules within the voice mode effects audio processing object 391 in various embodiments. Any one or more of these voice mode effects audio process object modules (e.g., 392) may be applied to a captured audio signal in an embodiment. An example embodiment, one type of optimized appearance filtering adjustment output from a trained intelligent appearance monitoring management system neural network may be an audio adjustment instruction to mute some or all of the audio data of the user in the videoframe in response to detecting a user appearance anomaly in the videoframes. In response to a detected cough or sneeze in one example embodiment, the trained intelligent appearance monitoring management system neural network may output an optimized appearance filtering adjustment to alter the audio data by an AV processing instruction adjustment to an audio process object module 392 to mute the audio of the user in videoframes such as when a cough or sneeze is detected. The audio data mute for the associated videoframes may be ongoing, may last for a preset duration of time, or may last while the user appearance anomaly (i.e., the cough or sneeze) lasts in various embodiments.

In other embodiments, the audio processing engine 390 may perform compression of the audio sample via the audio compression module 393. As described directly above, following processing and encoding or compression of the audio sample in such a way, the AV processing instruction manager 341 may instruct the video processing engine 381 to multiplex or combine the processed and encoded video sample with the processed and encoded audio sample to generate a processed and encoded media sample. In such a way, the video processing engine 380 and audio processing engine 390, operating pursuant to execution instructions received from the AV processing instruction manager 341, may combine an audio sample with a video sample, both captured at the information handling system 300, into a single, processed and encoded media sample, such that the processed and encoded media sample may be transmitted or streamed to other information handling systems via a network (e.g., the world wide web).

In an embodiment in which the media source is a URI enabling access to a streaming media sample generated from a remote information handling system engaged in the same user session of the MMCA, the AV processing instruction manager 341 may direct the performance by the video processing engine 380 or the audio processing engine 390 of demultiplexing the received media sample into an encoded audio sample and an encoded video sample. For example, the AV processing instruction manager 341 may direct the demultiplex module 386 of the video processing engine 380 to demultiplex or split the audio sample from the video sample within the received media sample. This may be referred to herein as "reprocessing" the received media sample. Upon demultiplexing, the AV processing instruction manager 341 may instruct the video processing engine 380 to perform one or more further AV processing instruction modules on the demultiplexed video sample. For example, the video compression module 381 may decode or decompress the demultiplexed video sample into a format that may be transmitted via the streaming media driver 325 to a digital display for playback. In other embodiments, one or more of the other modules may also perform similar or identical algorithms to those described above with respect to video samples captured at the information handling system 300. The AV processing instruction manager 341 may also instruct the audio processing engine 390 to perform one or more further AV processing instruction modules on the demultiplexed audio sample in an embodiment.

As also described herein, the multimedia framework pipeline and infrastructure platform 340 may operate to transmit a media sample to a media sink. In an embodiment in which the camera or microphone operably connected to the information handling system 300 operates as the media source, an information handling system located remotely from information handling system 300 and engaged in the same user session for the MMCA as information handling system 300 may operate as the media sink. In such an embodiment, the multimedia framework pipeline and infrastructure platform 340 may stream the processed and encoded media sample over a network (e.g., world wide web) via a URI defined by the MMCA, such that a plurality of other information handling systems engaged in the same user session for the MMCA may access the streaming media sample.

In an embodiment in which the media source is a URI enabling access to a streaming media sample generated from a remote information handling system engaged in the same user session of the MMCA, the digital display of information handling system 300 may operate as the media sink. In such an embodiment, the video sample demultiplexed and decoded from the processed and encoded media sample retrieved from the URI defined by the MMCA may be transmitted to the streaming media driver 325 for playback of the video via the digital display of the information handling system 300 (e.g., as described in greater detail with reference to FIG. 6). In another aspect of such an embodiment, the audio sample demultiplexed and decoded from the processed and encoded media sample retrieved from the URI defined by the MMCA may be transmitted to the streaming media driver 325 for playback of the video via an operably connected speaker of the information handling system 300 (e.g., as described in greater detail with reference to FIG. 6). In such a way, the multimedia framework pipeline and infrastructure platform 340 may operate to retrieve audio and video samples from a media source, perform one or more processing methods on the retrieved audio and video samples, multiplex the audio and video samples together to form a processed media sample, and transmit the processed media sample to a media sink.

Figure 4:
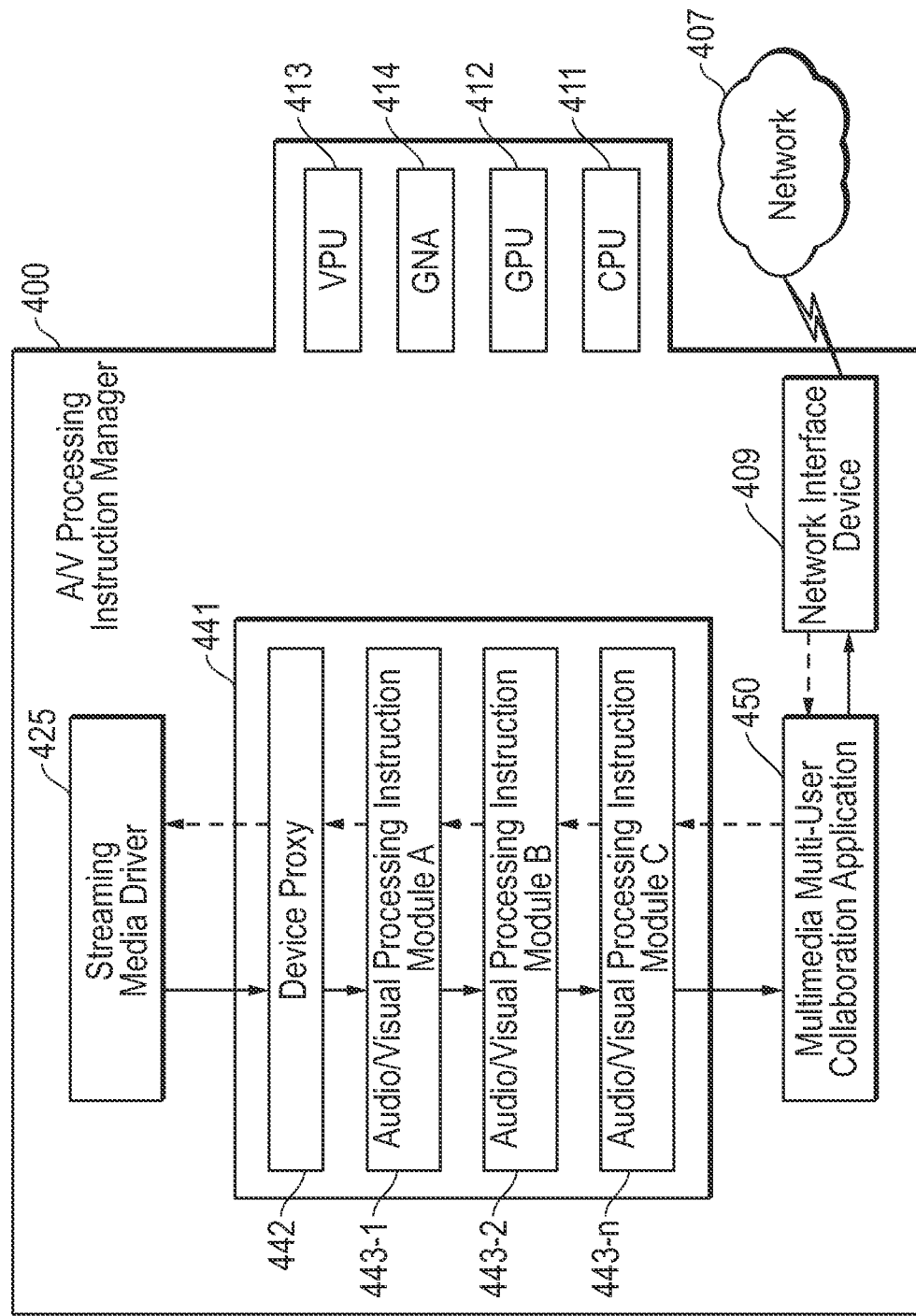
FIG. 4 is a block diagram illustrating audio/visual (AV) processing instruction manager for optimizing information handling system operation of a multimedia, multi-user collaboration application according to an embodiment of the present disclosure.

FIG. 4 is a block diagram illustrating an AV processing instruction manager operating to process media samples transmitted between a streaming media driver and an MMCA of an information handling system according to an embodiment of the present disclosure. The AV processing instruction manager 441 of a multimedia framework pipeline and infrastructure platform may operate to retrieve audio and video samples (e.g., videoframes) from a camera or microphone, perform one or more processing methods on the retrieved audio and video samples, multiplex the audio and video samples together to form a processed media sample, and transmit the processed media sample from a media source information handling system to a media sink information handling system.

The information handling system 400 may act as a media sink and a media source, depending upon the location at which such media samples are captured. For example, in an embodiment in which the camera of an information handling system 400 captures video samples and a microphone of the information handling system 400 captures audio samples, both pursuant to media capture instructions received by the AV processing instruction manager 441, the information handling system 400 may act as the media source and transmit media samples to a media sink information handling system. Movement of such captured video samples, audio samples, and processed and encoded media samples throughout various post-capture media processing methods in such an embodiment may be represented in FIG. 4 by the flat or non-dashed arrows.

In an embodiment in which the information handling system 400 acts as a media source, the streaming media driver 425 (or other drivers) may execute media capture instructions received from the AV processing instruction manager 441 to instruct capture of video samples via one or more cameras and capture of audio samples via one or more microphones of information handling system 400. As described herein, such media capture instructions may include default media capture instructions stored at the streaming media driver 425 or other drivers, default media capture instructions generated by the MMCA 450, or optimized media capture instructions generated by the intelligent appearance monitoring management system.

Upon capture of such video samples and audio samples in an embodiment, the streaming media driver 425 (or other drivers) may transmit the captured video and audio samples to the AV processing instruction manager 441 via a device proxy 442. The device proxy 442 in an embodiment may comprise code instructions operating at a controller. In an embodiment, the device proxy 442 may route or map connections between physical pins of the streaming media driver 425 (or other drivers) and the AV processing instruction manager 441. The streaming media driver 425 may comprise firmware or software code instructions executable to allow communication between various media hardware (e.g., camera, microphone, speakers, display) and the operating system (OS). The AV processing instruction manager 441 in an embodiment may comprise code instructions executable within the OS environment via one or more processors (e.g., VPU 413, GNA 414, GPU 412, or CPU 411) of the information handling system 400. As the AV processing instruction manager 441 manages execution of either a video sample or an audio sample in such an embodiment, the AV processing instruction manager 441 may employ the device proxy 442 to retrieve the video sample from one of the physical pins within a driver operably connected to the camera prior to execution of a video processing method. Similarly, the AV processing instruction manager 441 may employ the device proxy 442 to retrieve the audio sample from one of the physical pins within a driver operably connected to the microphone prior to execution of an audio processing method. The communication between the streaming media driver 425 and the device proxy 442 in such an embodiment may be executed by the AV processing instruction manager 441 executing code in kernel mode on the CPU 411 in an embodiment.

The AV processing instruction manager 441 in an embodiment may apply one or more AV processing instruction modules, each representing processing methods, on the audio sample and the video sample. For example, the AV processing instruction manager 441 in an embodiment may perform an AV processing instruction module A 443-1 for providing features specific to the MICA 450, perform AV processing instruction module B 443-2 for compressing an audio sample or a video sample, one or more additional AV processing instruction modules, and perform any additional AV processing instruction module C 443-n, such as multiplexing the processed and encoded audio and video samples together to form a processed and encoded media sample. In an example embodiment, the AV processing instruction modules 443-1 to 443-n may be any number of AV processing instruction modules that may be executed via the AV processing instruction manager 441 for the MMCA 450 in processing captured audio or visual data by the video processing engine or the audio processing engine. In example embodiments, any of the AV processing instruction modules 443-1 to 443-n may correspond to the AV processing instruction modules shown or described in FIG. 3 or elsewhere in the present disclosure and may be invoked or adjusted by the trained intelligent appearance monitoring management system neural network issuing an optimized appearance filtering adjustment that provides for an alteration of a user's image in the videoframes. In such an embodiment, the processed and encoded media sample may then be transmitted or streamed to the MMCA 450, where it will be streamed to a URI in the network 407 via the network interface device 409. The information handling system 400 will thus function as a media source.

In an embodiment in which the information handling system 400 acts as the media sink, the MMCA 450 may retrieve a processed and encoded media sample from a URI within network 407, via the network interface device 409. Upon retrieval of such a processed and encoded media sample captured at an information handling system acting as the media source and located remotely from information handling system 400, the AV processing instruction manager 441 may retrieve the processed and encoded media sample from the MMCA 450 via network interface device 409. The AV processing instruction manager 441 in an such embodiment may apply one or more AV processing instruction modules, each representing processing methods, on the received media sample, processed and encoded at the remote media source information handling system. For example, the AV processing instruction manager 441 in an embodiment may perform an AV processing instruction C 443-*n* for demultiplexing or splitting a video sample from an audio sample within the processed and encoded media sample. The AV processing instruction manager 441 in such an embodiment may also perform an AV processing instruction B 443-2 for decoding the audio sample and the video sample, respectively, and perform any additional AV processing instruction modules C 443-*n* such as providing features specific to the MMCA 450, such as super resolution. In such an embodiment, the re-processed (e.g., demultiplexed) and decoded audio and video samples may then be transmitted to the streaming media driver 425 (or other drivers of the information handling system 400) for playback via a digital display and speakers operably connected to the information handling system 400.

The information handling system 400 in an embodiment may include a plurality of processors, including, for example, a Central Processing Unit (CPU) 411, a Graphics Processing Unit (GPU) 412, a Vision processing unit 413, and a Gaussian neural accelerator (GNA) 414. The CPU 411 in an embodiment may execute the bulk of tasks relating to all software applications running via the operating system (OS), which may include the MMCA 450, the multimedia framework pipeline and infrastructure platform incorporating the AV processing instruction manager 441, as well as several others. Increased processing load placed on the CPU 411 by the AV processing instruction manager 441 during execution of a user session for the MMCA 450 may decrease the processing resources left available for all other applications also running at the OS, which may include word processing applications (e.g., Microsoft® Word®), presentation applications (e.g., Microsoft® PowerPoint®), e-mail applications, web browsers, and other applications routinely used in conjunction with the MMCA throughout a typical workday.

The GPU 412 in an embodiment may be a processor specialized for rapidly manipulating and altering AV data in memory to accelerate the creation of a video sample using a plurality of captures images stored in a frame buffer. GPU 412 may be more efficient at manipulating such stored video samples during image processing performed by one or more of the AV processing instruction modules (e.g., 443-1, 443-2, and 443-*n*) in an embodiment. The VPU 413 in an embodiment may be specialized for running machine vision algorithms such as convolutional neural networks (e.g., as used by the user framing module, super resolution module, zoom and face normalizer module, or eye contact correction modules described with reference to FIG. 3). The GNA 414 in an embodiment may comprise low-power co-processor to the CPU, or a System on a Chip (SoC) that can run under very low-power conditions to perform a specialized task, such as real-time translations ongoing conversations, or various other audio and video processing methods represented by any one of the AV processing instruction modules 443-1, 443-2, or 443-*n*. The GNA 414 may operate in an embodiment to offload continuous inference workloads from the CPU 411, GPU 412, or VPU 413, including but not limited to noise reduction or speech recognition, to save power and free CPU 411 resources.

Each of the AV processing instruction modules (e.g., 443-1, 443-2, and 443-*n*) in an embodiment may be sets of algorithms or code instructions executed via the operating system (OS), using one of the processors of the information handling system 400 for modification of video data or audio data relating to streaming video conferencing applications. It is understood that any number of AV processing instruction modules is contemplated in discussing 443-1 through 443-*n*. A single processor may execute each of the AV processing instruction modules (e.g., 443-1, 443-2, and 443-*n*), a subgroup thereof, or may even execute a single AV processing instruction, according to various embodiments. The AV processing instruction manager 441 in an embodiment may determine which processor to access in order to execute each AV processing instruction (e.g., 443-1, 443-2, and 443-*n*) in an embodiment, based on offload instructions received from the intelligent appearance monitoring management system in some embodiments. For example, in an embodiment in which the information handling system 400 acts as the media source, the AV processing instruction manager 441 may access the VPU 413 or the GNA 414 to execute various video or audio processing algorithms supported by the features of the MMCA, as represented by AV processing instruction A 443-1, pursuant to an optimized offload instruction to avoid executing that AV processing instruction using the GPU 412 or CPU 411. As another example in such an embodiment, the AV processing instruction manager 441 may access the GPU 414 or CPU 411 to execute the audio or video compression algorithm represented by AV processing instruction C 443-*n*. In yet another example in such an embodiment, the AV processing instruction manager 441 may access CPU 411 to multiplex the processed and encoded audio and video samples into a processed and encoded media sample.

In another example embodiment in which the information handling system 400 acts as the media sink, to receive media samples captured at a remotely located information handling system, the AV processing instruction manager 441 may offload execution of the audio or video decompression algorithm represented by AV processing instruction C 443-*n* to the GPU 412. In another example of such an embodiment, the AV processing instruction manager 441 may offload execution of various video or audio processing algorithms supported by the features of the MMCA, as represented by AV processing instruction B 443-2 to the GPU 412, GNA 414, or VPU 413. In such a way, the AV processing instruction manager 441 may retrieve audio and video samples from an external media source information handling system and perform one or more processing methods on the retrieved audio and video samples pursuant to optimized appearance filter adjustment instructions received from the trained intelligent appearance monitoring management system neural network or the MMCA 450.

Figure 5:
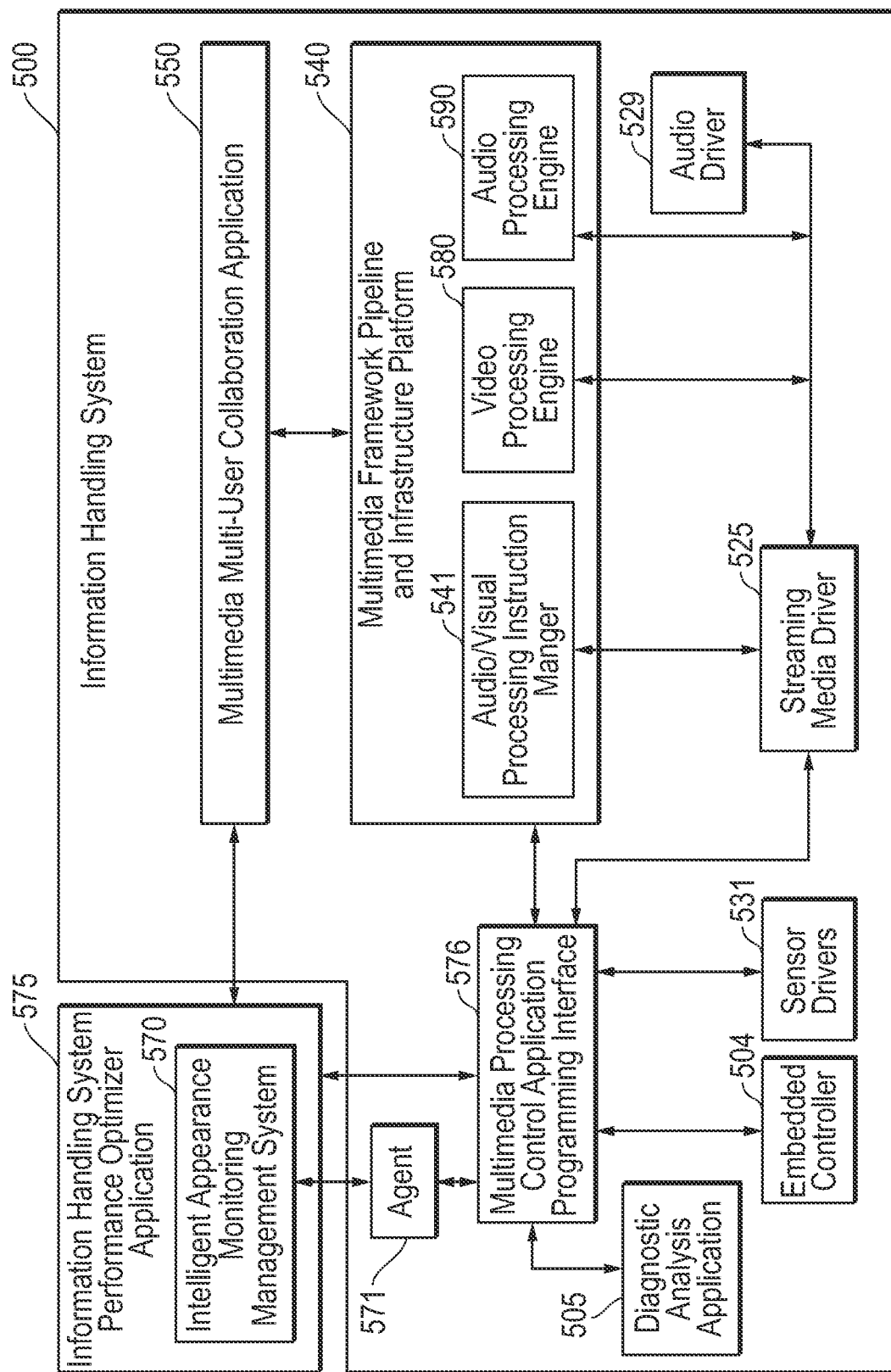
FIG. 5 is a block diagram illustrating a first embodiment of an intelligent appearance monitoring management system for optimizing information handling system usage of a multimedia, multi-user collaboration application by a user according to an embodiment of the present disclosure.

FIG. 5 is a block diagram illustrating a first embodiment of an intelligent appearance monitoring management system for intelligently monitoring or adjusting appearance of a user in captured media samples according to embodiments of the present disclosure. The intelligent appearance monitoring management system may train and use a trained neural network to identify user appearance anomalies, to generate a notice of detected user appearance anomalies, or to process those media samples to alter a user's appearance for display pursuant to an optimized appearance filter adjustment instructions during a user session of a MMCA according to an embodiment of the present disclosure. As described herein, the intelligent appearance monitoring management system 570 are code instructions executing on one or more processors of an information handling system. Execution of the intelligent appearance monitoring management system may be, in whole or in part, on a remote information handling system such as one executing the information handling system performance optimizer application 575 in some embodiments. Execution of the intelligent appearance monitoring management system may be local to a user, in whole or in part, on one or more processors of information handling system 500 participating in a videoconference via multimedia multi-user collaboration system 550 in some embodiments. The intelligent appearance monitoring management system 570 in an embodiment may generate optimized appearance filter adjustment instructions for providing a software service to user-participants of intelligently monitoring appearance during a videoconference session performed via the MMCA 550.

The information handling system 500 described with reference to FIG. 5 may represent a transmitting, media source information handling system or a receiving, media sink information handling system in various embodiments. In still other embodiments, information handling system 500 may operate as both a transmitting, media source information handling system and a receiving, media sink information handling system, as may be the case for an information handling system transmitting video of one participant user while simultaneously executing code instructions for the MMCA 550 to display videos of other participants within a shared user session of a video conferencing system. In one example embodiment, the intelligent appearance monitoring management system 570 may be an application operating within the OS for the information handling system 500, including execution of a trained neural network for determining optimized appearance filter adjustment instructions as described herein. For example, the information handling system 500 may execute any or all of the intelligent appearance monitoring management system 570 via a processor (e.g., processor 102 executing code instructions of the intelligent appearance monitoring management system 170, described with reference to FIG. 1) or embedded controller 504. In another example embodiment, the intelligent appearance monitoring management system 570 may be an application operating as part of an information handling system performance optimizer application 575 at an information handling system located remotely from the information handling system 500. In such an example embodiment, an agent 571 or portion of the intelligent appearance monitoring management system 570 may be operating at the information handling system 500. The agent 571 of the intelligent appearance monitoring management system 570 in such an embodiment may be in communication with the multimedia processing control API 576 via an internal bus of information handling system 500, and in communication with the information handling system performance optimizer application 575 via a network interface device, as described in greater detail with respect to FIG. 1.

The information handling system performance optimizer application 575 in an embodiment may operate remotely from the information handling system 500 in an embodiment. For example, the information handling system performance optimizer application 575 may operate on a server, blade, rack, or cloud-based network maintained and controlled by the manufacturer of several information handling systems, or managed by an employer or enterprise owner of several information handling systems, including information handling system 500. In such an embodiment, the information handling system performance optimizer application 575 may operate to monitor certain performance metrics at each of the plurality of such information handling systems (e.g., including 500), perform firmware and software updates, confirm security credentials and compliance, and manage user access across the plurality of information handling systems (e.g., as owned by an employer or enterprise corporation, and including 500).

A neural network of the intelligent appearance monitoring management system 570 in an embodiment may make optimized appearance filter adjustment instructions and user appearance anomaly determinations as described herein on a per information handling system (and per user) basis. Such a determinations may be made based upon a plurality of inputs including captured videoframes with current user images as well as inputs describing hardware and software performance metrics of the information handling system (e.g., 500) at issue, default media capture instructions and default AV processing instruction module setting settings generated by the MMCA (e.g., 550), various sensor readings taken at the information handling system (e.g., 500), and meeting metrics for the MMCA describing performance of that application and participation of the user of the information handling system during a user session. These neural network input values may be gathered from the video camera and a plurality of sensors, peripheral devices, and diagnostic applications, such as described in various example embodiments herein.

The multimedia processing control application programming interface 576 in an embodiment may operate, at least in part, as a hub, facilitating communication of each of these performance metrics, media capture instructions, and various sensor readings to the intelligent appearance monitoring management system 570, or agent 571 thereof. For example, processing capabilities may indicate processor types available or Random Access Memory (RAM) or other memory capabilities of an information handling system. In a further example, hardware performance metrics describing total processing load at one or more processors may be gathered via an embedded controller 504 in an embodiment, and transmitted to the multimedia processing control API 576. The embedded controller 504 may also gather information describing state of charge for a power management unit, which may include a battery and an AC adapter, as described with reference to FIG. 1. The embedded controller 504 in an embodiment may gather such metrics through direct communication with the available processors (e.g., CPU, GPU, VPU, GNA, etc.) and with the power management unit (PMU). In some embodiments, such communication may occur in kernel mode.

In other embodiments, the information handling system performance optimizer application 575 may be in direct communication with the embedded controller 504 via out-of-band communications. In such embodiments, the hardware performance metrics (e.g., CPU load, current offload instructions, battery state of charge, current positional configuration of information handling system 500) may be determined by the embedded controller 504 in kernel mode and communicated to the information handling system performance optimizer application 575 directly during routine out-of-band communications between the information handling system performance optimizer application 575 and all managed information handling systems (e.g., including 500). Such out-of-band communications with the embedded controller 504 in an embodiment may be used to check security credentials or performance statistics for the information handling systems (e.g., 500), or to push software or firmware updates to the information handling systems, for example. During such routine maintenance, the information handling system performance optimizer application may accumulate, sort, and analyze all performance metrics received from all managed information handling systems (e.g., 500), including processing load across all available processors, default settings associating specific processors with specific tasks, or state of remaining charge of the battery incorporated within the PMU, for example. Out-of-band communications initiated in such a way between the embedded controller 504 and the information handling system performance optimizer application 575 may be via a wireless network such as Wi-Fi or cellular, or via wired connection.

As described herein, the multimedia processing control API 576 may operate, at least in part, as a hub to facilitate communication between various hardware, firmware, and software applications operating at information handling system 500, and the intelligent appearance monitoring management system 570. As another example of this, the multimedia processing control API 576 may receive software performance metrics generated at a diagnostic analysis application 505, describing applications available or running, number of videoconference participants, CPU usage or load, as well as a breakdown of the CPU usage attributable to each of a plurality of applications (e.g., including a MMCA 550) running via the operating system of the information handling system 500. The multimedia processing control API 576 may forward these software performance metrics to the neural network of the intelligent appearance monitoring management system 570 in an embodiment.

In yet another example of the multimedia processing control API 576 facilitating communication with the intelligent appearance monitoring management system 570 the multimedia processing control API 576 may receive sensor readings taken from one or more sensors of the information handling system 500 (e.g., a hall effect sensor or hinge rotation sensor, light sensors, color sensors, IR cameras, accelerometer, gyroscope, orientation sensor, or geographic position sensors), via the sensor drivers 531, as described in greater detail with respect to FIG. 2. In still another example of the multimedia processing control API 576 facilitating communication with the intelligent appearance monitoring management system 570 the multimedia processing control API 576 may receive default media capture instructions, default AV processing instruction module settings, or captured audio samples from a streaming media driver 525, as described in greater detail with respect to FIG. 2. For example, audio samples may be used in some embodiments in order to determine the frequency with which the user of the information handling system 200 is talking during a user session of the MMCA. In other embodiments, the multimedia processing control API 576 may receive default media capture instructions or default AV processing instruction module settings via direct communication with the multimedia framework pipeline and infrastructure platform 540.

The intelligent appearance monitoring management system 570 in an embodiment may also communicate directly with the MMCA 550 or indirectly via the multimedia processing control API 576 to gather meeting metrics describing user participation and performance of the MMCA 550 during a user session in which the information handling system 500 participates. The intelligent appearance monitoring management system 570 may receive one or more meeting metrics describing performance of the MMCA during execution of such a training user session in an embodiment. In some embodiments, these metrics may be gathered during routine out-of-band communications between the information handling system performance optimizer application 575 and the information handling system 500. Such meeting metrics may include, for example, a measure of the CPU resources consumed by the MMCA 550 over time, including at times intelligent appearance monitoring management system image alterations are conducted, if any. Other example meeting metrics may include a measure of memory resources consumed. Still other example meeting metrics may compare CPU or memory usage by the MMCA 550 to total CPU or memory used by all applications, hardware, or firmware during the training user session. Yet other example meeting metrics may measure participation of the user during a user session, including, for example, a measure of the time spent muted, or whether the user is sharing his or her screen.

Such meeting metrics may also describe the performance of media sample processing, transmission, and playback among a plurality of information handling systems (e.g., including 500) engaged in a single user session for the MMCA 550. For example, meeting metrics gathered by the intelligent appearance monitoring management system 570 during a training session may describe latency, or a measurement of time elapsing between a first information handling system (e.g., 500) transmitting the processed, encoded media sample and a second information handling system receiving the processed, encoded media sample. Meeting metrics may also include allocation of processing resources consumed during application of any AV processing modules used to execute optimized appearance filter adjustment instructions generated from a trained intelligent appearance monitoring management system neural network to apply elected alterations to a user's image when a user appearance anomaly is detected. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA 550, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples.

The multimedia processing control API 576 may forward received images of a user, a user's selections of the types of monitoring and remedial adjustments or notification by the intelligent appearance management system user interface, default media capture instructions, default AV processing instruction module settings, captured audio samples, and various sensor readings to the intelligent appearance monitoring management system 570 for determination of optimized appearance filter adjustment instructions using the neural network described in embodiments herein. For image recognition type tasks such as conducted by the intelligent appearance monitoring management system 570, or more particularly for determination of image differences of images of user to detect user appearance anomalies and to track and adjust user image appearance according to some types of optimized appearance filter adjustment instructions, a convolutional neural network may be used in some embodiments. As described in greater detail with respect to FIG. 7, a neural network of the intelligent appearance monitoring management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described directly above or according to embodiments described herein. Upon training of such a neural network unique to each information handling system (e.g., 500), the neural network may be ready to determine optimized appearance filter adjustment instructions for the information handling system for which it was trained, based on updated input values for a videoconferencing using the MICA 550. In some embodiments, this determination may be made by the neural network operating at the intelligent appearance monitoring management system 570, located remotely from the information handling system 500. In other embodiments, the trained neural network for information handling system 500 may be transmitted from the intelligent appearance monitoring management system 570 to an agent 571 thereof, operating at the information handling system 500 conducting a videoconference session.

The process described directly above for gathering inputs into the neural network (e.g., via the multimedia processing control API 576), and transmission of those inputs to the intelligent appearance monitoring management system 570 in an embodiment may be repeated, following training of the neural network. As described in greater detail with respect to FIG. 8, the neural network in an embodiment may determine optimized appearance filter adjustment instructions including generation of user appearance anomaly notification messages to a user, or optimized video capture setting adjustments, executing features of optimized AV processing instruction adjustments to alter a user's image in videoframes for transmission, or optimized offload setting adjustments. In another embodiment, the neural network may determine optimized AV processing instruction adjustment to optimize virtual background or blur settings, optimize boundary detection algorithm operation, to optimize appearance filter functions, to optimize bad hair detection and remediation functions, to optimize sneeze/cough detection and mitigation functions, or other user appearance anomaly detection and remediation measures applied to notify a user or alter the user image by processing video frames. In still another embodiment, the neural network may determine optimized media capture settings, optimized application prioritization instructions, or optimized multi-application display settings. Each of the optimized settings or instructions output from the neural network may be transmitted to the multimedia processing control API 576 in an embodiment.

The multimedia processing control API 576 in an embodiment may transmit each of the optimized appearance filter adjustment instructions received from the intelligent appearance monitoring management system 570 neural network to the application, controller, or driver at which such settings or instructions will be implemented. For example, the multimedia processing control API 576 may transmit optimized audio capture settings, optimized video capture settings, optimized multi-application display settings, or camera selection instructions to the streaming media driver 525. As described in greater detail with respect to FIG. 2, the streaming media driver 525 in an embodiment may direct the operation of the camera and the microphone such that media (e.g., images, video samples, audio samples) is captured according to the optimized media capture instructions. For example, the streaming media driver 525 in an embodiment may direct the camera to capture images and generate video samples having the frames per second, zoom settings, pan settings, or number of key frames defined by the optimized video capture instructions. As another example, the streaming media driver 525 in an embodiment may direct the microphone to capture and generate audio samples having the bitrate defined by the optimized audio capture instructions. As yet another example, the streaming media driver 525 in an embodiment may select one of a plurality of cameras to capture images and generate video samples, based on the camera selection instructions. In still another example, the streaming media driver 525 in an embodiment may direct the digital display to display graphical user interfaces for a plurality of applications such as for generation of user appearance anomaly notification messages or to generate a user interface to provide for option settings or response to anomaly notification messages to utilize the intelligent appearance monitoring management system in some embodiments.

In other embodiments, the multimedia processing control API 576 may transmit various optimized appearance filter adjustment instructions to the streaming media driver 525 or to the multimedia framework pipeline and infrastructure platform 540. For example, the multimedia processing control API 576 may transmit optimized media capture instructions (e.g., including optimized video capture instructions and optimized audio capture instructions) to the streaming media driver 525 or to the multimedia framework pipeline and infrastructure platform 540. As described herein, streaming media driver 525 may direct peripherally connected cameras or microphones to capture video and audio. The streaming media driver 525 in an embodiment may do so pursuant to instructions received from the multimedia framework pipeline and infrastructure platform 540. Thus, instructions for performing such capture of media samples (e.g., video or audio samples) in an embodiment may be stored at or executed by one or more of the multimedia framework pipeline and infrastructure platform 540 or the streaming media driver 525.

In another aspect of an embodiment, the multimedia processing control API 576 may transmit various optimized appearance filter adjustment instructions to the multimedia framework pipeline and infrastructure platform 540. For example, the multimedia processing control API 576 in an embodiment may transmit optimized offload settings, optimized virtual background settings, optimized boundary detection algorithm instructions, or an optimized AV processing instruction adjustment to the multimedia framework pipeline and infrastructure platform. As described herein, the multimedia framework pipeline and infrastructure platform may perform post-capture processing of media samples (e.g., video samples and audio samples) such as to alter a user image in videoframes pursuant to a received optimized appearance filter adjustment instructions. The multimedia framework pipeline and infrastructure platform 540 in an embodiment may include an AV processing instruction manager 541 directing the video processing engine 580 or audio processing engine 590 to perform various post-capture media processing methods (also referred to herein as AV processing instruction modules) on captured media samples (or on externally received media samples during a user session with the MMCA 550). Optimized AV processing instruction adjustments in an embodiment may direct the AV processing instruction manager 541 to include or exclude one or more specifically identified AV processing instruction modules in an embodiment to conduct, for example, user image alterations pursuant to optimized appearance filter adjustment instructions generated by the trained neural network of the intelligent appearance monitoring management system 570.

Further, optimized offload setting adjustments, such as for optimized AV processing instruction modules (which may include optimized virtual background and blur settings, and optimized boundary detection algorithm instructions, optimized appearance filter algorithms, bad hair detection/remediation processing, sneeze/cough detection or remediation processing) may direct the ways in which the AV processing instruction manager 541 directs execution of such AV processing instruction modules in an embodiment. For example, optimized offload setting adjustments may cause the AV processing instruction manager 541 to execute AV processing instruction modules specifically identified within the optimized offload settings using one of a plurality of processors (e.g., CPU, GPU, VPU, GNA) specifically associated with that AV processing instruction within the optimized offload setting adjustments. As another example, the AV processing instruction manager 541 may direct one or more modules within the video processing engine 580 to apply a virtual background or blur to a background portion or to a user image portion of video frames as specifically identified within the optimized virtual background or blur settings and using the algorithm specifically identified within the optimized boundary detection algorithm instructions. Through determination and delivery of each of these optimized settings to the information handling system 500 to execute optimized appearance filter adjustment instructions, the intelligent appearance monitoring management system 570 in an embodiment may optimize capture of media samples and post-capture processing of those samples to balance CPU load (and other processor loads) of the information handling system 500 with quality of user experience when engaged in a user session for the MMCA 540.

Figure 6:
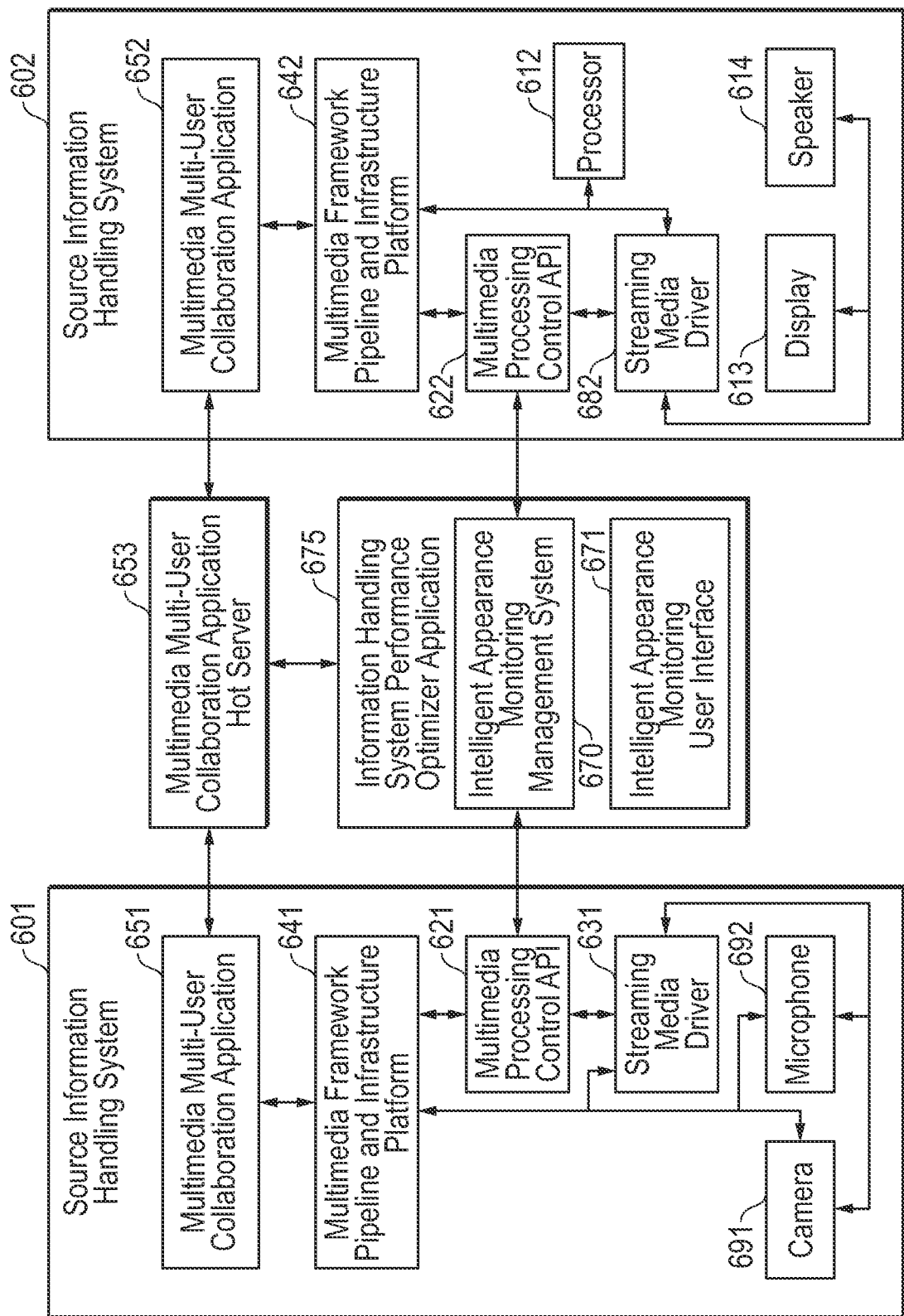
FIG. 6 is a block diagram illustrating a second embodiment of an intelligent appearance monitoring management system for optimizing information handling system usage of a multimedia, multi-user collaboration application according to an embodiment of the present disclosure.

FIG. 6 is a block diagram illustrating another embodiment of an intelligent appearance monitoring management system for coordinating processing of media samples across a plurality of information handling systems that are each participating in the same user session of a MMCA according to an embodiment of the present disclosure. User sessions may be hosted and coordinated by a MMCA host server 653 located remotely from, but in communication with one or more source information handling systems (e.g., 601) and one or more sink information handling systems (e.g., 602) via a network.

As described herein, the intelligent appearance monitoring management system 670 may generate optimized appearance filter adjustment instructions which may include optimizing various settings for peripheral devices used in the capture at a source information handling system 601 of media samples that are to be played across a plurality of sink information handling systems (e.g., including 602) during user sessions for a MMCA (e.g., 651 or 652). The intelligent appearance monitoring management system 670 may optimize such settings in order to optimize performance of the MMCA at either one or more source information handling systems (e.g., 601) or one or more sink information handling systems (e.g., 602), or both, during a user session hosted by the MMCA host server 653. In other words, some optimized settings determined by the intelligent appearance monitoring management system 670 may be executed at the source information handling system 601, and other optimized settings may be executed at the sink information handling system 602. By optimizing capture and processing of such media samples across a plurality of information handling systems (e.g., 601 and 602) engaged in the same user session, the intelligent appearance monitoring management system 670 in an embodiment may compound the beneficial decreases in processing power required to play such captured videos at one or more sink information handling systems 602. It is understood that information handling system 601 and information handling system 602, as well as any other information handling systems participating within the user session hosted by the MMCA host server 653 may operate as a media source, a media sink, or both.

The intelligent appearance monitoring management system 670, or separate agents thereof operating at the source information handling system 601 and sink information handling system 602, respectively, may make these determinations based on metrics specific to a single user session for the MMCA in which both the source information handling system 601 and the sink information handling system 602 are engaged. The MMCA 651 and MMCA 652 in an embodiment may operate through a shared network via a MMCA host server 653 to control engagement in videoconference systems.

The MMCA host server 653 in an embodiment may comprise a plurality of servers executing software for recording metrics for each hosted user session. Such recorded user session metrics in an embodiment may describe, for example, the number of participants in the user session, features of the MMCA that are enabled for each participant, or the like. The additional user session metrics for a session in which the source information handling system 601 or sink information handling 602 participate may be gathered by the MMCA host server 653, and transmitted to the MMCA 651 and MMCA 652 for input into the neural network of the intelligent appearance monitoring management system 670 in some embodiments. For example, the source information handling system 601 may execute a first neural network trained by the intelligent appearance monitoring management system 670, based on inputs previously gathered at the source information handling system 601 (e.g., as described with reference to FIGS. 2 and 5) to make such a determination. As another example, the sink information handling system 602 may execute a second neural network trained separately by the intelligent appearance monitoring management system 670, based on inputs previously gathered at the source information handling system 602, to make such a determination. Both may use metrics from the MMCA host server 653.

As described herein, for example in an embodiment described with reference to FIG. 5, the intelligent appearance monitoring management system 670 may transmit optimized appearance filter adjustment instructions to the multimedia processing control API (e.g., 621 or 622), based on outputs from the trained neural networks for each respective information handling system (e.g., 601, or 602). In an embodiment shown in FIG. 6, in which the intelligent appearance monitoring management system 670 operates within the information handling system performance optimizer application 675, remotely from either the source information handling system 601 or the sink information handling system 602, the intelligent appearance monitoring management system 670 may determine such optimized appearance filter adjustment instructions for the source information handling system 601 using a first neural network trained specifically based on neural network input values previously received from the source information handling system 601. The intelligent appearance monitoring management system 670 in such an embodiment may transmit the optimized appearance filter adjustment instructions output by this first neural network to the multimedia processing control API 621. For example, the multimedia processing control API 621 may direct the optimized appearance filter adjustment instructions to systems or software in the source information handling system 601 to generate messages to a user indicating detection of a user appearance anomaly as described in embodiments herein or may direct AV processing instruction modules such as those described herein to conduct alteration to a user image in captured videoframe data according to various embodiments. In such an embodiment, the intelligent appearance monitoring management system 670 may similarly determine other such optimized appearance filter adjustment instructions for the sink information handling system 602 using a second neural network trained specifically based on neural network input values previously received from the sink information handling system 602. The intelligent appearance monitoring management system 670 in such an embodiment may transmit the optimized appearance filter adjustment instructions output by this second neural network to the multimedia processing control API 622, for example.

Optimized appearance filter adjustment instructions output by such a first neural network and transmitted to the multimedia processing control API 621 of the source information handling system 601 in an embodiment may include, for example, optimized audio capture settings, optimized video capture settings, or optimized AV processing instruction adjustments as described in embodiments herein. The multimedia processing control API 621 in such an embodiment may transmit these optimized settings to the streaming media driver 631. The streaming media driver 631 in such an embodiment may direct the camera 691 to capture video samples according to the optimized video capture settings and direct the microphone 692 to capture audio samples according to the optimized audio capture settings. As another example embodiment, the streaming media driver 631 in an embodiment may select one of a plurality of cameras (e.g., camera 691) to capture images and generate video samples, based on the camera media capture instructions. In some embodiments, the optimized audio capture settings or optimized video capture settings may be transmitted from the multimedia processing control API 621 to the multimedia framework pipeline and infrastructure platform 641 instead. Similar utilization of optimized appearance filter adjustment instructions output by such a second neural network and transmitted to the multimedia processing control API 622 of the sink information handling system 602 may also be contemplated for any intelligent user appearance monitoring and adjustment at 602.

Optimized appearance filter adjustment instructions output by a first neural network trained for source information handling system 601 and transmitted to the multimedia processing control API 621 in an embodiment may also include, for example, optimized processing features for enablement on the transmission side. Such optimized processing features pursuant to the optimized appearance filter adjustment instructions may include optimized collaboration application features for enablement, optimized offload settings, optimized virtual background or blur settings, optimized boundary detection algorithm instructions, optimized appearance filter adjustments to blend or modify identified user appearance anomalies, optimized bad hair day detection or remediation processing, optimized cough/sneeze detection or remediation processing, or other optimized AV processing instruction adjustments according to various embodiments herein. The intelligent appearance monitoring management system 670 in an embodiment may transmit one or more of these optimized features for enablement pursuant to the optimized appearance filter adjustment instructions to the multimedia framework pipeline and infrastructure platform 641.

As described in greater detail with reference to FIGS. 3-4, the AV processing instruction manager of the multimedia framework pipeline and infrastructure platform 641 in an embodiment may execute one or more AV processing instruction modules on video samples received from the camera 691 via the streaming media driver 631, and audio samples received from the microphone 692 via the streaming media driver 631. The AV processing instruction modules executed by the multimedia framework pipeline and infrastructure platform 641 in such an embodiment may be selected or enabled based on the optimized appearance filter adjustment instructions for enablement on the transmission side, optimized virtual collaboration application features for enablement, or optimized AV processing instruction adjustments. Further, the algorithms or methods employed during execution of each of these AV processing instruction modules, and the processor executing such algorithms may be chosen based on any optimized offload setting adjustments and the AV processing instruction modules utilized pursuant to the optimized appearance filter adjustment instructions. For example, AV processing instruction adjustments in an embodiment may further identify a specific type of encoding algorithm that requires lower computing overhead. These optimized settings and instructions may decrease the load on the CPU of the source information handling system 601 during such post-capture processing.

The load on the CPU of the source information handling system 601 during execution of these post-capture media processing methods may also be decreased as a consequence of the methods used to perform such captures. For example, by capturing the video samples using optimized video capture instructions and capturing the audio samples using optimized audio capture instructions, the richness of data within the captured video and audio samples may decrease in some embodiments, causing another decrease in the amount of processing power required for the algorithms associated with various AV processing instruction modules to be performed on these samples. As also described with respect to FIG. 4, the load on the CPU of the source information handling system 601 in an embodiment may be further decreased by directing the AV processing instruction manager of the multimedia framework pipeline and infrastructure platform 641 to engage processors (e.g., GPU, VPU, GNA) other than the CPU of the source information handling system 601 to execute various AV processing instruction modules. In such a way, the intelligent appearance monitoring management system 670 may decrease the load on the CPU at the source information handling system 601 through a variety of methods when conducting user image alterations pursuant to optimized appearance filter adjustment instructions. This may free up processing power for execution of other software applications (e.g., other than the MMCA 651) during a user session for the MMCA 651, and result in greater overall user experience.

By optimizing the post-capture media processing methods applied to the video samples and audio samples captured at the source information handling system 601 and potentially altered by the intelligent appearance monitoring management system 670 may also decrease the load on the CPU at the sink information handling system 602 during a user session shared between the MMCA 601 and the MMCA 652. As described in greater detail with reference to FIG. 4, the AV processing instruction manager of the multimedia framework pipeline and infrastructure platform (e.g., 641) at the source information handling system (e.g., 601) may perform several AV processing instruction modules on incoming audio and video samples, including encoding and multiplexing of these samples to form a processed, encoded media sample. In such an embodiment, the processed, encoded media sample may be then be forwarded to the MMCA 651 for transmission (e.g., via a network) to the MMCA 652 at the sink information handling system 602.

The multimedia framework pipeline and infrastructure platform 642 at an information handling system operating as a media sink in an embodiment may retrieve the remotely captured, media sample that was processed and encoded at a source information handling system (e.g., 601). The remotely captured media sample may include audio and video captured at the source information handling system 601 from the MMCA 652. In such an embodiment, the multimedia framework pipeline and infrastructure platform 642 may perform one or more AV processing instruction modules on the processed and encoded media sample, including demultiplexing and decoding of the media sample into formats compatible with the display 613 and speakers 614 of the sink information handling system 602. For example, a multiplexing module of the multimedia framework pipeline and infrastructure platform 642 may demultiplex or split the processed and encoded media sample captured at the source information handling system 601 into an encoded video sample and an encoded audio sample. As another example, a video compression module of the multimedia framework pipeline and infrastructure platform 642 may decode or decompress the demultiplexed video sample into a format that may be transmitted via the streaming media driver 682 to a digital display 613 for playback. As yet another example, an audio compression module of the multimedia framework pipeline and infrastructure platform 642 may decode or decompress the demultiplexed audio sample into a format that may be transmitted via the streaming media driver 682 to a peripherally attached speaker 614 for playback.

The complexity of the algorithm used to encode or compress the audio sample at the source information handling system 601 may correlate to or match the complexity of the algorithm used to decode or decompress the audio sample at the sink information handling system 602 in an embodiment. Similarly, the complexity of the algorithm used to encode or compress the video sample at the source information handling system 601 may correlate to or match the complexity of the algorithm used to decode or decompress the video sample at the sink information handling system 602 in an embodiment. Thus, by encoding the audio and video samples using a less complex algorithm at the source information handling system 601, based on optimized AV processing instruction adjustments, the intelligent appearance monitoring management system 670 in an embodiment may also decrease the complexity of the algorithm used to decode the audio and video samples at the sink information handling system 602. This may effectively decrease the load on the processor 612 during such decoding.

The video sample demultiplexed and decoded from the processed and encoded media sample retrieved from the MMCA 652 in an embodiment may be transmitted to the streaming media driver 682 for playback of the video via the digital display 613 of the information handling system 602. In another aspect of such an embodiment, the audio sample demultiplexed and decoded from the processed and encoded media sample retrieved from the MMCA 652 may be transmitted to the streaming media driver 682 for playback of the audio via an operably connected speaker 614 of the information handling system 602.

Figure 7:
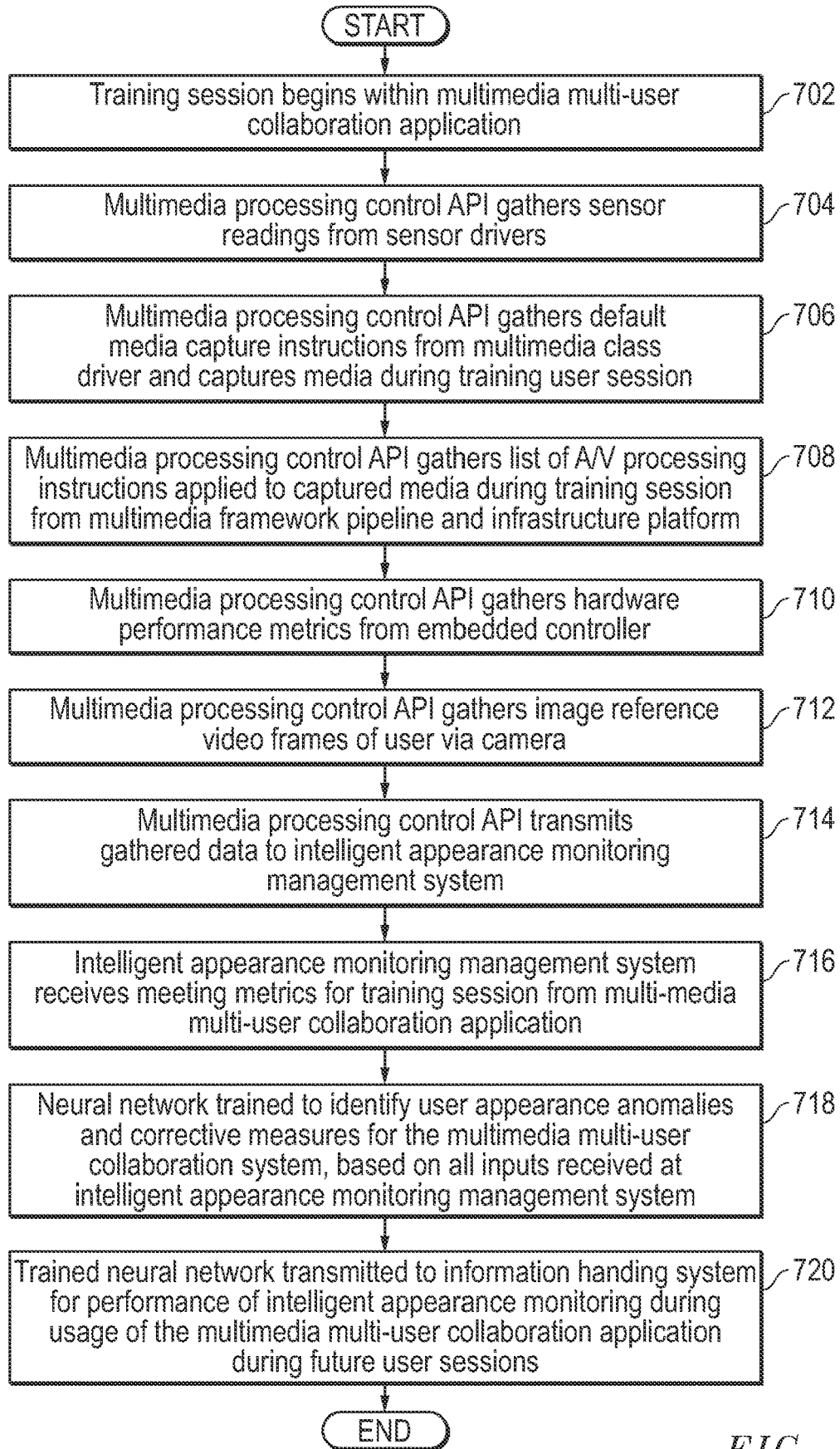
FIG. 7 is a flow diagram illustrating a method of training a neural network to intelligently monitor and adjust a user's appearance during usage of a multimedia multi-user collaboration application of an information handling system according to an embodiment of the present disclosure.

FIG. 7 is a flow diagram illustrating a method of training a neural network of the intelligent appearance monitoring management system to identify user appearance anomalies in captured videoframes and to output optimized appearance filter adjustment instructions. The neural network is trained to identify output optimized appearance filter adjustment instructions that may include instructions to generate notification messages to a user about identified user appearance anomalies or adjustments to media capture settings, AV processing instruction adjustments, and offload settings that provide a service of intelligently monitoring or adjusting user appearance in video frames during videoconference sessions by an MMCA. One or more training user sessions may be conducted to train the neural network of the intelligent appearance monitoring management system according to an embodiment of the present disclosure. Further, ongoing training updates may be conducted similarly according to the embodiments of FIG. 7 to further refine and update the neural network of the intelligent appearance monitoring management system as understood by those of skill.

The intelligent appearance monitoring management system in an embodiment may gather input variables including captured video frames with captured images of a user that may be used as reference images by the neural network for training and use of a trained neural network. Further input variables may be gathered describing media capture settings for capturing audio and video samples during such a training user session, as well as a list of AV processing instruction modules performed on these captured media samples, and the processors that executed these AV processing instruction modules. These input variables may be gathered for a plurality of training sessions in which an information handling system and user participates, in order to tailor the neural network to optimize intelligent monitoring and notify the user or to adjust a user's appearance in captured videoframes by the MMCA as a videoconference session is executed at that specific information handling system in an embodiment. The intelligent appearance monitoring management system may further gather meeting metrics describing performance of the MMCA during such training user sessions. By comparing several different captured images of a user to criteria of determining user appearance anomalies as well as inputs for settings for the media capture, AV processing instruction modules applied to the captured media, and the processors used to execute such AV processing instruction modules, the neural network may learn to identify user appearance anomalies and generate optimized appearance filter adjustment instructions to notify a user or alter a user image in captured videoframes. The neural network may also be trained as well to identify settings optimized to produce the best possible performance values for the MMCA during future user sessions at the information handling system for which the neural network has been trained in various embodiments.

At block 702, a training user session may begin within the MMCA in an embodiment. For example, in an embodiment described with reference to FIG. 6, a source information handling system 601 and a sink information handling system 602 may both join a single user session of the MMCA (e.g., 651 and 652) via a central, networked MMCA host server 653, an agent of which may be operating at both the source information handling system 601 and the sink information handling system 602. It is understood that each information handling system 601 and 602 may function as a media source and as a media sink. After such training user sessions have been completed, the intelligent appearance monitoring management system in an embodiment may identify user appearance anomalies and generate optimized appearance filter adjustment instructions to notify a user or alter a user image in captured videoframes via optimized media capture instruction adjustments, optimized AV processing instruction adjustments, or optimized offload instruction adjustments as applicable. A plurality of training user sessions may be completed in an embodiment prior to conclusion of the training phase for the neural network of the intelligent appearance monitoring management system.

The multimedia processing control API may gather sensor readings from sensor drivers at block 704 in an embodiment. For example, in an embodiment described with reference to FIG. 2, various sensor readings may be taken by the information handling system 200 and communicated to the intelligent appearance monitoring management system. More specifically, the information handling system 200 may include one or more sensors within a sensor array 230 as described in various embodiments herein. All sensor readings from sensors within the sensor array 230 in an embodiment may be transmitted to the sensor drivers 231. This sensor information in an embodiment may include information used to determine the level of lighting or colors in an image of a user in videoframes captured in a videoconference user session. For example, color sensors applied to the captured images may detect shading, color heatmaps, and color anomalies. In another example, an IR camera may sense whether the user of the information handling system is located within a certain distance of the display device to assist with identification of the user image within the captured videoframes. The multimedia processing control API 574 may forward various sensor readings to the intelligent appearance monitoring management system 570 for training the neural network described herein.

The multimedia processing control API may gather default media capture instructions from a streaming media driver in an embodiment at block 706. For example, in an embodiment described with reference to FIG. 2, default media capture instructions and default AV processing instruction module settings may be gathered via a streaming media driver 225 and transmitted to the intelligent appearance monitoring management system. Default media capture instructions in an embodiment may be generated by the MMCA, or may be preset by the manufacturer of the camera, microphone, or information handling system 200. In another example embodiment described with reference to FIG. 5, the multimedia processing control API 576 may receive default media capture instructions from the streaming media driver 525.

Such default media capture instructions and optimized media capture instructions may dictate the method by which such audio, image, and video samples are captured. For example, in an embodiment described with reference to FIG. 2, media capture instructions may identify the frames per second at which the camera 222 may capture images for generation of a video, the resolution at which the camera captures and stores such images, the number of key frames in each preset time period, zoom settings, pan settings, or instructions to center the captured image around an identified object. As another example, media capture instructions may identify the bit rate at which the microphone 224 records and saves captured audio samples. Media capture instructions may be adjusted, for example in some embodiments, by the neural network as optimized appearance filter adjustment instructions to alter a user image in captured videoframes in response to identified user appearance anomalies.

At block 708, the multimedia processing control API may gather a list of AV processing instruction modules applied to captured media during a training session from the multimedia framework pipeline and infrastructure platform in an embodiment. For example, in an embodiment described with reference to FIG. 2, default AV processing instruction module settings may be gathered via the streaming media driver 225 and transmitted to the intelligent appearance monitoring management system. In another example embodiment described with reference to FIG. 5, the multimedia processing control API 576 may receive default AV processing instruction module settings from the streaming media driver 525. In other embodiments, the multimedia processing control API 576 may receive default AV processing instruction module settings via direct communication with the multimedia framework pipeline and infrastructure platform 540.

As described in various embodiments herein, the AV processing instruction modules may be applied to captured videoframes upon detection of user appearance anomalies in analysis of captured user images in videoframes to identify outliers in appearance. For example, usage of image recognition algorithms may be employed via neural network to identify differences in captured videoframes in some embodiments. The AV processing instruction modules may also be applied to captured videoframes, or adjusted in their operation by the neural network as optimized appearance filter adjustment instructions to alter a user image in captured videoframes in response to identified user appearance anomalies in some embodiments. Such data may be also input to train the neural network.

At block 710, the multimedia processing control API may gather hardware performance metrics from an embedded controller in an embodiment. For example, in an embodiment described with reference to FIG. 5, hardware performance metrics describing total processing load at one or more processors may be gathered via an embedded controller 504 in an embodiment, and transmitted to the multimedia processing control API 576. The embedded controller 504 in an embodiment may gather such metrics through direct communication with the processor (e.g., CPU, GPU, VPU, GNA, etc.). In other embodiments, the information handling system performance optimizer application 575 may be in direct communication with the embedded controller 504 via out-of-band communications. In such embodiments, the hardware performance metrics (e.g., CPU load, current offload instruction) may be determined by the embedded controller 504 in kernel mode and communicated to the information handling system performance optimizer application 575 directly during routine out-of-band communications between the information handling system performance optimizer application 575 and all managed information handling systems (e.g., including 500).

At block 712, the processing control API may gather from the video camera of the information handling system one or more captured videoframes that may include images of a user during a videoconference session with the MMCA. These captured videoframes may be used as input to train the neural network as reference images of a user's appearance. A plurality of such images of the user in multiple captured videoframes may be used to generate an image recognition level set of parameters relating to the appearance of the user in videoframes in some example embodiments. Such captured image frames used by the neural network may operate as a form of reference image to determine both what is typical in the appearance of the user and what may be identified as potentially anomalous. In embodiments herein, plural captured videoframes may be gathered to train the neural network with a greater number of videoframes providing increased reference context for typical appearance and images of the user with potential user appearance anomalies in captured videoframes to train the neural network.

In some embodiments, one or more AV processing instruction modules, such as boundary detection processing module, bad hair day processing module, cough/sneeze mitigation module, and others may be used to process the captured videoframes to identify elements of the user's image such as the user's head and face, the user's hair, or typical position or expressions of the user in images within the captured videoframes in example embodiments. Further, sensors such as color sensor may be implemented to determine color maps or color or shading variances found in captured videoframes that may help to correlate to identification of user appearance anomalies. In yet other embodiments, the intelligent appearance monitoring management system have criteria relating to types of user appearance anomalies that may be used in training the neural network to identify those anomalies. For example, to detect a blemish, smudge, or mark on a user's face in a captured videoframe, criteria may be to identify a change in color at a portion of the image of the user's face that was not previously found in other images to label such a change as a potential anomaly in an embodiment. Similarly, shading of a portion of an image of a user's face (e.g., a jaw or cheeks) not appearing in other reference videoframes with images of the user may be a criteria for labeling an image with a potential user appearance anomaly of having forgotten to shave in another embodiment. In other example embodiments, identification of a user's hair in an image may be compared to other reference images. If some portion sticks up or extends the detected user image boundary, obstructs a portion of the face, or has a distinct appearance difference via image recognition, this may be another criteria for labelling a user appearance anomaly. Additional image recognition analysis, color sensing, or other analysis of video frames with user images may yield cough or sneeze identification based on movement differences or facial expression differences, bloodshot eyes based on color differences, or other types of user appearance anomalies that may be part of criteria for identification of those user appearance anomalies.

The multimedia processing control API in an embodiment may transmit the data gathered at steps 704-712 to the intelligent appearance monitoring management system in an embodiment at block 714. By gathering this data, and transmitting it to the intelligent appearance monitoring management system in an embodiment, the multimedia processing control API may operate as a hub. For example, in an embodiment described with reference to FIG. 5, the multimedia processing control API 574 may forward default media capture instructions, default AV processing instruction module settings, captured audio samples, captured video samples, and various sensor readings to the intelligent appearance monitoring management system 570 for determination of use appearance anomalies and optimized remediating image adjustment using the neural network described herein. A neural network of the intelligent appearance monitoring management system 570 may be separately trained for each information handling system (e.g., including 500) in communication with or managed by the information handling system performance optimizer application 575 in an embodiment. Such a training session may be performed based on the neural network input values gathered via the multimedia processing control API 576, as described with respect to FIG. 7 at blocks 704, 706, 708, 710 and 712. Upon training of such a neural network unique to each information handling system (e.g., 500), the neural network may be ready to determine appearance anomalies and optimized remediating image adjustment for the information handling system for which it was trained (e.g., as described in greater detail with respect to block 718), based on updated input values.

At block 716, the intelligent appearance monitoring management system in an embodiment may receive meeting metrics for the training session from the MMCA. For example, in an embodiment described with reference to FIG. 5, the intelligent appearance monitoring management system 570 may be in communication with the MMCA 550 executing the training user session at the information handling system 500. In another embodiment, described with reference to FIG. 6, the intelligent appearance monitoring management system 670 may receive meeting metrics from the MMCA host server 653 that hosts the training session. The intelligent appearance monitoring management system 670 may receive one or more meeting metrics describing performance of the MMCA during execution of such a training user session in an embodiment. Such meeting metrics may include, for example, a measure of the CPU, GPU, and other processing resources consumed by the MMCA over time, during the training user session. Other example meeting metrics may include a measure of memory resources consumed. Still other example meeting metrics may compare CPU or other processors or memory usage by the MMCA to total CPU or other processors or memory used by all applications, hardware, or firmware during the training user session. For example, such meeting metrics may be input for when one or more appearance filtering adjustment instructions are executed to, for example, alter a user's image within captured videoframes during a videoconferencing session.

Such meeting metrics may also describe the performance of media sample processing, transmission, and playback among a plurality of information handling systems engaged in a single user session for the MMCA. For example, meeting metrics gathered by the intelligent appearance monitoring management system during a training session may describe latency, or a measurement of time elapsing between a first information handling system transmitting the processed, encoded media sample and a second information handling system receiving the processed, encoded media sample. As another example, meeting metrics may include a measurement of jitter, or a comparison between latency of playback for a media sample from one of the meeting participants, and latency of playback for another media sample from another of the meeting participants. Such jitter may cause the two separate media samples, which may have been recorded simultaneously, to playback such that they are out-of-sync with one another. Still other meeting metrics in an embodiment may measure bandwidth consumed by the MMCA, type of network used to transmit and receive media samples, packet loss (e.g., of video or audio samples), resolution and frames per second of video samples (both at the transmitting side and the receiving side), audio bitrate (both at the transmitting side and the receiving side), and one or more codecs or compression algorithms in use. In some embodiments, jitter, packet loss, latency, resolution, and frames per second may be measured separately for one or more of audio samples, video samples, and screen sharing samples. In still other examples, meeting metrics may be gathered by the MMCA host server 653, and may describe the number of users, which users are screensharing, which users are using virtual backgrounds, which users are muted, and which participants are hosting, among other descriptions of participation among a plurality of users in a single videoconference session.

A neural network may be trained in an embodiment to model the relationship between identification of user appearance anomalies in captured videoframes by the MMCA and corrective measures or user notification messages based on all inputs received at the intelligent appearance monitoring management system at block 718. The intelligent appearance monitoring management system may input each of the values gathered from the multimedia processing control API and the MMCA into a multi-layered, feed-forward, machine-learning neural network to train the neural network to model the relationship between one or more of the input values such as reference user images from videoframes gathered at block 712, identification of user appearance anomalies, and identification of one or more alterations to videoframes available via AV processing instruction modules as gathered at block 708. For example, the neural network may correlate rounds of captured videoframes including a user image with certain captured reference videoframes including a user image representing a typical user appearance. Additionally, the neural network may correlate round of captured videoframes with identification of one or more user appearance anomalies within those user images for a user videoconference session in some embodiments. The neural network may also correlate rounds of captured videoframes including a user image and identification of one or more user appearance anomalies within those user images with media capture setting adjustments, AV processing instruction adjustments, or offload setting adjustments in yet other embodiments. Additional meeting metrics input may include the CPU or other processor resource load consumed by the MMCA and any optimized appearance filtering adjustments applied during a user session, or latency, jitter, or packet loss as measured by the MMCA during a user session.

The intelligent appearance monitoring management system in an embodiment may model a multi-layered, feed-forward, machine-learning classifier neural network in an embodiment, for example, convolutional neural network such as a deep-learning 4 (DL4) neural network. In other embodiments, the neural network in an embodiment may comprise a multi-layer perceptron (MLP) classifier neural network. Several such multi-layered feed-forward, machine-learning classifier neural networks exist in the art, and any of these networks may be chosen to model this relationship captured videoframes with a user image and identification of user appearance anomalies as well as optimized appearance filter adjustment instructions to notify a user or alter a user image in captured videoframes via adjustment to media capture settings, AV processing instruction adjustment, offload setting adjustments, or various meeting metrics for the MMCA in an embodiment. For example, the DL4 neural network may operate in a Java programming language (e.g., DL4J), or within the Scala programming language (e.g., DL4S). Other deep-learning neural networks may be modeled using Apache® Maven®, for example. In still other embodiments, the DL4 neural network may be modeled using a plurality of classifiers, including a linear MLP classifier, a Moon MLP classifier, or a Saturn MLP classifier. Each of these types of MLP classifiers in an embodiment may define a different activation function that operates to define a relationship between separate layers of the neural network. These are only a few example multi-layer neural networking types that may be implemented in embodiments herein.

The neural network may include a plurality of layers, including an input layer, one or more hidden layers, and an output layer. The setting selections for intelligent appearance monitoring, captured reference videoframes and criteria of user appearance anomalies, default media capture settings, default AV processing instruction module setting adjustments, default offload settings, and meeting metrics gathered at blocks 702, 704, 706, 708, 710, 714, and 716 may form the input layer of the neural network in an embodiment. These input layers may be forward propagated through the neural network to produce an initial output layer that includes predicted identification of user appearance anomalies as example criteria of those anomalies, predicted media capture settings, predicted AV processing instruction adjustments, predicted offload settings, and predicted meeting metrics values. Such predicted meeting metrics values in an embodiment may include, for example, CPU resource load consumed by the MMCA, or various other meeting metrics (e.g., latency, jitter, packet loss) for the MMCA as measured during the training session.

Actual or known values for of a user's appearance may have been gathered in the captured videoframes including user reference images at block 712, and other actual or known values may include criteria for identification for user appearance anomalies from other user reference images of user appearance anomalies in videoframes. Further, meeting metrics (e.g., as predicted within the output layer) may have been gathered at block 716 in an embodiment. Additionally, the intelligent appearance monitoring management system may have received known values for the media capture settings, AV processing instruction adjustments, and offload settings at blocks 706, 708 and 710. Each of the output nodes within the output layer in an embodiment may be compared against such known values to generate an error function for each of the output nodes. This error function may then be back propagated through the neural network to adjust the weights of each layer of the neural network. The accuracy of the predicted meeting metric values (as represented by the output nodes) may be optimized in an embodiment by minimizing the error functions associated with each of the output nodes. Such forward propagation and backward propagation may be repeated serially during training of the neural network, adjusting the error function during each repetition, until the error function for all of the output nodes falls below a preset threshold value. In other words, the weights of the layers of the neural network may be serially adjusted until the output node for each of the captured videoframes including reference images of a user to identify anomalies in appearance that may be associated with user appearance anomalies that may be monitored according to selection options by a user via user interface selections. The weights of the layers of the neural network may be adjusted until the identification of particular types of user appearance anomalies is accurately predicted based on the known values of user appearance anomalies, based on known values of typical user appearance values, or some combination. In such a way, the neural network may be trained to provide the most accurate output layer, including a prediction of an identified user appearance anomaly recognized in an image of a user within captured videoframes. Additionally, the layers of the neural networks may be serially adjusted until an output node associates meeting metrics, media capture setting adjustments, AV processing instruction adjustments, and offload setting adjustments to accurately predict the known values received at blocks 706, 708 or 710 for applying any alterations to a user's image in capture videoframes. In such a way, the neural network may be trained to provide the most accurate output layer, including a prediction of the MMCA performance, based on various media capture settings, AV processing instruction adjustments, and offload settings.

Such a training of the neural network in an embodiment based on known values received at blocks 706, 708, 710 and 712 during a user session of the MMCA may comprise a single training session. Such a training session in an embodiment may be repeated for several user sessions and further may include ongoing training updates to the neural network when feedback is received from a user, for example, about identification of the user appearance anomalies. Notification of a user appearance anomaly to a user, as well as various media capture settings, AV processing instruction adjustments, and offload settings may be applied as appearance filtering adjustments, and in varying combinations with respect to one another, during these several user sessions. In such a way, the neural network may be trained to predict performance of the appearance filtering adjustments, including feedback to the user of the MMCA in a plurality of varying conditions.

At block 720, the intelligent appearance monitoring management system in an embodiment may transmit the trained neural network to the information handling system for which it has been trained for optimization of performance of the MMCA at that information handling system during future user sessions. For example, in an embodiment described with respect to FIG. 5, upon training of the neural network unique to each information handling system (e.g., 500), the neural network may be ready to determine optimized appearance filtering adjustments conducted on the information handling system for which it was trained, based on updated input values. In some embodiments, this determination may be made by the trained neural network operating at the intelligent appearance monitoring management system 570, located remotely from the information handling system 500. In other embodiments, the trained neural network for information handling system 500 may be transmitted from the intelligent appearance monitoring management system 570 to an agent 571 thereof, operating at the information handling system 500. The method for training the neural network in an embodiment may then end.

Figure 8:
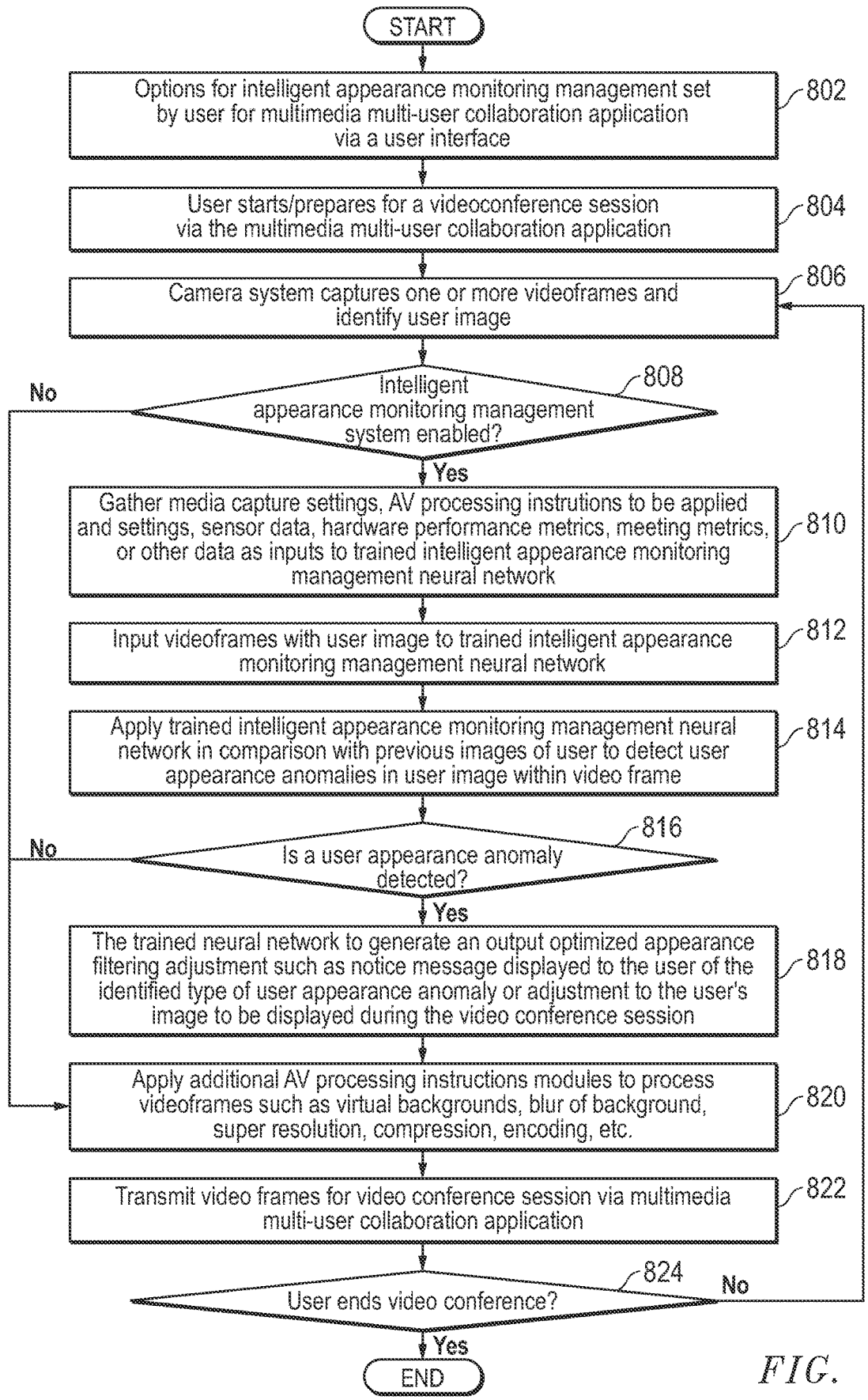
FIG. 8 is a flow diagram illustrating a method of determining optimized appearance filtering adjustment or notification to intelligently monitor and adjust a user's appearance during usage of an information handling system for a videoconferencing session according to an embodiment of the present disclosure.

FIG. 8 is a flow diagram illustrating a method of executing a trained neural network of an intelligent appearance monitoring management system according to an embodiment of the present disclosure. In particular, the trained intelligent appearance monitoring management system neural network may be utilized in detecting types of user appearance anomalies that may be present in the user's image in captured videoframes for use with a videoconferencing session. Additionally, the trained intelligent appearance monitoring management system neural network may be utilized in determining one or more optimized appearance filter adjustment instructions. Those optimized appearance filter adjustment instructions output from the trained intelligent appearance monitoring management system neural network may notify a user of detected types of user appearance anomalies or alter a user image in captured videoframes in response to detecting user appearance anomalies. Alterations to the user's image in captured videoframes may include invoking or adjusting one or more types of user optimized media capture instructions, optimized AV processing instruction adjustments, or optimized offload instructions. The optimized appearance filter adjustment instructions may also be used for optimization of performance of the MMCA during execution of a user session, such as when implementing user image alteration strategies, according to an embodiment of the present disclosure. As described in some detail with respect to FIG. 7, by comparing different captured images to criteria of determining user appearance anomalies as learned from reference images used in training the neural network, as well as inputting settings for the media capture, AV processing instruction modules applied to the captured media, and the processors used to execute such AV processing instruction modules to these performance measurements, the neural network may identify one or more user appearance anomalies and optimized appearance filter adjustment instructions. Feeding input values gathered during a post-training user session into such a trained neural network in an embodiment may produce outputs for identification of types of user appearance anomalies or optimized appearance filter adjustment instructions during execution of a later (e.g., post training) user video conference session via the MMCA at the information handling system.

Starting at block 802, the intelligent appearance monitoring management system may obtain control setting options indicating a selection by a user to utilize the intelligent appearance monitoring management system service. Such a service may be provided, in whole or in part, remotely via an information handling system optimizer application and system or may be available, in any portion, at the user's information handling system as described herein. In an embodiment, the information handling system optimizer application or the local information handling system may generate a user interface for the intelligent appearance monitoring management system presented to the user with selections for activating the software service. In some embodiments, the intelligent appearance monitoring management system may provide for more specific settings selectable by a user. For example, the intelligent appearance monitoring management system user interface may offer selection by a user to set what types of user appearance anomalies to monitor during videoconference calls In another embodiment, the intelligent appearance monitoring management system user interface may offer selection by a user to set what type of response is desired if the user appearance anomalies are detected, such as a notification message displayed to a user or some type of alteration or replacement to the user's image in the videoframes for the videoconference. Such user selection settings may be applied to both the trained intelligent appearance monitoring management system neural network as inputs as well as used for any AV processing instruction modules or intelligent appearance monitoring management system software that may further assist in generating notice messages or altering the image of the user in the videoframes in various embodiments.

At block 804, a plurality of information handling systems may join a user videoconference session within the MMCA in an embodiment. One or more of the participant information handling systems may have intelligent appearance monitoring management system neural networks that have been trained for users of those information handling system. For example, in an embodiment described with reference to FIG. 6, a source information handling system 601 and a sink information handling system 602 may both join a videoconference user session via the MMCA host server 653. The user videoconference session joined at block 804 may be joined by any number of information handling systems. The MMCA may manage authenticating one or more invited participants, establishing communication and data links between participants, enabling features of the videoconference such as document sharing, and similar operations of the MMCA.

Proceeding to block 806, during the user videoconference session, each of the participating information handling systems that have joined the videoconference user session may initially capture media samples, including videoframes. In one embodiment, the capture of videoframes may be conducted before the videoconference session begins, for example, as the user logs in. In other embodiments, videoframes may be gathered during the videoconference session or upon the user activating the video camera during the session. These captured videoframes may be taken according to default media capture instructions or most recent media capture settings for the video camera in some embodiments.

At block 808, the intelligent appearance monitoring management system at a remote location or operating at an agent on the user's information handling system may determine whether the intelligent appearance monitoring management system is activated for the videoconference session. For example, the intelligent appearance monitoring management system may determine whether the intelligent appearance monitoring management system user interface was used to enable intelligent appearance monitoring and what types of monitoring, notice, or adjustments have been set. If the intelligent appearance monitoring management system has been enabled to intelligently monitor user appearance, then flow may proceed to block 810 with gathering additional inputs for the trained intelligent appearance monitoring management system neural network. If the intelligent appearance monitoring management system has not been enabled, then flow may proceed to block 820 to conduct any AV processing of captured videoframes as well as other AV data to conduct a videoconference session via the MMCA as would otherwise operate without intelligent appearance monitoring or adjustments.

The intelligent appearance monitoring management system in an embodiment may gather all the inputs for the neural network from the multimedia processing control API and MMCA at block 810. For example, the intelligent appearance monitoring management system in an embodiment may acquire inputs similar to the method described with reference to blocks 704, 706, 708, 710, and 716 in an embodiment in order to gather current media capture settings, current AV processing instruction modules, current offload settings, and the hardware performance metrics and meeting metrics for the MMCA resulting from application of these settings, whether default or modified by previous application of the intelligent appearance filtering management session optimized settings, instructions or adjustments. The values gathered at block 810 may further include MMCA meeting metrics as described in various embodiments herein. Additional inputs may include indication of which AV processing instruction modules may be active such as application of different types of virtual backgrounds or blurred backgrounds. Other active AV processing instruction modules may be detected and gathered as inputs to the trained neural network (e.g., eye contact correction, user framing, zoom and face normalizer, etc.), and may include a type of different algorithms used for various AV processing instruction modules (e.g., compression, boundary detection, etc.) and the like applied to post-processing the videoframes captured including an image of a user.

The values gathered at block 810 in an embodiment may include meeting metrics recorded by the MMCA host server, or agents thereof operating at each of the participating information handling systems. For example, in an embodiment described with reference to FIG. 6, the MMCA host server 653 may record meeting metrics for the user session joined by the plurality of information handling systems at block 802. The MMCA meeting metrics may include inputs that identify a number of participants, varying presentation displays, activity of the user's engagement with the MMCA (e.g., using a messaging service incorporated therewithin) such as identification of one or more users as a host, or identification of one or more users as sharing screens, or whether a user mutes the microphone or turns off the video camera system for example. These metrics may include an identification of all information handling systems (e.g., 601 and 602) participating in the current videoconference user session (e.g., 601 or 602).

Other gathered inputs may be sensor data from the sensor hubs (e.g., the via a multimedia processing control API 621 or 622) of each of the participating information handling systems (e.g., 601 and 602). Such sensor information in an embodiment may include, for example, color and shade detectors which may assist in analysis of captured videoframes, IR camera, proximity sensor (or other camera) detection of a user's presence within a certain distance from the information handling system (e.g., 601 or 602) to assist in implementing zoom adjustments or face framing as well as identifying the user image within captured videoframes, or similar relevant sensor data. The gathered input data described above may be input into the trained intelligent appearance monitoring management system neural network.

The user's information handling system may transmit captured videoframes from before or during the current videoconference session to the trained intelligent appearance monitoring management system neural network at block 812. As described, the trained intelligent appearance monitoring management system may be convolutional neural network or other neural network suitable for analysis of image data, such as for image recognition type analysis. As described with respect several embodiments herein, the trained intelligent appearance monitoring management system neural network is trained with previous reference images of a user and may in particular be trained with respect to user image components such as face, hair, skin, eyes and other aspects for which the trained neural network may analyze the input captured videoframes for user appearance anomalies. For example, the trained intelligent appearance monitoring management system neural network may be trained to recognize typical appearance or aberrations in skin tone or texture, in hair and its appearance, shape, texture or color, in facial expressions such as with cough or sneeze events, or in eye color or texture for detection of various example user appearance anomalies for which the user's captured videoframes may be monitored.

Per embodiments describing the trained neural network, the outputs generated may include identification of one or more user appearance anomalies. For example, if selected as options in some embodiments, the trained intelligent appearance monitoring management system neural network may identify a blemish or smudge on a user's face, may identify an unshaven face or one without makeup (if normally a face is shaved or makeup is used), may identify hair being out of place (i.e., a bad hair day), may identify bloodshot eyes, may identify a cough or sneeze event by the user, or identify other user appearance anomalies in the videoframes captured for a videoconference session. In some embodiments, monitoring for user appearance anomalies may be assisted by one or more AV processing instruction modules. For example, a bad hair day AV processing instruction module may determine identification of the hair on a user's image within captured videoframes. In another example embodiment, a bloodshot eyes AV processing instruction module may be utilized to identify a location of a user's eyes within the user's image in the captured videoframes. In yet another example embodiment, a boundary detection AV processing instruction module may process the captured videoframes for identification of the user's image within the videoframe, location of the hair of a user in the image, location of the face or eyes of the user, or to reduce the area of the videoframe needing to be analyzed for user appearance anomalies. It is contemplated that other AV processing instruction modules may execute code instructions for videoframe processing, such as color sensor detection and analysis across the videoframe to assist in detection of user appearance anomalies. Data from AV processing instruction modules so executed and described in embodiments herein to assist detection may be provided as inputs for analysis by the trained intelligent appearance monitoring management system neural network according to various embodiments.

Flow may proceed to block 816 where the intelligent appearance monitoring management system may determine whether any user appearance anomaly has been detected in one or more captured videoframes input into the trained intelligent appearance monitoring management system neural network. If at least one user appearance anomaly has been identified for which the intelligent appearance monitoring management system is conducting intelligent monitoring, then flow may proceed to block 818 for the neural network to generate an optimized appearance filtering adjustment, such as to provide notice to a user or to conduct an alteration to the user's image in the captured videoframes. If no user appearance anomalies have been identified for which the intelligent appearance monitoring management system is conducting intelligent monitoring, then flow may proceed to block 820 to conduct any AV processing of captured videoframes as well as other AV data that may be otherwise applied to conduct a videoconference session via the MMCA.

At block 818, in an embodiment in which it has been determined that a user appearance anomaly has been detected, the trained intelligent appearance monitoring management system neural network may associate the one or more user appearance anomalies detected with corresponding optimized appearance filtering adjustments for a response. The trained neural network may operate to determine which optimized appearance filtering adjustments have been set to be used with the intelligent monitoring of the user's appearance by the intelligent appearance monitoring management system. For example, the trained intelligent appearance monitoring management system neural network may correlate one or more types of notification message to be displayed on the display screen of the user's information handling system with corresponding one or more detected user appearance anomalies in a videoframe or a series of videoframes in an embodiment. The displayed user appearance anomaly notification message may further include a user interface offering possible solutions such as whether a user would like to just use a stock image in place of the streaming videoframes, invoke some type of image correction or other alteration, or to turn off the video camera during the videoconference session in example embodiments. The trained intelligent appearance monitoring management system neural network will have been trained in some embodiments to correlate the identified user appearance anomalies, selection of options to remedy the detected user appearance anomalies such as to provide a notice, and the resulting output optimized appearance filtering adjustment including an instruction to generate a particular notice message in embodiments herein.

In another embodiment, the trained intelligent appearance monitoring management system neural network may correlate one or more types of output optimized appearance filtering adjustments for altering the user's image within a videoframe that corresponds with the detection of one or more user appearance anomalies. For example, the trained neural network may generate optimized appearance filtering adjustments by invoking or adjusting processing of the captured videoframes via one or more AV processing instruction modules to alter the user's image, replace the user's image, or correct the user's image in the videoframes. A detected user appearance anomaly may correspond with one or more potential alterations to the user's image in the videoframes based on options selected in the intelligent appearance monitoring management system user interface or as those selections influence the trained intelligent appearance monitoring management system neural network in some example embodiments. For example, the trained intelligent appearance monitoring management system neural network may correlate a detected user appearance anomaly with replacing the videoframes with a stock image of the user or another stock image in one embodiment. In another embodiment, the trained intelligent appearance monitoring management system neural network may correlate a detected user appearance anomaly with applying an appearance filtering AV processing instruction module to make colorization, shading, texture, or blending adjustments via operation of a convolutional neural network to a portion of the user's image in the captured videoframes. In yet another embodiment, the trained intelligent appearance monitoring management system neural network may correlate a detected user appearance anomaly with application of a blur or coverage with an image or blank color of all or part of the user's image in the captured videoframe such as via a virtual background or blur module that may operate to apply an image or blur the foreground user image for purposes of masking the detected user appearance anomaly. Such an AV processing instruction module may work in tandem with an outline detection module in an example embodiment. In one other embodiment, the trained intelligent appearance monitoring management system neural network may correlate a detected user appearance anomaly with application of an AV processing instruction module that may apply a cartoonification of the user's image, and of the background in some embodiments, to cover or mask any detected user appearance anomalies. These are just some example embodiments of alteration to a user's image in captured videoframes that may be instructed by an output optimized appearance filtering adjustment from a trained neural network.

In a further embodiments, the alterations to the user image in the captured videoframes may be consistent throughout a duration of a videoconference session in some embodiments or may be for a temporary duration of the video conference. In an example embodiment, a temporary duration may be applied during a detected cough or sneeze event by the user, last for the duration of the cough or sneeze event, or in some aspects for a period after the cough or sneeze event. In another embodiment example, a temporary duration may be applied for the alteration of a user's image to limit the alteration to duration periods when a user may be speaking as detected by microphone or audio data. In yet another example embodiment, a temporary duration may be applied during a period of time after a notice message is provided to a user about the detected user anomaly giving the user time to fix their hair or wipe their face, or make other adjustments. In some embodiment, the notice message displayed to a user may also include a user interface or feedback selector to allow the user to decline the image alteration. Such user feedback may be used as inputs to update or train the intelligent appearance monitoring management system neural network.

As another embodiment, more than one type of user image alteration may be applied by output optimized appearance filtering adjustment by the trained neural network. For example, depending on participation of the user in the videoconference session, the trained intelligent appearance monitoring management system neural network may apply an image correction to mask or fix the user appearance anomaly when the user is speaking, and apply a stock image or blur the user's image in the videoframes when the user is passively listening.

Additionally, the trained the trained intelligent appearance monitoring management system neural network may correlate one or more types detected user appearance anomalies and output optimized appearance filtering adjustments to alter the user's image in a videoframe or a series of videoframes with further output instruction to adjust media acquisition settings or to invoke processor offload instruction adjustments to assist with the computational burden of conducting the image alteration in the videoframes, if applicable. Such adjustments to media acquisition settings may alter or adjust resolution or other factors of the operation of the video camera which may assist in remedying the correction or alteration of the user's image in some embodiments. In other embodiments, the adjustments to the media acquisition settings may be made to reduce the AV data burden for computations in other embodiments.

Processor offload instruction adjustments may be made to assist in providing for alterations to a user's image within videoframes as part of optimized appearance filtering adjustments to alter the user's image in a videoframe in some example embodiments. For example, the trained neural network may determine optimized media capture instructions, optimized AV processing instruction adjustments, or optimized offload instructions for optimizing performance of the MMCA at each of the participating information handling systems when image alteration is conducted in some embodiments pursuant to optimized appearance filtering adjustments. Thus, decreasing the size of the streaming audio and video samples captured at the user's information handling system via optimized media capture instructions may decrease latency, jitter, or the number of dropped packets experienced by each of the participating information handling systems. Similarly, decreasing the number or complexity of AV processing instruction modules performed on these audio and visual samples, both at the information handling system of interest and at the other participating information handling systems may decrease the processing resources consumed at the information handling system of interest by the MMCA. This may also decrease latency and jitter, as well as freeing up processing resources for execution of other applications at the information handling system of interest, thus improving overall performance of that information handling system. For example, the trained neural network may accurately predict the relationship between media capture settings, AV processing instruction modules, and various performance meeting metrics for the MMCA. Also, one or more of the meeting metrics input into the neural network in such an embodiment may include a preset performance benchmark value for comparison to the actual gathered or measured meeting metric value, in order to define a performance goal for the MMCA for when an optimized appearance filtering adjustments is implemented for altering a user's image in a videoframe that may consume substantial processing resources. For example, the MMCA may be consuming 30% of CPU resources at the time this value is gathered above in an embodiment. The intelligent appearance monitoring management system in such an embodiment may input a capped value of 20%, instead of the actual measured value of 30% in order to indicate a desired performance benchmark that caps CPU resources consumed by the MMCA and its processing of videoframes and audio data at 20%. This is only one example of such a capped processing resource value. In other embodiments, the processing cap may apply to other processors (e.g., GPU, VPU, or GNA), or may have a different value (e.g., 10%). In some embodiments, the optimized appearance filtering adjustments may include an offload instruction adjustment to shift some of the video processing engine tasks for executing one or more AV processing instruction modules to another processor such as the GPU, VPU, GNA or other processing resource when the intelligent appearance monitoring management system is operating to intelligently monitor or adjust a user's appearance in videoframes in an embodiment.

Proceeding to block 820, the MMCA may apply any additional AV processing instructions modules to the captured videoframes or audio data to conduct the videoconference session. For example, virtual background or background blur may be invoked by the user of the MMCA for the videoconference session. Additionally, the MMCA may utilize AV processing instruction modules such as super resolution algorithms, boundary detection algorithms, face framing algorithms, zoom or face sizing algorithms, color or shading adjustment algorithms or others to process the videoframes in preparation for transmission in the videoconference session. Additionally, encoding AV processing instruction modules and compression AV processing instruction modules may be used for encoding and compressing the videoframes for transmission via the MMCA in the videoconference session according to various algorithms of embodiments of the present disclosure or understood by those of skill.

At block 822, the participating information handling systems may alter the user's image in a videoframe from captured media samples and process according to the optimized appearance filtering adjustments output by the trained intelligent appearance monitoring management system neural network if any apply according to embodiments herein. For example, the captured media samples may apply processing to alter a user's appearance in captured videoframes or generate a notification of detected user appearance anomalies detected in the videoframes in response to the identification of user appearance anomalies. Adjustments to media capture settings and to processor utilization may also occur during the videoconference session in capture and preparation of videoframes for transmission at 822. Then the user information handling system may transmit encoded and compressed videoframes and audio data via the MMCA for purposes of conducting the videoconference session. In such a way, the intelligent appearance monitoring management system may direct the optimized appearance filtering adjustments applied to the transmitted video frames notify the user of a user appearance anomaly detected or to alter the user's image to benefit the user from a potentially embarrassing or otherwise undesirable user appearance anomaly according to various embodiments herein.

At block 824, the MMCA or the intelligent appearance monitoring management system may receive an indication that the videoconference session has ended. If not, the flow may proceed back to block 806 to continue capturing more video frames and continue to intelligently monitor the user's appearance according to the method steps described for FIG. 8 above. If the videoconference is ended, the method of intelligently monitoring user appearance during videoconference sessions of the MMCA on the user's information handling system may then end.

Figure 9A:
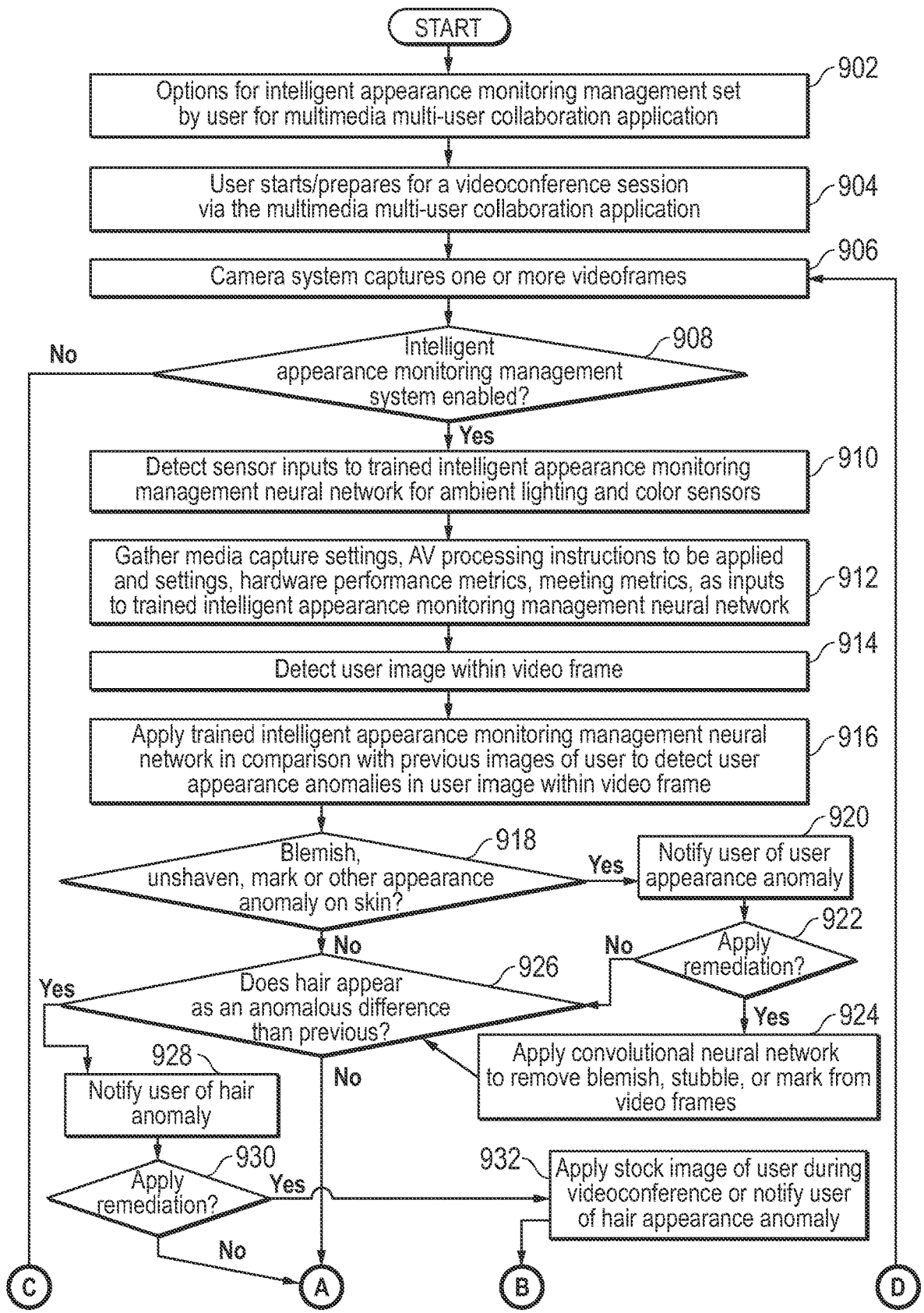
FIG. 9A is a flow diagram illustrating a method of determining optimized appearance filtering adjustment or notification to intelligently monitor and adjust a user's appearance during usage of an information handling system for a videoconferencing session according to another embodiment of the present disclosure.
Figure 9B:
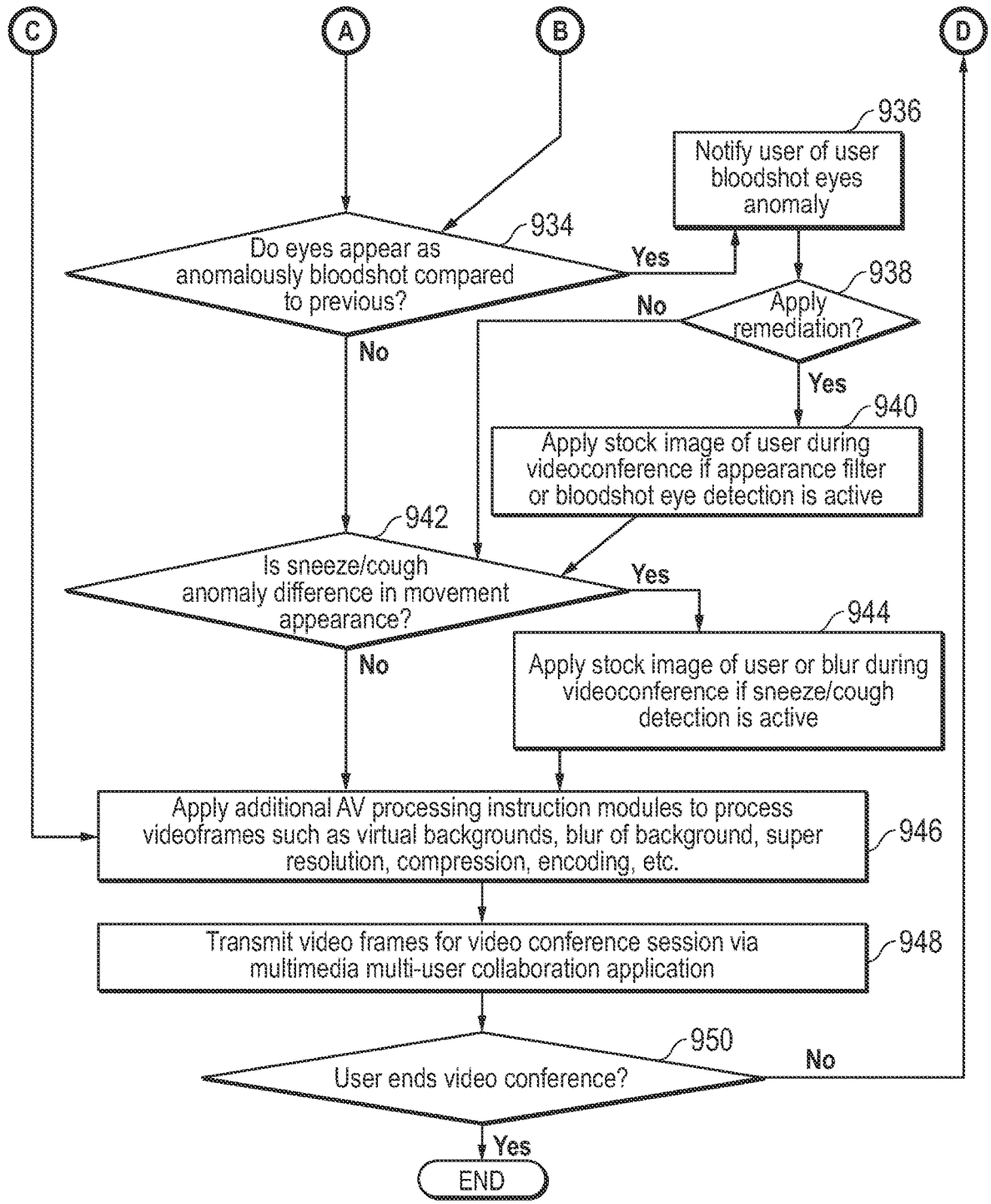
FIG. 9B is another flow diagram illustrating a method of determining optimized appearance filtering adjustment or notification to intelligently monitor and adjust a user's appearance during usage of an information handling system for a videoconferencing session according to an embodiment of the present disclosure according to another embodiment of the present disclosure.

FIGS. 9A and 9B are a flow diagram illustrating a method of executing a trained neural network of an intelligent appearance monitoring management system according to another embodiment of the present disclosure. In particular, the trained intelligent appearance monitoring management system neural network may be utilized in detecting types of user appearance anomalies that may be present in the user's image in captured videoframes for use with a videoconferencing session. Additionally, the trained intelligent appearance monitoring management system neural network may be utilized in determining one or more optimized appearance filter adjustment instructions as described in embodiments herein. Those optimized appearance filter adjustment instructions output from the trained intelligent appearance monitoring management system neural network may notify a user of detected types of user appearance anomalies. Notification may include an option selectable by a user in the notice message to initiate application of an anomaly remediation or correction or to turn off an automatically applied anomaly remediation or correction alteration of a user image in captured videoframes in response to detecting user appearance anomalies. Alterations to the user's image in captured videoframes may also include invoking or adjusting one or more types of user optimized media capture instructions, optimized AV processing instruction adjustments, or optimized offload instructions. The optimized appearance filter adjustment instructions may also be used for optimization of performance of the MMCA during execution of a user session, such as when implementing user image alteration strategies, according to an embodiment of the present disclosure. Execution of trained intelligent appearance monitoring management system neural network may analyze different captured images to criteria of determining user appearance anomalies as learned from reference images used in training the neural network, as well as based on other inputs as described.

Starting at block 902, the intelligent appearance monitoring management system may obtain control setting options for settings to the intelligent appearance monitoring management system service intelligent appearance monitoring features. In an embodiment, the information handling system optimizer application or the local information handling system may generate a user interface for the intelligent appearance monitoring management system presented to the user with a selections of whether to activate the intelligent appearance monitoring software service. In additional embodiments, the intelligent appearance monitoring management system user interface may also provide for more specific initial settings selectable by a user. For example, the intelligent appearance monitoring management system user interface may offer selection by a user to set what types of user appearance anomalies to monitor during videoconference calls In another embodiment, the intelligent appearance monitoring management system user interface may offer selection by a user to set what type of default response is desired if the user appearance anomalies are detected, such as a only a notification message displayed to a user or an option of provided for some type of alteration or replacement to the user's image in the videoframes for the videoconference. Such initial user selection settings may be applied to both the trained intelligent appearance monitoring management system neural network as inputs as well as used for any AV processing instruction modules or intelligent appearance monitoring management system software that may further assist in generating notice messages or altering the image of the user in the videoframes in various embodiments.

At block 904, a plurality of information handling systems may join a user videoconference session within the MMCA in an embodiment. One or more of the participant information handling systems may have intelligent appearance monitoring management system neural networks that have been trained for users of those information handling system. For example, in an embodiment described with reference to FIG. 6, a source information handling system 601 and a sink information handling system 602 may both join a videoconference user session via the MMCA host server 653. The user videoconference session joined at block 904 may be joined by any number of information handling systems. The MMCA may manage authenticating one or more invited participants, establishing communication and data links between participants, enabling features of the videoconference such as document sharing, and similar operations of the MMCA.

Proceeding to block 906, during the user videoconference session, each of the participating information handling systems that have joined the videoconference user session may initially capture media samples, including videoframes. In one embodiment, the capture of videoframes may be conducted before the videoconference session begins, for example, as the user logs in. In other embodiments, videoframes may be gathered during the videoconference session or upon the user activating the video camera during the session. These captured videoframes may be taken according to default media capture instructions or most recent media capture settings for the video camera in some embodiments.

At block 908, the intelligent appearance monitoring management system at a remote location or operating at an agent on the user's information handling system may determine whether the intelligent appearance monitoring management system is activated for the videoconference session. For example, the intelligent appearance monitoring management system may determine whether the intelligent appearance monitoring management system user interface was used to enable intelligent appearance monitoring and what types of monitoring, notice, or adjustments have been set. If the intelligent appearance monitoring management system has been enabled to intelligently monitor user appearance, then flow may proceed to block 910 with gathering additional inputs for the trained intelligent appearance monitoring management system neural network. If the intelligent appearance monitoring management system has not been enabled, then flow may proceed to block 920 to conduct any AV processing of captured videoframes as well as other AV data to conduct a videoconference session via the MICA as would otherwise operate without intelligent appearance monitoring or adjustments.

At block 910, the intelligent appearance monitoring management system may gather sensor data inputs gathered from the sensor hubs and from a multimedia processing control API of the participating information handling system. Such sensor information in an embodiment may include, for example, color and shade detectors which may assist in analysis of captured videoframes, IR camera, proximity sensor (or other camera) detection of a user's presence within a certain distance from the information handling system to assist in implementing zoom adjustments or face framing as well as identifying the user image within captured videoframes, or similar relevant sensor data. The gathered input data described above may be input into the trained intelligent appearance monitoring management system neural network.

Proceeding to 912, the intelligent appearance monitoring management system in an embodiment may gather additional inputs for the neural network from the multimedia processing control API and MMCA at block 912. For example, the intelligent appearance monitoring management system in an embodiment may acquire inputs similar to the method described with reference to blocks 704, 706, 708, 710, and 716 in an embodiment in order to gather current media capture settings, current AV processing instruction modules, current offload settings or selected processor, and the hardware performance metrics and meeting metrics for the MMCA resulting from application of these settings, whether default or modified by previous application of the intelligent appearance monitoring management session optimized settings, instructions or adjustments. The values gathered at block 912 may further include MMCA meeting metrics as described in various embodiments herein. Additional inputs may include indication of which AV processing instruction modules may be active for post-processing captured media for general purposes of conducting a videoconference call or those that may be available to implement alterations to a user's image in captured videoframes when one or more user appearance anomalies are detected. Current inputs for the videoconference session similar to those described in FIG. 8 for MMCA meeting metrics, hardware performance metrics may be gathered as well and used as trained neural network inputs.

As described above, the MMCA may capture videoframes of s user before or during the current videoconference session and those videoframes may have some post processing applied to identify the user's image within the videoframes. For example, a boundary detection AV processing instruction module may be executed to detect the boundary outline of the user within the videoframes in an embodiment. Additionally, a face recognition AV processing instruction module may be executed to identify a location of a face or the center of a face in video frames in an embodiment. A bad hair day detection AV processing instruction module may be executed to identify the user's hair in the videoframes in an embodiment. A face detection AV processing instruction module or an eye contact correction AV processing instruction module may be executed to determine the location of the eyes of a user in some embodiments. A cough or sneeze mitigation AV processing instruction module may be executed for image recognition to detect a cough or sneeze event in some embodiments. Data generated from these and other AV processing modules that may post-process captured videoframes to detect the user's image or portions of the user's image may transmit that data for input into the trained intelligent appearance monitoring management system neural network (operating remotely or locally). The user's information handling system may also transmit the captured videoframes to the trained intelligent appearance monitoring management system neural network (operating remotely or locally) at block 914.

At block 916, the intelligent appearance monitoring management system applies the inputs, including the captured videoframes including user image within the videoframes, to its trained neural network. As described in example embodiments, the trained intelligent appearance monitoring management system may be convolutional neural network or other neural network suitable for analysis of image data, such as for image recognition type analysis. As described with respect several embodiments herein, the trained intelligent appearance monitoring management system neural network is trained with previous reference images of a user and may in particular be trained with respect to user image components such as face, hair, skin, eyes and other aspects for which the trained neural network may analyze the input captured videoframes for user appearance anomalies. For example, the trained intelligent appearance monitoring management system neural network may be trained to recognize typical appearance or aberrations in skin tone or texture, in hair and its appearance, shape, texture or color, in facial expressions such as with cough or sneeze events, or in eye color or texture for detection of various example user appearance anomalies for which the user's captured videoframes may be monitored.

Per embodiments describing the trained neural network, the outputs generated may include identification of one or more user appearance anomalies. For example, if selected as options in some embodiments, the trained intelligent appearance monitoring management system neural network may identify a blemish or smudge on a user's face, may identify an unshaven face or one without makeup (if normally a face is shaved or makeup is used), may identify hair being out of place (i.e., a bad hair day), may identify bloodshot eyes, may identify a cough or sneeze event by the user, or identify other user appearance anomalies in the videoframes captured for a videoconference session. In some embodiments, monitoring for user appearance anomalies may be assisted by one or more AV processing instruction modules. For example, a bad hair day AV processing instruction module may determine identification of the hair on a user's image within captured videoframes. In another example embodiment, a bloodshot eyes AV processing instruction module may be utilized to identify a location of a user's eyes within the user's image in the captured videoframes. In yet another example embodiment, a boundary detection AV processing instruction module may process the captured videoframes for identification of the user's image within the videoframe, location of the hair of a user in the image, location of the face or eyes of the user, or to reduce the area of the videoframe needing to be analyzed for user appearance anomalies. It is contemplated that other AV processing instruction modules may execute code instructions for videoframe processing, such as color sensor detection and analysis across the videoframe to assist in detection of user appearance anomalies. Data from AV processing instruction modules so executed and described in embodiments herein to assist detection may be provided as further inputs for analysis by the trained intelligent appearance monitoring management system neural network according to various embodiments.

Flow may proceed to block 918 where the intelligent appearance monitoring management system may determine whether a user appearance anomaly has been detected on a user's face in one or more captured videoframes input into the trained intelligent appearance monitoring management system neural network. Such an assessment of user appearance anomalies on a user's face may depend on whether the intelligent appearance monitoring management system is set to conducting intelligent monitoring for such user appearance anomalies in some embodiments. In the present embodiment, the trained intelligent appearance monitoring management system neural network may determine whether a blemish, smudge, unshaven skin, lack of makeup, or other appearance anomaly appears on the user's skin at block 918. Such determination may be made according to embodiments herein including based on determination of the location of a user's face within the captured videoframes such as via face recognition, boundary detection or the like. Further, the trained intelligent appearance monitoring management system neural network may utilize comparison of the user's image and face with the trained parameters indicating typical appearance or various user appearance anomalies. Additional input relating to shading/color sensor detection of skin tone and texture may further be inputs relevant to determination of the user appearance anomaly at block 918 in some embodiments. If a user appearance anomaly has been identified for a user's face, then flow may proceed to block 920 for the neural network to generate a notice message to the user identifying the detected user appearance anomaly. If a user appearance anomaly has not been identified at block 918, then flow may proceed to block 926 to determine if a user appearance anomaly in the user's hair in the captured videoframes is detected by the trained intelligent appearance monitoring management system neural network.

At block 920, the intelligent appearance monitoring management system may generate optimized appearance filtering adjustment as output of the trained neural network. In an embodiment, this optimized appearance filtering adjustment may be an instruction to notify the user of the user appearance anomaly detected at block 918. For example, the intelligent appearance monitoring management system may generate, or select from a database, a notice message to be displayed to a user on a display screen notifying the user of the identified user appearance anomaly. In an embodiment, the notification message may include a still image of the captured videoframe with an indicator on the still image of the identified user appearance anomaly highlighting the located anomaly. In another embodiment, the message notification indicating a user appearance anomaly may include a selection option asking the user whether to apply a remediation measure to alter or replace the user's image in the videoframes. The message notification may offer a selection of remediation measures according to embodiments herein or an option to turn off the video camera. In some embodiments, this remediation measure may be automatically applied, and the message notification may include a selection option to end the remediation measure.

Proceeding to block 922, the intelligent appearance monitoring management system will determine whether to apply a remediation measure to alter, correct, or replace the user's image in the videoframes. In some embodiments the remediation measure is automatically applied as part of an optimized appearance filtering adjustment output from a trained neural network. For example, the remediation measure may have been set to be applied via initial settings of a user interface or correlated via the trained neural network with particular user appearance anomalies. In other embodiments, the intelligent appearance monitoring management system may receive feedback of a user selection presented to the user with the message notification of the detected user appearance anomaly. If a remediation measure is to be applied to the user appearance anomaly for user's face in the captured videoframes, then flow may proceed to block 924. If no remediation measure is to be applied to the user appearance anomaly for user's face in the captured videoframes, then flow may proceed to block 926 to determine any user appearance anomaly with the user's hair.

At block 924, the trained intelligent appearance monitoring management system neural network may associate the detected user appearance anomaly from block 918 with a remediation measure such as to alter, correct, or replace the user's image in the captured videoframes. Such an association may be confirmed by the user with feedback provided at block 922. Such feedback may be input to further train the intelligent appearance monitoring management system neural network in some embodiments. In other embodiments, the user's selection may have been received at block 922 indicating which from a selection of remediation measure is to be applied. With this determination, the intelligent appearance monitoring management system may issue an optimized appearance filtering adjustment instruction as an AV processing instruction adjustment to invoke execution of one or more AV processing instruction modules at the video processing engine. In an example embodiment, for a blemish, smudge, mark, or the like identified as a user appearance anomaly, an appearance filter AV processing instruction module may be executed to apply further convolution neural network operation to blend color or texture or apply blur to remove, mask, or deemphasize the location of the user appearance anomaly on the user's face in the captured videoframes in an example embodiment. Other alterations of the user's image as remediation measures are contemplated as well by the intelligent appearance monitoring system at block 924 according to various embodiments described herein including execution of one or more AV processing instruction modules in other example embodiments which may be utilized or use of stock image replacement as examples. Flow may then proceed to block 926.

At block 926, the intelligent appearance monitoring management system may determine whether a user appearance anomaly has been detected in a user's hair in one or more captured videoframes input into the trained intelligent appearance monitoring management system neural network. Such an assessment of user appearance anomalies in a user's hair may depend on whether the intelligent appearance monitoring management system is set to conducting intelligent monitoring for hair appearance in some embodiments. In the present embodiment, the trained intelligent appearance monitoring management system neural network may determine whether hair sticks up, has fallen into a user's face, or otherwise appears substantially different at block 926. Such determination may be made according to embodiments herein including based on determination of the location of a user's hair within the captured videoframes such as via image recognition, boundary detection or the like. Further, the trained intelligent appearance monitoring management system neural network may utilize comparison of the user's image and hair with the trained neural network parameters indicating typical appearance or various user appearance anomalies. Additional input relating to shading/color sensor detection of skin tone and texture may further be inputs relevant to determination of the user appearance anomaly at block 926, such as detection of something in the user's hair in some embodiments. If a user appearance anomaly has been identified for user's hair, then flow may proceed to block 928 for the neural network to generate a notice message to the user identifying the detected user appearance anomaly. If a user appearance anomaly has not been identified at block 926, then flow may proceed to block 934 to determine if a user appearance anomaly appears with the user's eyes, such as bloodshot eyes, in the captured videoframes as detected by the trained intelligent appearance monitoring management system neural network.

The intelligent appearance monitoring management system may generate optimized appearance filtering adjustment as output of the trained neural network at block 928. In an embodiment, this optimized appearance filtering adjustment may be an instruction to notify the user of the user appearance anomaly detected at block 926. For example, the intelligent appearance monitoring management system may generate, or select from a database, a notice message to be displayed to a user on a display screen notifying the user of the identified user appearance anomaly. In an embodiment, the notification message may include a still image of the captured videoframe with an indicator on the still image of the identified user appearance anomaly highlighting the located anomaly. In another embodiment, the message notification indicating a user appearance anomaly may include a selection option asking the user whether to apply a remediation measure to alter or replace the user's image in the videoframes. The message notification may offer a selection of remediation measures according to embodiments herein or an option to turn off the video camera. In some embodiments, this remediation measure may be automatically applied, and the message notification may include a selection option to end the remediation measure.

Proceeding to block 930, the intelligent appearance monitoring management system will determine whether to apply a remediation measure to alter, correct, or replace the user's image in the videoframes. In some embodiments the remediation measure is automatically applied as part of an optimized appearance filtering adjustment output from a trained neural network. For example, the remediation measure may have been set to be applied via initial settings of a user interface or correlated via the trained neural network with particular user appearance anomalies. In other embodiments, the intelligent appearance monitoring management system may receive feedback of a user selection presented to the user with the message notification of the detected user appearance anomaly. If a remediation measure is to be applied to the user appearance anomaly for user's hair in the captured videoframes, then flow may proceed to block 932. If no remediation measure is to be applied to the user appearance anomaly for user's hair in the captured videoframes, then flow may proceed to block 934 to determine any user appearance anomaly with the user's eyes.

At block 932, the trained intelligent appearance monitoring management system neural network may associate the detected user appearance anomaly from block 926 with a remediation measure such as to alter, correct, or replace the user's image in the captured videoframes. Such an association may be confirmed by the user with feedback provided at block 930. Such feedback may be input to further train the intelligent appearance monitoring management system neural network in some embodiments. In other embodiments, the user's selection may have been received at block 930 indicating which from a selection of remediation measure is to be applied. With this determination, the intelligent appearance monitoring management system may issue an optimized appearance filtering adjustment instruction as an AV processing instruction adjustment to invoke replacement of the captured videoframes with a stock image at the video processing engine in an embodiment. In an example embodiment, for a user appearance anomaly identified with the user's hair, a stock image may be selected from memory and applied to replace the streaming videoframes during the videoconference session. Other alterations of the user's image as remediation measures are contemplated as well by the intelligent appearance monitoring system at block 932 according to various embodiments described herein including execution of one or more AV processing instruction modules in other example embodiments which may be utilized instead of stock image replacement. Flow may then proceed to block 934.

At block 934, the intelligent appearance monitoring management system may determine whether a user appearance anomaly has been detected in a user's eyes in one or more captured videoframes input into the trained intelligent appearance monitoring management system neural network. In the present embodiment, the trained intelligent appearance monitoring management system neural network may determine whether user's eyes are mis-colored or bloodshot, or otherwise appears substantially different than a typical appearance at block 934. Such determination may be made according to embodiments herein including based on determination of the location of a user's eyes within the captured videoframes such as via image recognition, boundary detection, face recognition, gaze correction, or the like. Additional input relating to shading/color sensor detection of eye color, shading, or texture may further be inputs relevant to determination of the user appearance anomaly at block 934. If a user appearance anomaly has been identified for which the intelligent appearance monitoring management system is conducting intelligent monitoring, then flow may proceed to block 936 for the neural network to generate a notice message to the user identifying the detected user appearance anomaly. If a user appearance anomaly is not detected at block 934, then flow may proceed to block 942 to determine if a user appearance anomaly appears as a cough or sneeze event in the captured videoframes as detected by the trained intelligent appearance monitoring management system neural network.

The intelligent appearance monitoring management system may generate optimized appearance filtering adjustment as output of the trained neural network at block 936. In an embodiment, this optimized appearance filtering adjustment at 936 may be an instruction to notify the user of the user appearance anomaly detected at block 934. For example, the intelligent appearance monitoring management system may generate, or select from a database, a notice message to be displayed to a user on a display screen notifying the user of the identified user appearance anomaly. In an embodiment, the notification message may include a still image of the captured videoframe with an indicator on the still image of the identified user appearance anomaly highlighting the located anomaly. In another embodiment, the message notification indicating a user appearance anomaly may include a selection option asking the user whether to apply a remediation measure to alter or replace the user's image in the videoframes. The message notification may offer a selection of remediation measures according to embodiments herein or an option to turn off the video camera. In some embodiments, this remediation measure may be automatically applied, and the message notification may include a selection option to end the remediation measure.

Proceeding to block 938, the intelligent appearance monitoring management system will determine whether to apply a remediation measure to alter, correct, or replace the user's image in the videoframes. In some embodiments the remediation measure is automatically applied as part of an optimized appearance filtering adjustment output from a trained neural network. For example, the remediation measure may have been set to be applied via initial settings of a user interface or correlated via the trained neural network with particular user appearance anomalies. In other embodiments, the intelligent appearance monitoring management system may receive feedback of a user selection presented to the user with the message notification of the detected user appearance anomaly. If a remediation measure is to be applied to the user appearance anomaly for user's eyes in the captured videoframes, then flow may proceed to block 940. If no remediation measure is to be applied to the user appearance anomaly for user's eyes in the captured videoframes, then flow may proceed to block 946 to further any additional AV processing instruction modules to be applied as part of the operation of the videoconference to captured videoframes, if applicable.

At block 940, the trained intelligent appearance monitoring management system neural network may associate the detected user appearance anomaly from block 934 with a remediation measure such as to alter, correct, or replace the user's image in the captured videoframes. Such an association may be confirmed by the user with feedback provided at block 938. Such feedback may be input to further train the intelligent appearance monitoring management system neural network in some embodiments. In other embodiments, the user's selection may have been received at block 938 indicating which from a selection of remediation measure is to be applied. With this determination, the intelligent appearance monitoring management system may issue an optimized appearance filtering adjustment instruction as an AV processing instruction adjustment to invoke replacement of the captured videoframes with a stock image at the video processing engine in an embodiment. In an example embodiment, for a user appearance anomaly identified with the user's eyes, a stock image may be selected from memory and applied to replace the streaming videoframes during the videoconference session. Other alterations of the user's image as remediation measures are contemplated as well by the intelligent appearance monitoring system at block 940 according to various embodiments described herein including execution of one or more AV processing instruction modules in other example embodiments which may be utilized instead of stock image replacement. Flow may then proceed to block 942.

At block 942, the intelligent appearance monitoring management system may determine whether a user appearance anomaly has been detected as a cough or sneeze event in one or more captured videoframes input into the trained intelligent appearance monitoring management system neural network. In the present embodiment, the trained intelligent appearance monitoring management system neural network may determine whether user's facial expression is associated with a cough or sneeze, or an expression or user image movement otherwise appears substantially different than a typical appearance at block 942. Such determination may be made according to embodiments herein including based on image recognition, boundary detection, face recognition, gaze correction, or the like. Such a user appearance anomaly may, in some embodiments, be short-lived and occur during active videoframe capture during an ongoing videoconference session. Thus, in such an embodiment, there may be no time to display a notice message to a user, get user feedback, and any applied alteration to the user's image may be of temporary duration. It can be appreciated that such factors may also apply to other detected user appearance anomalies and a similar response by the trained intelligent appearance monitoring management system neural network may be applied to other detected user appearance anomalies described in embodiments herein.

If a user appearance anomaly, such as a sneeze or cough event, has been identified for which the intelligent appearance monitoring management system is conducting intelligent monitoring at block 942, then flow may proceed to block 944 for the neural network apply a preset remediation measure to alter the user's image in captured videoframes. If a user appearance anomaly is not detected at block 942, then flow may proceed to block 946 to further execute any additional AV processing instruction modules to be applied as part of the operation of the videoconference to captured videoframes via the MMCA, if applicable.

The intelligent appearance monitoring management system may generate optimized appearance filtering adjustment as output of the trained neural network at block 944. In an embodiment, this optimized appearance filtering adjustment may be an instruction to automatically apply a remediation measure to alter, correct, or replace the user's image in the videoframes. The trained intelligent appearance monitoring management system neural network may associate the detected user appearance anomaly from block 942 with a remediation measure such as to alter, correct, or replace the user's image in the captured videoframes. The intelligent appearance monitoring management system output an optimized appearance filtering adjustment instruction as an AV processing instruction adjustment to invoke replacement of the captured videoframes with a stock image at the video processing engine in one embodiment. In another embodiment, the optimized appearance filtering adjustment instruction as an AV processing instruction adjustment to invoke one or more AV processing instruction modules to blur the image of the user in the captured videoframes. In an example embodiment, for a user appearance anomaly identified as a cough or sneeze event, a stock image may be selected from memory and applied to replace the streaming videoframes during the period of duration of the cough or sneeze event or for an additional period after such a cough or sneeze event. Other alterations of the user's image as remediation measures are contemplated as well by the intelligent appearance monitoring system at block 940 according to various embodiments described herein including execution of one or more other AV processing instruction modules in other example embodiments which may be utilized instead. Flow may then proceed to block 946.

Proceeding to block 946, the MMCA may apply any additional AV processing instructions modules to the captured videoframes or audio data to conduct the videoconference session. For example, virtual background or background blur may be invoked by the user of the MMCA for the videoconference session. Additionally, the MMCA may utilize AV processing instruction modules such as super resolution algorithms, boundary detection algorithms, face framing algorithms, zoom or face sizing algorithms, color or shading adjustment algorithms or others to process the videoframes in preparation for transmission in the videoconference session. Additionally, encoding AV processing instruction modules and compression AV processing instruction modules may be used for encoding and compressing the videoframes for transmission via the MMCA in the videoconference session according to various algorithms of embodiments of the present disclosure or understood by those of skill.

At block 948, the participating information handling systems may alter the user's image in a videoframe from captured media samples and process according to the optimized appearance filtering adjustments output by the trained intelligent appearance monitoring management system neural network if any apply according to embodiments herein. For example, the captured media samples may apply processing to alter a user's appearance in captured videoframes or generate a notification of detected user appearance anomalies detected in the videoframes in response to the identification of user appearance anomalies. Adjustments to media capture settings and to processor utilization may also occur during the videoconference session in capture and preparation of videoframes for transmission at 948. Then the user information handling system may transmit encoded and compressed videoframes and audio data via the MMCA for purposes of conducting the videoconference session. In such a way, the intelligent appearance monitoring management system may direct the optimized appearance filtering adjustments applied to the transmitted video frames notify the user of a user appearance anomaly detected or to alter the user's image to benefit the user from a potentially embarrassing or otherwise undesirable user appearance anomaly according to various embodiments herein.

At block 950, the MMCA or the intelligent appearance monitoring management system may receive an indication that the videoconference session has ended. If not, the flow may proceed back to block 906 to continue capturing more video frames and continue to intelligently monitor the user's appearance according to the method steps described for FIG. 9 above. If the videoconference is ended, the method of intelligently monitoring user appearance during videoconference sessions of the MMCA on the user's information handling system may then end.

The blocks of the flow diagrams of FIGS. 7, 8, and 9, or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system executing an intelligent appearance monitoring management system comprising:

a processor configured to execute code instructions of a multimedia multi-user collaboration application to join a videoconference session with a remotely located computing device;

a display screen, a speaker, a video camera, and a microphone;

the video camera configured to capture a videoframe of a user;

the processor to execute code instructions of a boundary detection module to detect a user's image within the captured videoframe;

the processor to input videoframe data, including the detected user's image, media capture settings, applied audiovisual (AV) processing instructions to be applied to videoframes, and hardware performance metrics to a trained neural network of the intelligent appearance monitoring management system;

the processor to execute code instructions of the trained neural network of the intelligent appearance monitoring management system to output optimized appearance filtering adjustments indicating detection of a user appearance anomaly in the user's image relative to reference images of the user during the videoconference session, where the optimized appearance filtering adjustment includes generating a notification to be displayed on the display screen to the user of the identified user appearance anomaly; and a network interface device configured to transmit a processed, encoded media sample, including captured plural videoframes to a remotely located computing device participating in the videoconference session.

2. The information handling system of claim 1 further comprising:

the processor to execute code instructions for the trained neural network to output an optimized media capture instructions to the video camera predicted to adjust the video camera resolution in capturing videoframes.

3. The information handling system of claim 1, wherein the optimized appearance filtering adjustments indicating detection of the user appearance anomaly includes identification of a blemish or mark on the user's face.

4. The information handling system of claim 1 further comprising:

the processor to execute code instructions for the trained neural network to output the optimized appearance filtering adjustment to execute instructions of an AV processing appearance filtering module to utilize a convolutional neural network to smooth a user appearance anomaly in the user's image in captured plural videoframes of the videoconference session in response to detection of the identified user appearance anomaly, where the user appearance anomaly includes identification of a blemish or mark on the user's face.

5. The information handling system of claim 1, wherein the optimized appearance filtering adjustments indicating detection of the user appearance anomaly includes identification of an anomaly in the user's hair appearance.

6. The information handling system of claim 1 further comprising:

the processor to execute code instructions for the trained neural network to output the optimized appearance filtering adjustment to execute instructions to display a stock image of the user in place of videoframes including the user's image during the videoconference session in response to detection of the identified user appearance anomaly, where the user appearance anomaly includes identification of an anomaly in the user's hair appearance.

7. The information handling system of claim 1 further comprising:
the processor to execute code instructions for the trained neural network to output the optimized appearance filtering adjustment to execute instructions to display a stock image of the user in place of videoframes including the user's image during the videoconference session in response to detection of the identified user appearance anomaly for a duration of the identified user appearance anomaly, where the user appearance anomaly includes identification of a sneeze or cough by the user in the user's image.

8. The information handling system of claim 1 further comprising:
the processor to execute code instructions of a user interface screen for the user to select options for activating the intelligent appearance monitoring management system to assess the captured user's image in videoframes prior to the videoconference session.

9. A method for intelligently managing a user's appearance in a collaboration videoconference session for an information handling system, comprising:
executing code instructions of a multimedia multi-user collaboration application, via a processor, to join a videoconference session of a remotely located computing device;
capturing a videoframe of a user via a video camera, wherein the videoframe includes the user's image;
inputting videoframe data including the user's image, media capture settings, applied audiovisual (AV) processing instructions to be applied to videoframes, and hardware performance metrics to a trained intelligent appearance monitoring management system neural network;
executing code instructions of the trained intelligent appearance monitoring management system neural network, via the processor, to output optimized appearance filtering adjustments in response to detection of a user appearance anomaly in the user's image relative to reference images of the user during the videoconference session;
capturing plural videoframes, via the video camera, fore the videoconference session with the optimized appearance filtering adjustment in response to detection of the user appearance anomaly; and
transmitting, via a network interface device a processed, encoded media sample, including captured plural videoframes to a remotely located computing device participating in the videoconference session.

10. The method of claim 9, wherein the optimized appearance filtering adjustment includes generating a notification to be displayed on the display screen to the user identifying a type of the user appearance anomaly.

11. The method of claim 9, wherein the optimized appearance filtering adjustment includes adjusting the user's image to be displayed during the video conference session.

12. The method of claim 11 further comprising:
replacing the captured plural videoframes in the encoded media sample with a stock user image.

13. The method of claim 11 further comprising:
executing code instructions of an appearance filter module to alter the user's image in the captured plural videoframes to blend out the detected user appearance anomaly in the captured plural videoframes, where the detected user appearance anomaly is a blemish or mark on the user's face in the user's image.

14. The method of claim 11 further comprising:
replacing the captured plural videoframes in the encoded media sample with a stock user image during a duration of the detected user appearance anomaly, where the detected user appearance anomaly is a cough or sneeze in the user's image.

15. An information handling system executing an intelligent appearance monitoring management system comprising:
a processor to execute code instructions of a multimedia multi-user collaboration application to join a videoconference session with a remotely located computing device;
a display screen, a speaker, a video camera, and a microphone;
the video camera configured to capture a videoframe of a user;
the processor to execute code instructions to input videoframe data, including a detected user's image, media capture settings, an applied audiovisual (AV) processing instructions to be applied to videoframes to a trained neural network of the intelligent appearance monitoring management system;
the processor to execute code instructions of a trained neural network of the intelligent appearance monitoring management system to output optimized appearance filtering adjustments indicating detection of a user appearance anomaly in the user's image relative to reference images of the user during the videoconference session, where the optimized appearance filtering adjustment includes adjusting the user's image to be displayed during the video conference session;
the video camera configured to capture plural videoframes of the videoconference session with the optimized appearance filtering adjustment to process the captured plural videoframes to adjust the user's image in response to the identified user appearance anomaly; and
a network interface device configured to transmit a processed, encoded media sample, including the captured videoframes to a remotely located computing device participating in the videoconference session.

16. The information handling system of claim 15, wherein the optimized appearance filtering adjustments include generating a notification to be displayed on the display screen to the user of the identified user appearance anomaly.

17. The information handling system of claim 15, wherein the optimized appearance filtering adjustments further includes adjusting the user's image to be displayed during the video conference session via execution of instructions of an AV processing appearance filtering module to utilize a convolutional neural network to smooth the detected user appearance anomaly in the user's image in captured plural videoframes of the videoconference session in response to detection of the identified user appearance anomaly, where the user appearance anomaly includes identification of a blemish or mark on the user's face.

18. The information handling system of claim 15, wherein the optimized appearance filtering adjustments further includes adjusting the user's image to be displayed during the video conference session by replacing the captured plural videoframes with a stock user image stored in memory during the video conference session in response to the detection of the user appearance anomaly in the user's image.

19. The information handling system of claim 15, wherein the optimized appearance filtering adjustments further includes adjusting the user's image to be displayed during the video conference session in response to the detection of the user appearance anomaly in the user's image, where the user appearance anomaly includes identification of an anomaly in the user's hair appearance.

20. The information handling system of claim 15 further comprising:
- the processor to execute code instructions of a user interface screen for the user to select options for activating the intelligent appearance monitoring management system to assess the captured user's image in videoframes prior to the videoconference session including selection from blemish or mark detection, bad hair detection, bloodshot eye detection, and sneeze and cough detection.

* * * * *